(12) United States Patent
Kodama

(10) Patent No.: US 7,843,784 B2
(45) Date of Patent: Nov. 30, 2010

(54) OPTICAL DISC RECORDING APPARATUS AND METHOD FOR DETERMINING OPTIMUM WRITE POWER THEREOF

(75) Inventor: Hidetaka Kodama, Kanagawa (JP)

(73) Assignee: Sony Corporation, Tokyo (JP)

( * ) Notice: Subject to any disclaimer, the term of this patent is extended or adjusted under 35 U.S.C. 154(b) by 767 days.

(21) Appl. No.: 11/784,319

(22) Filed: Apr. 6, 2007

(65) Prior Publication Data

US 2007/0237046 A1    Oct. 11, 2007

(30) Foreign Application Priority Data

| Apr. 11, 2006 | (JP) | ............................... 2006-108971 |
| Apr. 21, 2006 | (JP) | ............................... 2006-117366 |
| May 31, 2006 | (JP) | ............................... 2006-152477 |

(51) Int. Cl.
| G11B 5/00 | (2006.01) |
| G11B 7/12 | (2006.01) |
| G11B 5/55 | (2006.01) |
| G11B 7/125 | (2006.01) |

(52) U.S. Cl. .............. 369/47.53; 369/47.51; 369/47.52; 369/53.26

(58) Field of Classification Search .............. 369/47.51, 369/47.52, 47.53, 53.26
See application file for complete search history.

(56) References Cited

U.S. PATENT DOCUMENTS 6,845,071 B2 * 1/2005 Shoji et al. ............... 369/47.53

FOREIGN PATENT DOCUMENTS

| JP | 10-312568 A | 11/1998 |
| JP | 2000-251254 A | 9/2000 |
| JP | 2001-060320 A | 3/2001 |
| JP | 2001-216643 A | 8/2001 |
| JP | 2001-243629 A | 9/2001 |
| JP | 2002-319135 A | 10/2002 |
| JP | 2003-045032 A | 2/2003 |
| JP | 2003-346338 A | 12/2003 |
| JP | 2004-171768 A | 6/2004 |
| JP | 2004-253016 A | 9/2004 |
| JP | 2004253016 A | * 9/2004 |
| JP | 2004-319024 A | 11/2004 |
| JP | 2007-035093 A | 2/2007 |

* cited by examiner

*Primary Examiner*—Joseph H Feild
*Assistant Examiner*—Nicholas Lee
(74) *Attorney, Agent, or Firm*—Wolf, Greenfield & Sacks, P.C.

(57) ABSTRACT

A method for determining optimum write power for an optical disc in an optical disc recording apparatus includes, test writing the optical disc as a recording medium at a first position where a write sensitivity is higher than an average write sensitivity of the optical disc and at a second position where the write sensitivity is lower than the average write sensitivity by the same amount of difference as the difference between the write sensitivity at the first position and the average write sensitivity, using the same write power to the both of the first position and the second position, and obtaining an optimum write power for the optical disc from an average of a write characteristics of the test written positions.

15 Claims, 50 Drawing Sheets

(In Case of k=1)

(In Case of k=1)

(In Case of k=3)

(In Case of k=1)

(In Case of k=3)

(1)

(2)

(3)

OPTICAL DISC RECORDING APPARATUS AND METHOD FOR DETERMINING OPTIMUM WRITE POWER THEREOF

CROSS REFERENCES TO RELATED APPLICATIONS

The present invention contains subject matter related to Japanese Patent Applications JP 2006-152477 filed in the Japanese Patent Office on May 31, 2006, JP 2006-117366 filed on Apr. 21, 2006 and JP 2006-108971 filed on Apr. 11, 2006, the entire contents of which being incorporated herein by reference.

BACKGROUND OF THE INVENTION

1. Field of the Invention

The present invention relates to an optical disc recording apparatus that performs writing on an optical disc by use of laser. In particular, the present invention relates to an optical disc recording apparatus that performs writing on an optical disc for which an optimum write power is set, and to a method for determining the optimum write power in the optical disc recording apparatus.

2. Description of the Related Art

In a method of determining and controlling the optimum write power in optical disc recording (hereafter, optimum write power is abbreviated as Po, optimum power control is abbreviated as OPC), generally Po is calculated by arithmetically processing the write characteristics such as the fluctuation of reflectance at the time of writing, the asymmetry after writing, the amplitude, the depth of modulation and the jitter obtained by test writing on several points selected in the vicinity of the write power (hereafter, abbreviated as Pm) suitable for obtaining Po (hereafter, the series of processes is abbreviated as Po-operation).

The exact value of Pm, however, is not available until the OPC is performed. For this reason, test writing is performed with write powers in a range as broad as what can be estimated, Pm is selected on the basis of the write characteristics thus obtained and Po-operation is performed using the write characteristics of the points in the vicinity of Pm thus selected.

In OPC, the test writing is performed in consecutive recording tracks of optical disc while the disc is rotated. The test writing is performed with the write power being changed. In related art, however, the write power is changed simply from the lowest to the highest, or vice versa. As a result, there is a problem that the write power being dependent on the position in the optical disc.

FIG. 1 schematically shows an OPC method in related art. For a simple explanation, the example taken in this case includes a write sensitivity fluctuation in a sine wave pattern with a frequency θt. The number of powers with which the test writing is performed (hereafter, the number is abbreviated as N) is six in this example, but the number may vary for each actual case. P(i) is a series of test write power, E(i) is a series of write characteristics obtained by performing test writing with P(i). For an easy understanding of the explanation, the write power in the write power series P(i) is set to increase as the value i increases in this example, but the present invention is not limited to this.

$$P(i)\ i{:}0\ to\ N{-}1 \tag{1}$$

$$P(i) < P(i+1) \tag{2}$$

In general, in an OPC, test writing is performed in a specified, continuous position of a rotating disc with the write power being changed. FIG. 1 shows that a test writing is performed from a test-writing starting position indicated as θs with write powers P(0) to P(5). Subsequently, Po-operation is performed using write characteristics E(i) thus obtained. This example shows that {P(1)+P(2)}/2 is selected as Pm, and the write characteristics E(1) and E(2) in the vicinity of Pm are selected for Po-operation. With such write sensitivity fluctuation as illustrated in the figure, the Po-value would be a value corresponding to a state in which the write sensitivity obtained by a Po-operation is high because the write characteristics E(1) and E(2) used in the Po-operation are values measured in positions of high write sensitivities.

Every time test writing is performed, the phase relationship between the write sensitivity fluctuation and the test-writing starting position θs differs. FIG. 2 shows such an example. When OPC is performed under such a phase relationship, Po-value thus obtained is a value corresponding to a state in which the write sensitivity is low because the write characteristics E(1) and E(2) are values measured in positions with low write sensitivities.

Examples in FIG. 1 and FIG. 2 show a problem that the OPC in related art has. Specifically, the obtained Po-value changes as determined by the phase relationship between the write sensitivity fluctuation and test writing starting position, which results in an OPC with lower accuracy.

FIG. 23 shows an OPC method in related art. The circular arc arrows arranged in a substantially concentric manner on an optical disc 1 show how the test writing is performed on spiral recording tracks formed on an optical disc 1. The numbers put in a position closer to the center respectively indicate the positions on the optical disc 1. P(i) is a write power, with which test writing is performed in each section shown by the corresponding circular arch arrow. For a simple explanation, the number of write powers (N) in a write power series is set to be eight in this figure, but the number may vary for each actual case. Also for a simple explanation, the write power P(i) is set to increase as the value of i increases.

FIG. 24 shows the relationship, obtained by the OPC, among the position in disc, the write power, and the write characteristics. Here, E(i) is write characteristics at the time when the test writing is performed with the corresponding one of write powers P(i). As described above, in the OPC, the write power Pm that is suitable for obtaining Po is selected, then several points in the vicinity of the Po are selected, and then the Po-operation is performed. The example in FIG. 24 shows that P(3) is selected as the Pm, the write powers P(2), P(3) and P(4) in the vicinities of the selected Pm, and the write characteristics E(2), E(3) and E(4) are selected.

Incidentally, uneven write sensitivity occurs in an optical disc for various reasons. Such unevenness includes unevenness due to the characteristics of the recording film itself, unevenness due to the characteristics of a cover film and a reflective film, as well as unevenness due to contamination by fingerprints. Focusing on the influence on the OPC, apparent unevenness due to the misalignment of the relative position and the relative angle of the optical disc with the optical lens, caused by the bending of the optical disc and the attachment error is also included.

Most of such unevenness depends on the position in the optical disc. For this reason, in the test writing as performed in related art, namely the test writing with the write power being changed simply from the largest to the smallest, or vice versa, the regions where writing is performed with a write power in the vicinity of Pm becomes close to one another. Accordingly, a problem arises that some combinations of the write power and the position of uneven write sensitivity results in big changes in the number of measurement points influenced by the unevenness in write sensitivity.

FIG. 25 shows an example of distribution of uneven write sensitivity on an optical disc. FIG. 26 shows the relationship between the position in disc, the write power and the write characteristics, all of which are obtained by an OPC performed on an optical disc that has an uneven write sensitivity distribution shown in FIG. 25. FIG. 25 shows that uneven write sensitivity exists in an area 11. In such a case, all of the write characteristics E(2), E(3) and E(4) used in the Po-operation influenced by the uneven write sensitivity, and the accuracy of the Po calculated using these values lowers significantly.

FIG. 40 schematically shows an OPC method in related art. Here, P(i) indicates a write power, with which test writing is performed. The circular arc arrows arranged in a substantially concentric manner on the optical disc 1 show how the test writing is performed on recording tracks, while the numbers (0, 1, 2, 3, 4, 5 . . . ) put in a position closer to the center respectively indicate the positions on the optical disc 1. As shown in the figure, the test writing in OPC is performed in continuous regions of the rotating optical disc 1, with the write power being changed. For a simple explanation, as the following formula show, the write powers P(i) are set to monotonically increase as the value of i increases. The number of write power (N) in the write power series is set to be six in this case, but a variety of variables may be used in actual cases of OPC.

P(i) i:0 to N−1 where $P(i) < P(i+1)$

When the test writing is performed, the write characteristics fluctuate in accordance with the write sensitivity of the disc. FIG. 41 shows how the fluctuation occurs. The horizontal axis of each of the three graphs (1) (2) and (3) shows the position on the disc in FIG. 40. The vertical axes of the graphs (1), (2) and (3) from the top are the write power P, write sensitivity S, and write characteristics E, respectively. The third graph (3) from the top shows an example in which the write characteristics shifts from the values in theory indicated by the broken line to the values in practice indicated by the solid line as the uneven write sensitivity affects the write characteristics. Since Po is calculated using these write characteristics in OPC, a problem arises in related art in which uneven write sensitivity causing low accuracy of Po.

This uneven write sensitivity includes not only unevenness in characteristics of a recording film and a cover layer in the disc, but also apparent unevenness such as write-power loss due to contamination and misalignment of the optical axis.

Various methods have been proposed thus far to compensate for the influence of such write sensitivity fluctuation and of uneven write sensitivity. In these methods, however, compensating operation is preceded by measurement of write characteristics in areas in which test writing is to be performed (see, for example, Japanese Patent Application Laid-Open No. 2004-253016 and Japanese Patent Application Laid-Open No. 2002-319135), or by stabilization of the write characteristics on the area (see, for example, Japanese Patent Application Laid-Open No. 2000-251254). These methods have disadvantages in that since a series of operation including the measuring of characteristics and the writing is repeated, the processing of OPC as a whole tends to become complicated. Another problem is that a method including a preceding writing in an area where test writing is performed as a pre-processing is not suitable for an optical disc that is not rewritable such as CD-R (CD-Recordable).

SUMMARY OF THE INVENTION

Specifically, according to an OPC of the related art, there is a problem that the Po-value that is determined by the phase relationship between the write sensitivity fluctuation and test-writing starting position in an optical disc varies, leading to lower accuracy in an OPC. Another problem is that, since the write characteristics varies for it being affected by uneven write sensitivity of the optical disc, Po can be obtained only with limited accuracy. Still another problem arises that in the methods which compensating operation is preceded by measurement of write characteristics of areas in which test writing is to be performed and/or preceded by stabilization of the write characteristics is performed in the area, a series of operation including the measuring of characteristics and the writing is needed to be repeated, making the whole process of OPC complicated. Furthermore, a method that includes a preceding writing, as a pre-processing, in an area where test writing is performed is not suitable for an optical disc that is not rewritable, such as a CD-R.

In view of the forgoing, it would be desirable to provide an optical disc recording apparatus and a method for determining the optimum write power, which reduce the influence of write sensitivity fluctuation of the optical disc, thereby improving the accuracy in controlling the write power.

According to an embodiment of the present invention, a method of determining the optimum write power for an optical disc recording apparatus can be provided to reduce the influence of the write sensitivity fluctuation of the optical disc, and to improve the accuracy in controlling the write power.

In addition, according to an embodiment of the present invention, a method of determining the optimum write power an optical disc recording apparatus can be provided to reduce the influence of the uneven write sensitivity of the optical disc, and to improve the accuracy in controlling the write power.

To accomplish the above-mentioned goals, a method of determining an optimum write power of an optical disc in the optical disc recording apparatus includes test writing the optical disc as a recording medium at a first position where a write sensitivity is higher than an average write sensitivity of the optical disc and at a second position where the write sensitivity is lower than the average write sensitivity by the same amount of difference as the difference between the write sensitivity at the first position and the average write sensitivity, using the same write power to the both of the first position and the second position and obtaining an optimum write power for the optical disc from an average of a write characteristics of the test written positions.

According to the present invention, an optimum write power of which the effect of the fluctuation period of write sensitivity of the optical disc is minimized can be obtained, and the accuracy in controlling the write power can be improved. As the accuracy in control of the write power improves, recording performance of a predetermined quality can be obtained even for the optical disc having a small performance margin for the error in the write power. Additionally, in the present invention, test writing is to be performed only twice which is more effective than a method of related art performing Optical Power Control repeatedly to minimize the deviation of Po. It could also be used with another method for compensating the fluctuation of write sensitivity easily.

Furthermore, in order to accomplish above-mentioned goal, the method of determining optimum write power according to the present invention includes test writing on an optical disc using a test write power series arranged in order of intensity and rearranged such that write powers with intensities next to each other are not arranged in succession, measuring a write power characteristics of a position where the test writing is performed and calculating the optimum write power based on the measured write characteristics.

According to the present invention, the write characteristics becomes less dependent on a position of the optical disc which leads to prevent decrease in accuracy in controlling the write power caused by unevenness insensitivity in the optical disc.

Furthermore, in order to accomplish above-mentioned goal, the method of determining optimum write power according to the present invention includes, test writing on an optical disc using a write power for monitoring a write sensitivity fluctuation being arranged discretely in a series, measuring a write power characteristics of a position where the test writing is performed, calculating an amount of fluctuation of the write sensitivity of the optical disc based on the measured write characteristics and correcting a variable used for calculating the optimum write power based on the calculated amount of fluctuation of the write sensitivity.

According to the present invention, an optimum write power of which the effect of the unevenness of write sensitivity of the optical disc is minimized can be obtained, and the accuracy in controlling the write power can be improved. As the accuracy in control of the write power improves, recording performance of a predetermined quality can be obtained even for the optical disc having a small performance margin for the error in the write power. Additionally, the method according to the present invention can be used in combination with other existing methods easily. It is expected that an adverse effect due to uneven sensitivity be decreased even further by such combined use with the other methods.

Meanwhile, the write power in the present invention indicates laser emission power for writing in, for example, optical pickup, however, the present invention is not limited thereto.

Meanwhile, the variables according to the present invention used in calculation of optimum write power indicates laser emission power for writing in, for example, optical pickup, however, the present invention is not limited thereto.

According to the present invention, the first position and the second position are able to be determined based on the fluctuation period of the write sensitivity. If the fluctuation period of sinusoidal wave is obtained, the write characteristics of average sensitivity can be obtained regardless of the position where the test writing is started. Furthermore, if an information on write sensitivity fluctuation period is previously given, the present invention can be applied effectively even to an optical disc that is not able to be written over, such as CD-R.

As concrete methods for determining the first position and the second position based on the fluctuation in write sensitivity of the optical disc, methods such as test writing the optical disc at a constant write power and obtaining the fluctuation of the write characteristics, obtaining the positions based on a servo error information, reproducing the information on the base position that is previously written in the optical disc can be named.

The method for obtaining the fluctuation period of the write sensitivity of the optical disc based on a fluctuation of the write characteristics that is obtained by test writing the optical disc at a constant write power can be used by using a wave length as short as to cover a quarter of the fluctuation period as long as the accuracy thereof can be assured. This has an advantage of reducing the area needed for test writing.

According to the present invention, the test write power series of the fixed length may be used repeatedly to have the first position and the second position being test written with the same write power. In such case, a gap may be provided between a first round of the test write power series and a second round of the test write power series so that the position and the phase of the both of the first and the second positions can be matched. In addition, the length of the test write power series may be adjusted so that the first position and the second position are written with the same write power as the test write power series of the fixed length is used repeatedly.

According to the present invention, the first position and the second position are able to be determined based on the base position where the write sensitivity of the optical disc becomes average. As concrete methods, methods such as test writing the optical disc at a constant write power and obtaining the fluctuation of the write characteristics, obtaining the positions based on a servo error information, reproducing the information on the base position that is previously written in the optical disc can be named.

In addition, the fixed length of test write power series may be used repeatedly so that the first position and the second position are written with the same write power. However, in such case, a second round of the test write power series in reversed order of a first round of the test write power series is used so that the first position and the second position are written with the same write power.

Further, the present invention may include a step of forming a write power series rearranged such that write powers with intensities next to each other are not arranged in succession by using random numbers. In such case, when the write powers arranged next to each other accidentally turned out to be in order of intensity, in order to solve the problem, one out of the two write powers may be changed to any other or the order may be rearranged again.

Further, in the test writing step, the optical disc may be test written using a write power series rearranged such that write powers with intensities next to each other are not arranged in succession based on the fluctuation of the sensitivity unevenness in the optical disc.

Since the sensitivity unevenness of the optical disc is dependent on factors such as rotation period of the optical disc, the effect of sensitivity unevenness of the optical disc can be decreased even more as having the order of the write power series determined based on the fluctuation of the sensitivity unevenness, which results in improvement in accuracy in controlling the write power.

As a method for test writing such that write powers with intensities next to each other are not arranged in succession, methods such as using a write power series that is formed by allocating the write powers being arranged next to each other in order of intensity to a test writing from a first start position and a test writing from a second start position. The first start position and the second start position next to the first start position are calculated based on the obtained information on a fluctuation period of the write sensitivity of an optical disc. The order of write power series used from the first and the second start position respectively may be rearranged further by using random number.

Additionally, the fluctuation period of the write sensitivity of the optical disc may be calculated, and the first start position and the second start position may be obtained based on the calculated period.

Further, in the test writing step, the optical disc may be test written using a write power series rearranged such that write powers with intensities next to each other are not arranged in succession based on the difference in write sensitivity between a track of an inner circumference side and a track of an outer circumference side.

In other words, in the optical disc, there may be a difference in the write sensitivity between the track of the inner circumference side and the track of the outer circumference side. In such a case, it is effective to test write the optical disc using a write power series rearranged such that write powers with intensities next to each other are not arranged in succession based on the difference in write sensitivity between a track of an inner circumference side and a track of an outer circumference side.

A concrete method for test writing the optical disc using a write power series rearranged such that write powers with intensities next to each other are not arranged in succession based on the difference in write sensitivity between a track of an inner circumference side and a track of an outer circumference, methods such as using write power series that are being allocated with write powers arranged next to each other in order of intensity to the track of the inner circumference and the track of the outer circumference respectively.

Further, the order of the write power series used in the inner circumference side and the outer circumference side may be rearranged further by using random numbers.

Additionally, according to the present invention, in the correction step, the correction of write power series may be performed by converting the calculated amount of fluctuation in the write sensitivity to the fluctuation in the amount of write power in the write power series. Furthermore, in the correction step, the correction of the write characteristics may be performed by converting the calculated amount of fluctuation in the write sensitivity to the fluctuation in the amount of write characteristics. However, in the present invention, the write power and/or the write characteristics are not only the variables to be adopted for the correction.

Any write power in the write power series may be adopted for the power that monitors the write sensitivity fluctuation. With this method, the write characteristics being written using power used for monitoring the fluctuation in write sensitivity can also be used in calculating optimum write power, which is efficient, and leads to saving the area for test writing of the optical disc.

According to the present invention, in the method of determining the optimum write power of a recordable type optical disc, the effect of the fluctuation period of write sensitivity of the optical disc is minimized, and the accuracy in controlling the write power can be improved.

Additionally, according to the present invention, in the method of determining the optimum write power of a recordable type optical disc, the effect of unevenness of write sensitivity of the optical disc is minimized, and the accuracy in controlling the write power can be improved.

DESCRIPTION OF PREFERRED EMBODIMENTS

Next, with reference to the accompanying drawings, embodiments of the present invention will be described.

First Embodiment

Figure 1:
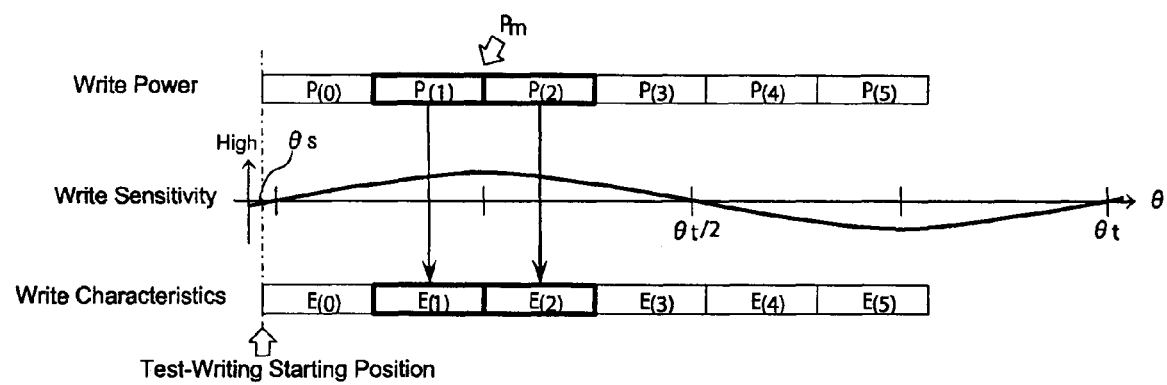
FIG. 1 is a chart for explaining an OPC method in related art.
Figure 2:
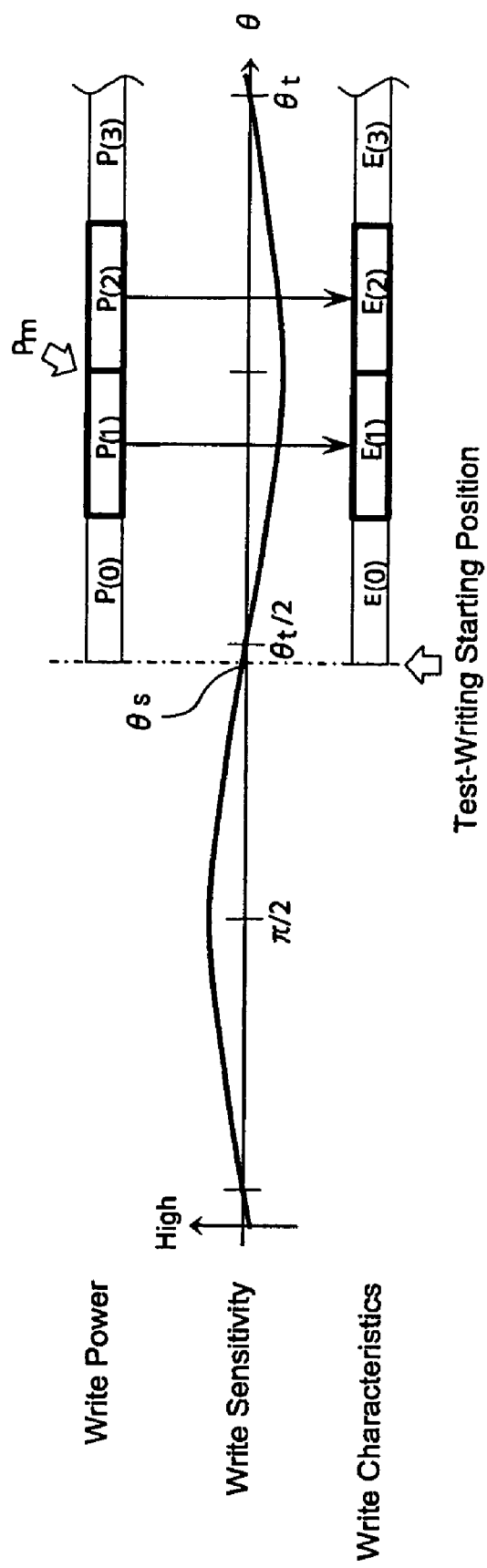
FIG. 2 is a chart for explaining a problem of an OPC method in related art.
Figure 3:
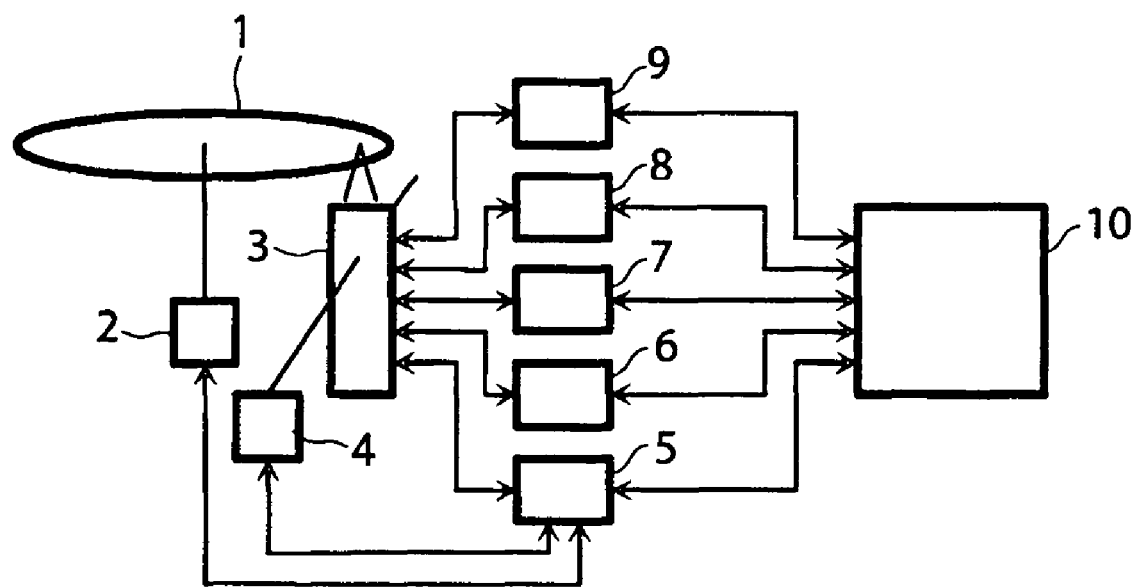
FIG. 3 is a block diagram showing a configuration of an optical disc recording apparatus according to an embodiment of the present invention.

FIG. 3 is a block diagram showing a configuration of an optical disc recording apparatus according to an embodiment of the present invention. In the figure, reference numeral 1 is an optical disc. A spindle motor 2 rotates the optical disc 1. An optical pick-up 3 includes, for example, optical component parts, such as a semiconductor laser, a drive circuit for the semiconductor laser, a lens and the like, as well as an actuator. A sled motor 4 moves the optical pick-up 3 in a tangential direction of the optical disc 1. A reproducing section 7 reproduces data, position information and synchronization timings recorded in optical disc 1, from the signal obtained by the optical pick-up 3. A servo section 5 controls the spindle motor 2, the sled motor 4 and the actuator of the optical pick-up 3, in accordance with information on various errors monitored by the optical pick-up 3, synchronization timings obtained from the reproducing section 7 and the like. The servo section 5 controls, in a desired state: the number of revolution of the optical disc 1; the position of the optical pick-up 3; and the position, the optical axis, the tilt, the focus and the like of the laser beam outputted from the optical pick-up 3. An automatic power control (APC) section 6 controls the laser emission power and the like at desired values in accordance with information monitored by the optical pick-up 3. A write characteristics measurement section 8 measures write characteristics such as the degree of modulation, asymmetry, the β value, jitter and the like, on the basis of the information from optical pick-up 3. A write power modulation section 9 appropriately modulates the laser emission power of the optical pick-up 3 in accordance with the information to be written. A control section 10 controls each section, and includes a sequencer, a central processing unit, a memory and the like.

To reproduce data in the optical disc 1, an appropriate light spot is projected from the optical pick-up 3 onto the optical disc 1. In addition, the servo section 5 rotates the optical disc 1 appropriately, and moves the optical pick-up 3 to a desired position. Moreover, by controlling the actuators and the like, the light spot is made to scan along the recording track on the optical disc 1. In this sate, the reproducing section 7 reproduces the data recorded in the optical disc 1.

To write data in the optical disc 1, the write power modulation section 9 modulates appropriately the waveform of light of the optical pick-up 3 from the waveform of light in the state of data reproduction, and thus the data is written in the optical disc 1. The information on write power used at this time is acquired by an OPC performed before the writing.

Fluctuation period of write sensitivity factors that affects the OPC includes the characteristic fluctuation of a recording film, as well as apparent fluctuations that derive from, for example, relative tilts of writing light and misalignment of the light spot with the recording track, which are caused by the tilt and the warpage of the optical disc 1. These fluctuation periods of write sensitivity depend on the physical position in the optical disc 1. Accordingly, when the light spot scans the surface of the rotating optical disc 1, periodic write sensitivity fluctuations that depend on the physical relationship in the optical disc 1 are observed. Such write sensitivity fluctuation includes, for example, a fluctuation period of write sensitivity that has a period equivalent to the rotational period of the optical disc 1, and a write sensitivity fluctuation that has a period related to the form of, or the wobbling of guiding groove formed in the recording track of the optical disc 1. Also included are write sensitivity fluctuations each of which has a period obtained by dividing one of the above-mentioned periods by an integer.

Most of these write sensitivity fluctuations can approximate to a single sine wave or a plurality of sine waves. The period of each fluctuation can be calculated from error information obtained by the servo section 5 and from the data measured in advance.

In a first to eleventh embodiments of the present invention, attention is focused on the fact that each of these write sensitivity fluctuations has a periodicity of a sine wave pattern. At the time of test writing, writing is performed with the same write power both in a first position that has a higher sensitivity than the average sensitivity of the target optical disc 1, and in a second position that has a lower write sensitivity than the average sensitivity by the difference between the write sensitivity in the first position and the average sensitivity. To reduce the influence of the write sensitivity fluctuation of the optical disc 1, the Po is obtained from the average write characteristics in the positions where the test writing is performed.

An example of methods for determining two specific positions in each of which the test writing is performed to obtain the average write characteristics includes a method that takes advantage of the periodicity and a method that takes advantage of the symmetry of a sine wave.

Figure 4:
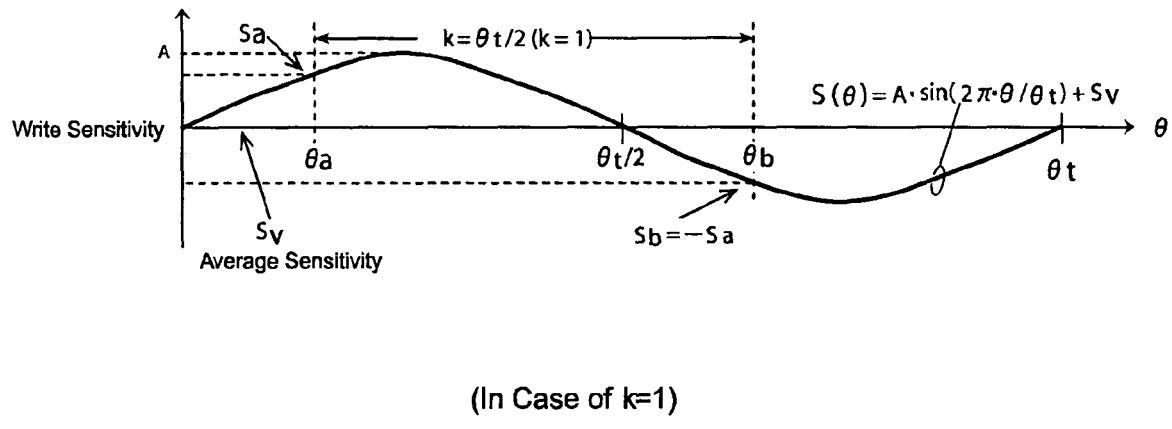
FIG. 4 shows a first principle of methods for determining optimum write power, which takes advantage of the periodicity of a sine wave, according to a first to an eleventh embodiments.

FIG. 4 shows a first principle of a method for determining optimum write power, which method takes advantage of the periodicity of a sine wave. Here, for a simple explanation, an example is given with a write sensitivity fluctuation that has a pattern of a single sine wave. A write sensitivity fluctuation that approximates to a combination of a plurality of sine waves can be treated as a combination of write sensitivity fluctuations each of which has a pattern of a single sine wave.

In FIG. 4, the vertical axis is the write sensitivity of the optical disc 1, and the horizontal axis is an angle in polar representation of the position in a direction of a recording track (in a circumferential direction). Here, it is assumed that the write sensitivity $S(\theta)$, which is the write sensitivity in a position $\theta$, can be expressed approximately by the following formula.

$$S(\theta) = A \cdot \sin(2 \cdot \pi \cdot \theta/\theta t) + Sv \quad (3)$$

where A, Sv and $\theta t$ are, respectively, the amplitude, the average and the period of write sensitivity fluctuation.

In the scheme of the first principle, writing, with a certain write power P, is performed both in a position $\theta a$ and in a position $\theta b$ that is away from the position $\theta a$ by a distance equivalent to $k \cdot \theta t/2$ (where k is an odd number). Any positions can be chosen as the two positions as long as the two chosen positions have a right distance in between.

Assuming that the write sensitivities in the positions $\theta a$ and $\theta b$ are Sa and Sb, respectively, and on the basis of the nature of a sine wave expressed in formula (4), the relationships expressed in formulas (5) and (6) are established.

$$\sin(\theta) = -\sin(\theta + k \cdot \pi) \text{(where } k \text{ is an odd number)} \quad (4)$$

$$Sb = A \cdot \sin(2 \cdot \pi \cdot \theta b/\theta t) + Sv$$
$$= A \cdot \sin(2 \cdot \pi \cdot \theta a/\theta t + k \cdot \pi) + Sv$$

therefore $Sa - Sv = -(Sb - Sv)$ \quad (5)

therefore $Sv = (Sa + Sb)/2$ \quad (6)

In FIG. 4, it is assumed that k=1, and both of the positions $\theta a$ and $\theta b$ are placed in a single sine wave. However, each of the two positions $\theta a$ and $\theta b$ may be placed across a plurality of sine waves by using an odd number k that is equal to 3 or larger.

Figure 5:
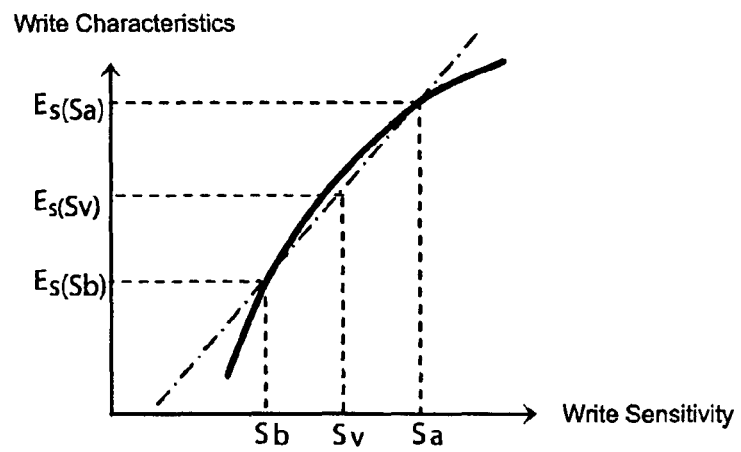
FIG. 5 shows the relationship between the write sensitivity and the write characteristics in the first principle.

Here, the write characteristics at the time of writing with write power P is expressed as a function Es(S), that is, a function of write sensitivity. Normally, the variation of Es(S) caused by the write sensitivity fluctuation is small enough to allow the change in Es(S) approximate to be a linear change with respect to S. FIG. 5 shows this situation. Here, Es(Sa) and Es(Sb) are write characteristics, respectively, in the positions $\theta a$ and $\theta b$ on the recording track, Es(Sv) is the write characteristics in a position that has the average sensitivity Sv. The write characteristics to be used in the OPC preferably are write characteristics Es(Sv) obtained with the average sensitivity Sv. In this scheme, the following formula that derives from the formula (6) easily gives such preferable write characteristics.

$$Es(Sv) \approx \{Es(Sa) + Es(Sb)\}/2 \quad (7)$$

This scheme has an advantage that whenever the period of write sensitivity fluctuation of a sine wave pattern is available, the write characteristics of a writing performed with the average write sensitivity can be obtained, irrespective of the starting position of the test writing.

Figure 6:
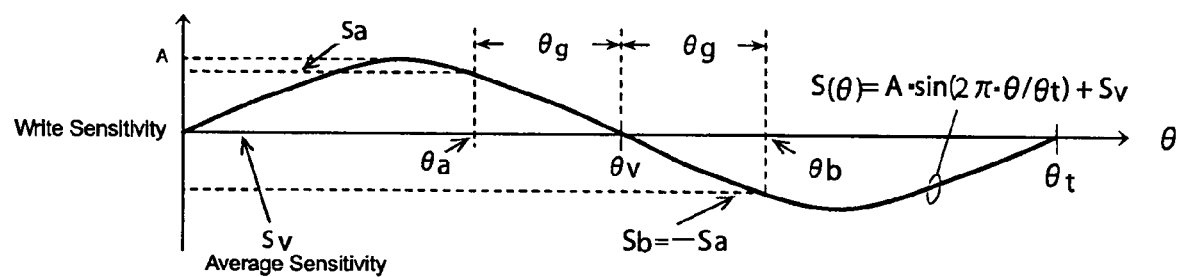
FIG. 6 shows a second principle of methods for determining optimum write power, which takes advantage of symmetry of a sine wave, according to the first to the eleventh embodiments.

On the other hand, there is another method in which the phase of the write sensitivity fluctuation is obtained, and in which the symmetry of a sine wave is taken advantage of FIG. 6 shows a second principle in which the symmetry is taken advantage of. A position $\theta v$ is a base position in this scheme, and in the position $\theta v$, $S(\theta) = Sv$. In FIG. 6, it is assumed that $\theta v = \theta t/2$, but $\theta v$ may be zero, or may be $\theta t$. Other symbols that are the same as those used in FIG. 5 show the same contents as that of explanation given before.

In this scheme, $\theta a$ and $\theta b$ are arranged at two positions, one of which comes before $\theta v$ positioned at the center and the other one comes after $\theta v$, while each of $\theta a$ and $\theta b$ is away from $\theta v$ by the same distance.

With this arrangement, the symmetry of a sine wave gives the relationships expressed in formulas (5) and (6). As a result, formula (7) gives the write characteristics Es(Sv) at the time of writing with the average sensitivity Sv.

This scheme has an advantage that whenever the position in which the write sensitivity fluctuation is the average sensitivity is available, the write characteristics of a writing performed with the average write sensitivity can be obtained, irrespective of the period of the write sensitivity fluctuation.

What has been described thus far is two methods for determining two specific positions used in performing test writing for finding the average write characteristics. Specifically, examples taking advantage of the periodicity and of symmetry have been described. This embodiment is not limited to these examples. For example, test writing may be performed in the following way. Writing with a certain write power is performed before the test writing, and then a position with high sensitivity and a position with low sensitivity are specifically determined on the basis of the write characteristics fluctuation. Thereafter, the test writing is performed.

Figure 7:
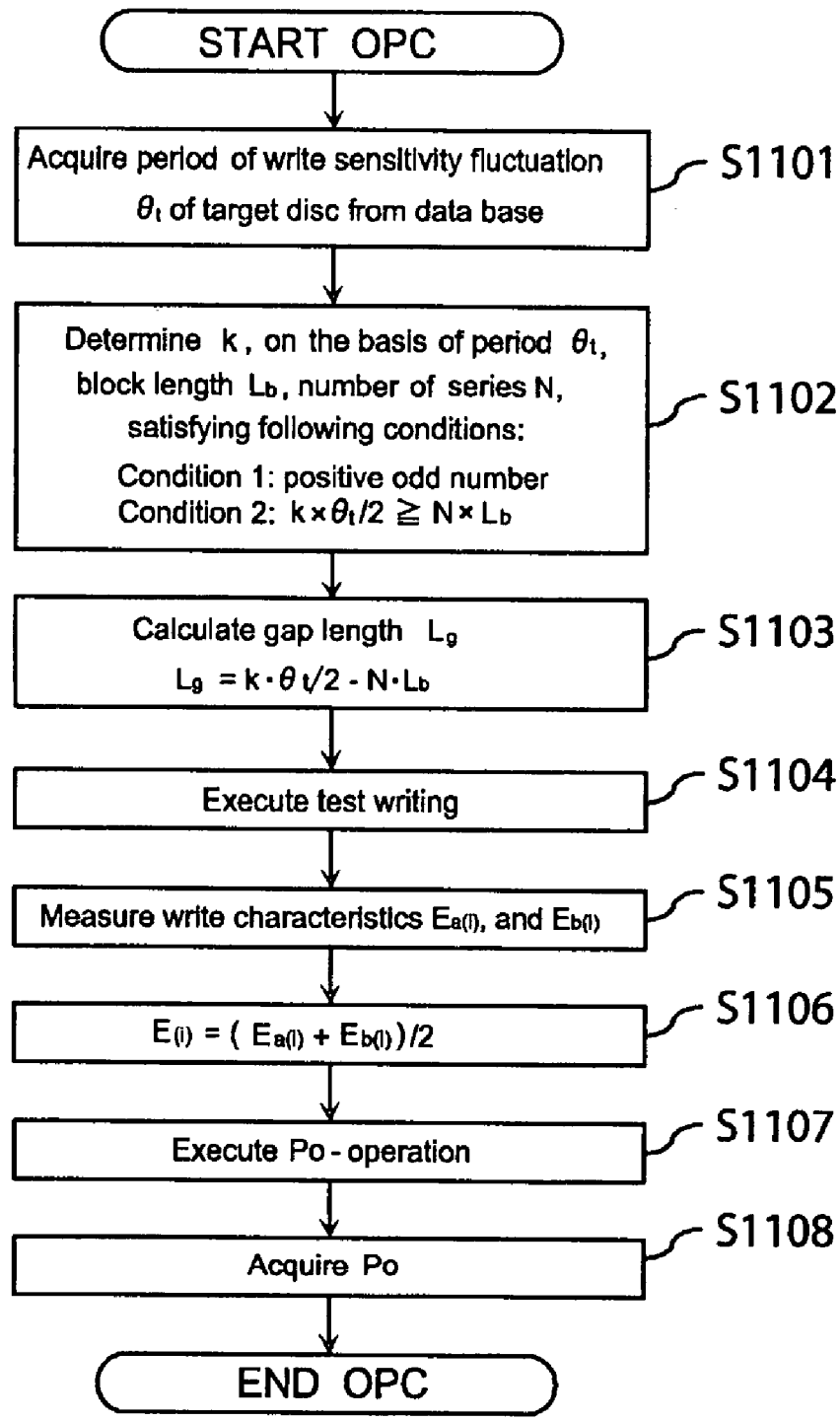
FIG. 7 is a flow chart showing the procedure of a method for determining the optimum write power according to the first embodiment of the present invention.
Figure 11:
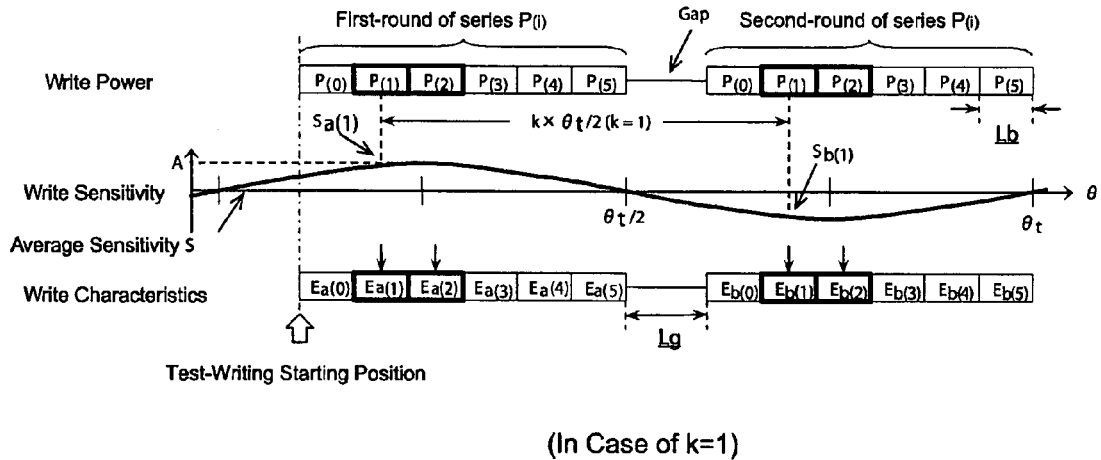
FIG. 11 is a chart related to a test writing in a case where k=1 in the first embodiment.
Figure 12:
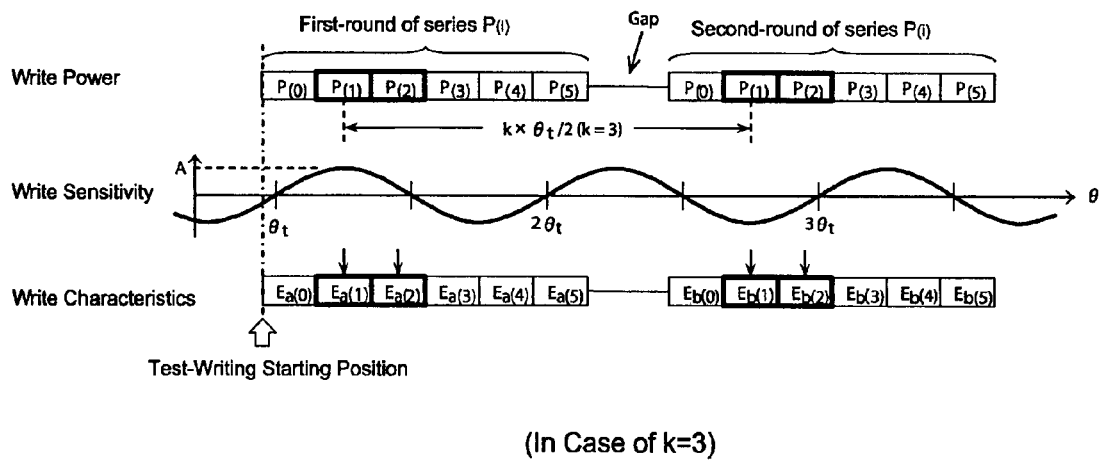
FIG. 12 is a chart related to a test writing in a case where k=3 in the first embodiment.

FIG. 7 is a flow chart showing the procedure of a method for determining optimum write power, which takes advantage of the periodicity of a sine wave, according to the first embodiment of the present invention. FIG. 11 is a chart related to a test writing in a case where k=1 in the first embodiment, and FIG. 12 is a chart related to a test writing in a case where k=3 in the first embodiment. Here, Lb is the distance on the recording track of the optical disc 1, in which test writing is performed with write powers P(i) (hereafter, such a distance is referred to as a block length). In addition, Lg is a distance of the interval provided for aligning the position phases of the P(i) series of a first round and the P(i) series of a second round (hereafter, such a distance is referred to as a Gap). In FIG. 11 and FIG. 12, the number N of P(i) series is set at six, but the present invention is not limited to this case.

In the first embodiment, the period θt of write sensitivity fluctuation for each optical disc 1 is obtained in advance by measurement or the like, and then is stored as a database in a memory of the optical disc recording apparatus.

Description will be given of a procedure of a method for determining the optimum write power according to first embodiment.

(Step S1101) To begin with, the control section 10 acquires the period θt of write sensitivity fluctuation for a target optical disc 1 from the database stored in the memory of the control section 10.

(Step S1102) On the basis of the acquired sensitivity period θt, the block length Lb, and the number N of P(i) series, The control section 10 determines a value of k so as to satisfy the following conditions.

Condition 1: k is a positive odd number, and Condition 2: $k \cdot \theta t/2 \geq N \cdot Lb$ (8)

Note that, though k may take a large value, which renders the length of track used in the test writing longer, k ordinarily preferably takes the smallest value of all that satisfy the above conditions.

(Step S1103) Subsequently, the control section 10 calculates a Gap length Lg to align the position phases of the first-round test writing and of the second-round test writing by use of the following formula.

$Lg = k \cdot \theta t/2 - N \cdot Lb$ (9)

(Step S1104) On the basis of the conditions obtained thus far, the control section 10 performs test writing for example, as shown in FIG. 11 and FIG. 12. In the Gap portion, writing may be performed with an appropriate write power, or no writing may be performed at all. In addition, the first-round writing and the second-round writing may be performed as successive processes, or may be performed as two separate processes.

(Step S1105) The control section 10 measures write characteristics Ea(i) and Eb(i), in the positions where test writing is performed.

(Step S1106) The control section 10 calculates the write characteristics E(i) with the average write sensitivity, by use of formula (7).

(Step S1107) The control section 10 performs an operation to obtain the optimum write power Po. Various methods for the operation are proposed, and the present invention is not limited to a specific method.

(Step S1108) In this way, the optimum write power Po is obtained while the influence of the write sensitivity fluctuation is reduced.

Second Embodiment

As described before, there are various write sensitivity fluctuation factors. When, part of such factors, which part are related to the periodic fluctuation, as the relative tilt of the light spot, the misalignment with the recording track (hereafter, such misalignment is referred to as detrack) and the misalignment in focus (hereafter, such misalignment is referred to as defocus) is reduced, the accuracy in the OPC can be improved. Error information on these factors can be acquired from the servo section 5.

Figure 8:
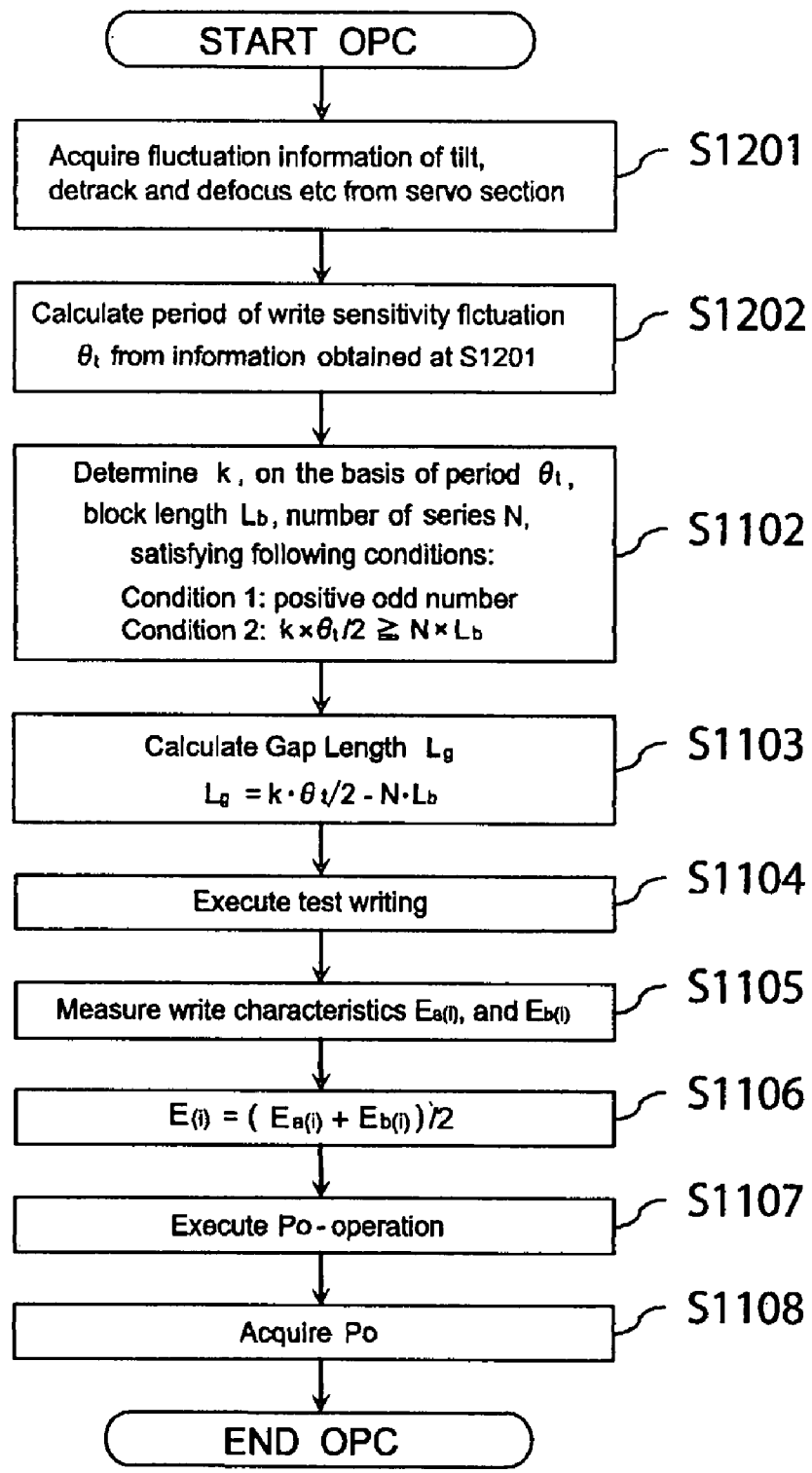
FIG. 8 is a flow chart showing the procedure of a method for determining the optimum write power according to the second embodiment of the present invention.

FIG. 8 is a flow chart showing the procedure of a method for determining optimum write power according to the second embodiment of the present invention, using this information on write sensitivity fluctuation, acquired from the servo section 5.

(Step S1201) The control section 10 measures write sensitivity fluctuation including such factors as the tilt, detrack and defocus, by acquiring error information for respective factors from the servo section 5. A longer time for measurement renders the measurement accuracy for θt improved, but a shorter time, such as a time to cover only one-fourth periods, may be allowable as long as accuracy of a certain level is maintained.

(Step S1202) The control section 10 calculates the write sensitivity fluctuation period θt from the information obtained at step S1201. The processes that follow, that is, Step s1102 to step S1108, are the same as those of the first embodiment.

Third Embodiment

The write sensitivity fluctuation that derives from the characteristic fluctuation of the recording film of the optical disc 1, and the characteristics of the reflective film or the cover film can be often aware of in the process of manufacturing the optical disc 1. In the recordable optical disc 1, in general, for the purpose of indicating the physical position (hereafter, such a position is referred to as an address), the groove structure is subjected to wobble modulation, or pits are provided. These processing are performed to embed the address information in the optical disc 1, and a method in which the information on the write sensitivity fluctuation period of the optical disc 1 is embedded, for example, here in these pits, is also advantageous.

Figure 9:
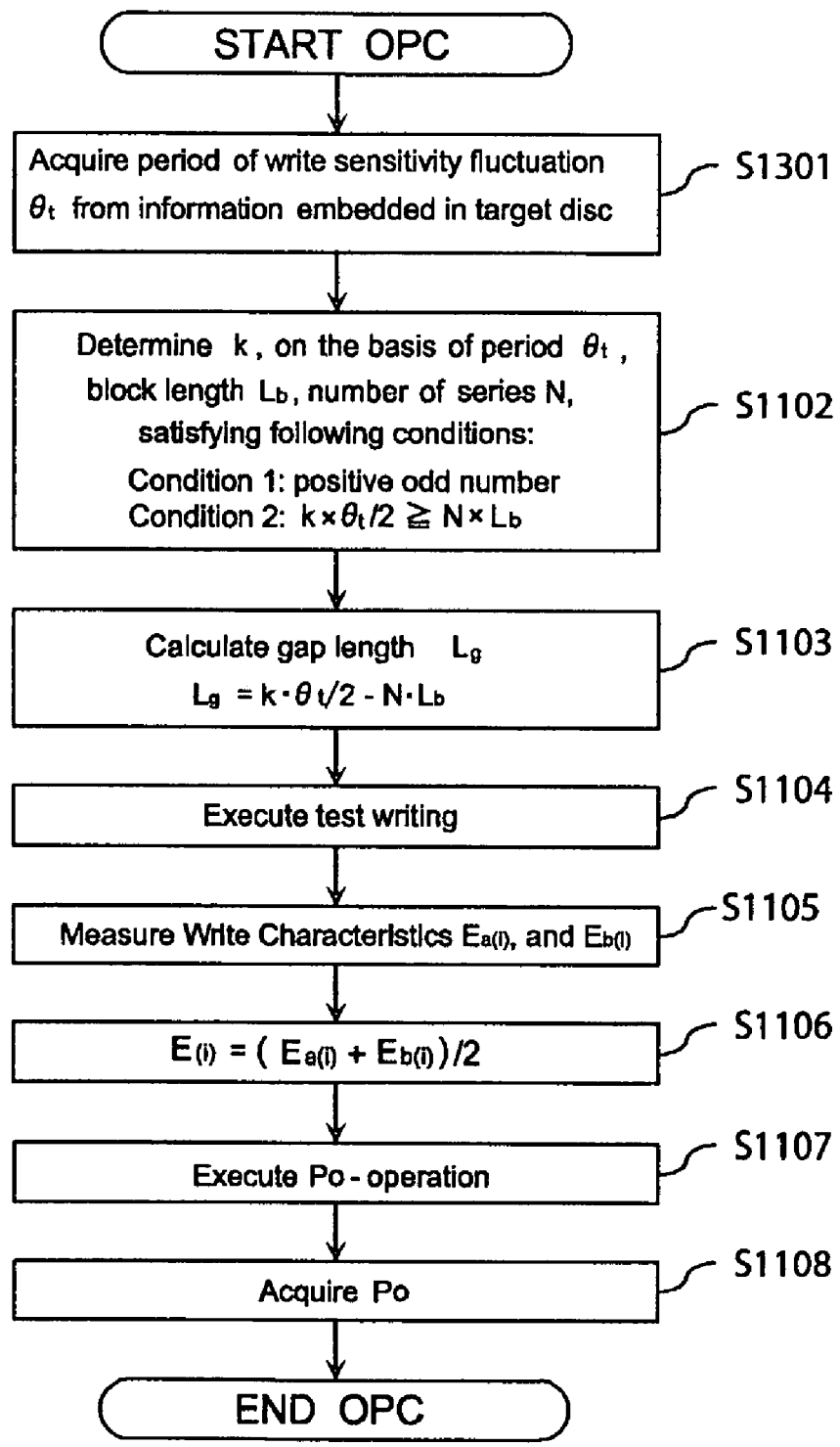
FIG. 9 is a flow chart showing the procedure of a method for determining the optimum write power according to the third embodiment of the present invention.

FIG. 9 is a flow chart showing the procedure of a method for determining optimum write power according to the third embodiment of the present invention. The method uses information, embedded in the optical disc 1, on the period of the write sensitivity fluctuation.

(Step S1301) The control section 10 acquires the write sensitivity period θt from the information embedded in the optical disc 1. The processes that follow, that is, step S1102 to step S1108, are the same as those of the first embodiment.

Fourth Embodiment

The period of the write sensitivity fluctuation may be obtained from the write characteristics fluctuation observed when a direct writing in the optical disc 1 is performed. Such a direct writing may be of a short length, even as short as that only covers approximately one fourth of the period, as long as accuracy of a certain level is maintained. This embodiment has an advantage over other embodiments in saving the area for test writing. Additionally, since only the period is to be obtained in this embodiment of the present invention, the optical disc 1 that is not rewritable, such as a CD-R, can also be used. The test writing is performed in an area where no non-test writing is to be performed in the optical disc 1 that is not rewritable. In a case of the rewritable optical disc 1, the test writing may be performed in the same area where the non-test writing is to be performed.

Figure 10:
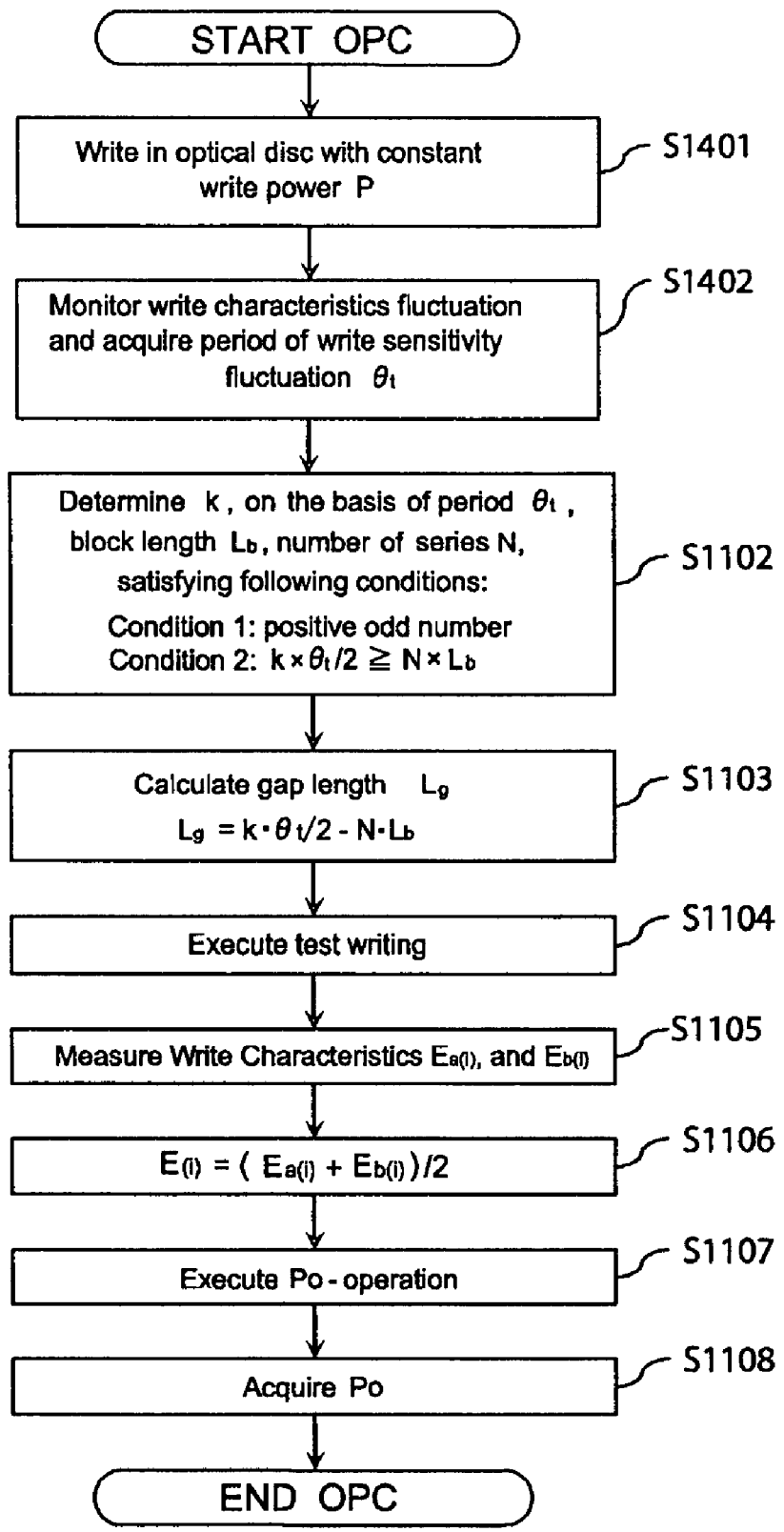
FIG. 10 is a flow chart showing the procedure of a method for determining the optimum write power according to the fourth embodiment of the present invention.

FIG. 10 is a flow chart showing the procedure of a method for determining optimum write power according to the fourth embodiment of the present invention, in which method the period of write characteristics fluctuation is obtained by performing writing in an optical disc 1 with a constant writing power.

(Step S1401) To begin with, writing is performed on the optical disc 1 with a constant write power P.

(Step S1402) The control section 10 acquires the period θt of the write sensitivity fluctuation by measuring the write characteristics in a position where writing is performed at step S1401. The processes that follow, that is, step S1102 to step S1108, are the same as those of the first embodiment.

Fifth Embodiment

In the first embodiment to the fourth embodiment, the position phase of the first-round P(i) series is aligned with the position phase of the second-round P(i) by providing the Gap. The phase alignment may be performed by changing the writing block length. Specifically, the block length is adjusted so that the length of the first-round test writing and that of the second-round test writing can be of θt/2. Note, however, that a short writing block length, in general, reduces the accuracy of write characteristics, so that the value of k is adjusted appropriately in this case.

Figure 13:
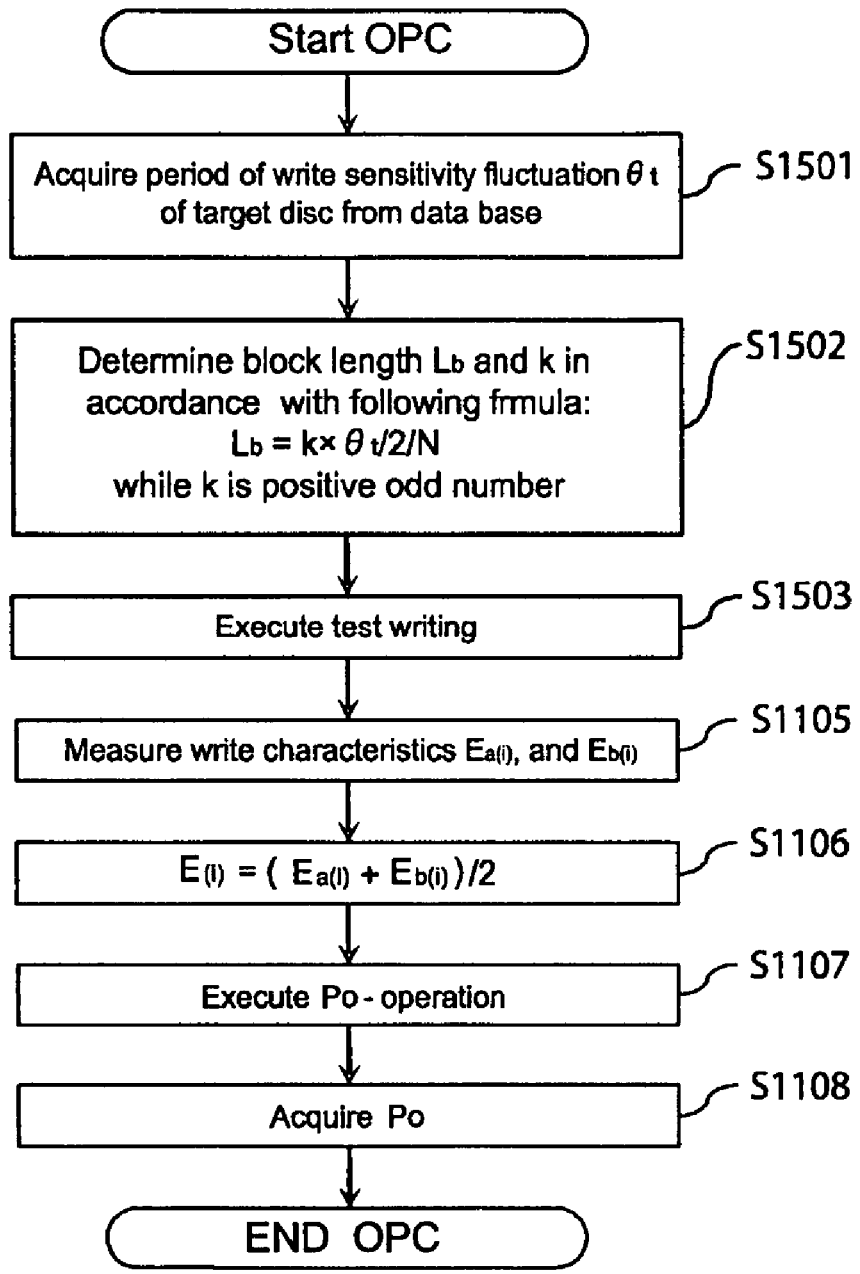
FIG. 13 is a flow chart showing the procedure of a method for determining the optimum write power according to the fifth embodiment of the present invention.
Figure 17:
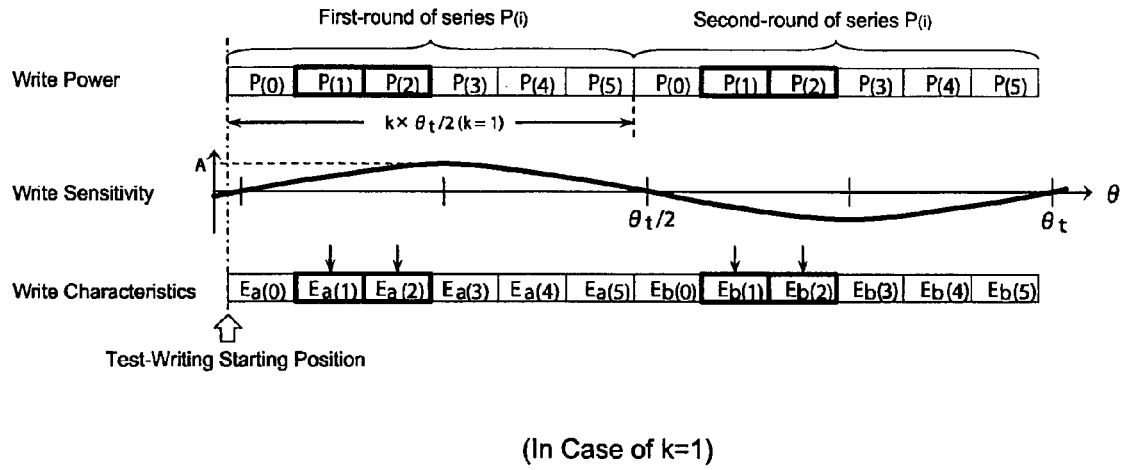
FIG. 17 is a chart related to a test writing in a case where k=1 in the fifth embodiment.
Figure 18:
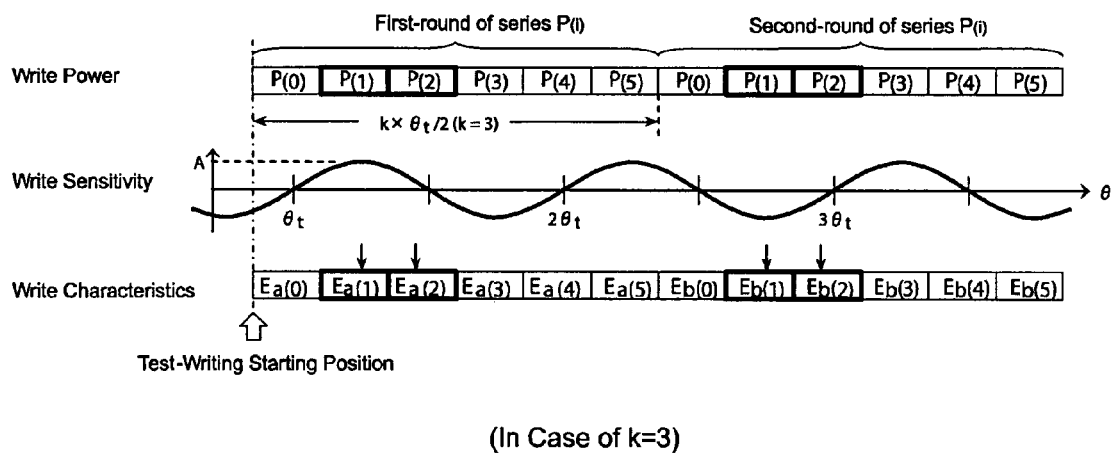
FIG. 18 is a chart related to a test writing in a case where k=3 in the fifth embodiment.

FIG. 13 is a flow chart showing the procedure of a method for determining the optimum write power according to the fifth embodiment of the present invention, in which method the position phase of the first-round P(i) series is aligned with the position phase of the second-round P(i) series, by changing the writing block length. FIG. 17 is a chart related to the test writing performed when k=1 in the fifth embodiment, and FIG. 18 is a chart related to the test writing performed when k=3 in the fifth embodiment.

(Step S1501) To begin with, the control section 10 acquires the period θt of the write sensitivity fluctuation of the target optical disc 1, from the database stored in the memory of the control section 10.

(Step S1502) Subsequently, the control section 10 determines, from the acquired period θt of the write sensitivity fluctuation, the block length Lb, and the number N of the P(i) series, the value of k that satisfies the following condition.

$$Lb = \{k \cdot \theta t/2\}/N \qquad (10)$$

where k is a positive odd number. The value of k may be one, but when the block length Lb is too short for the desired accuracy of the write characteristics, a larger positive odd number is selected as appropriate.

(Step S1503) Subsequently, on the basis of the information obtained thus far, the control section 10 performs test writing, for example, as shown in FIG. 17 and FIG. 18. No such Gap as used in the first embodiment is used at this time. The processes that follow, that is, step S1105 to step S1108, are the same as those in the first embodiment.

Sixth Embodiment, Seventh Embodiment, Eighth Embodiment

Figure 14:
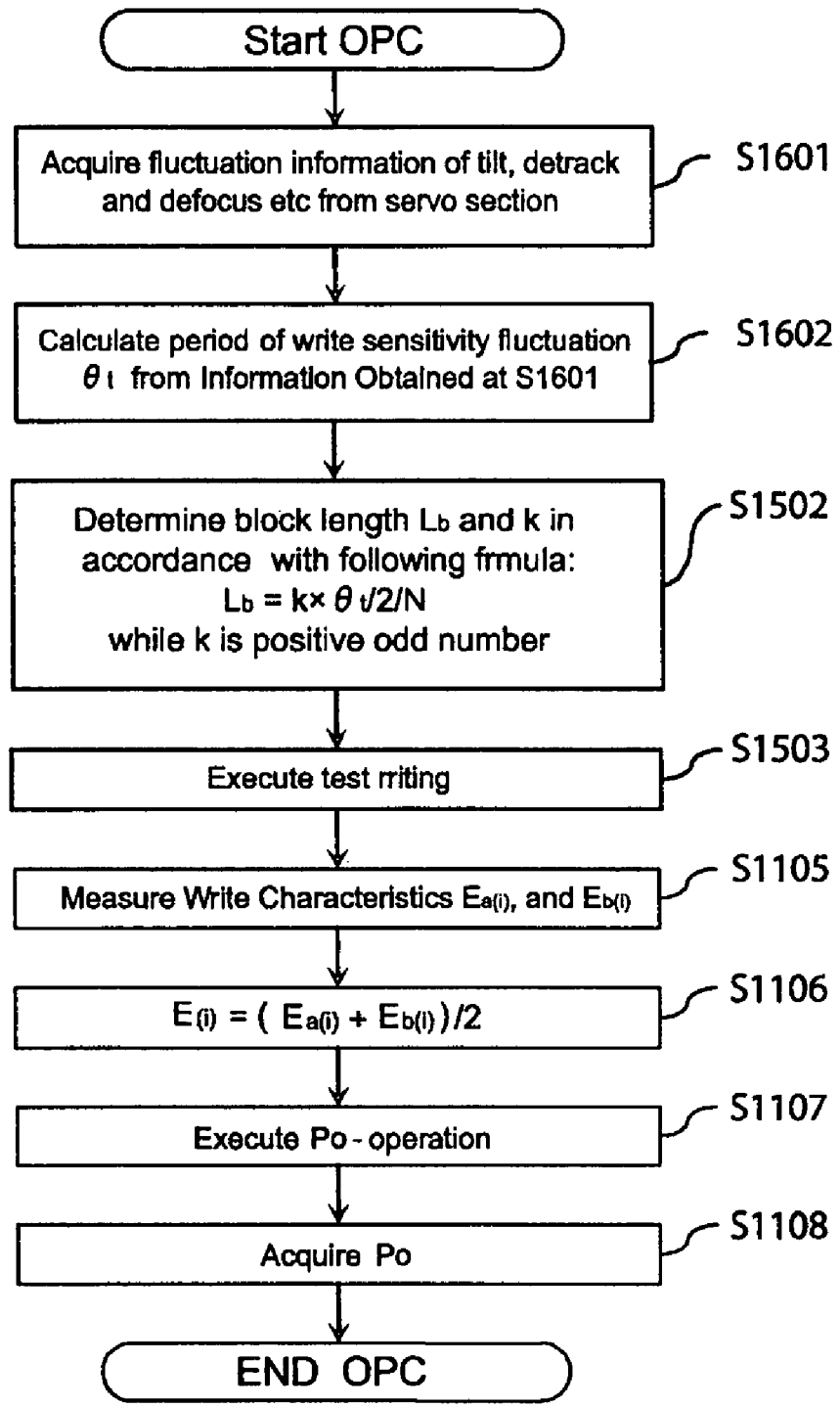
FIG. 14 is a flow chart showing the procedure of a method for determining the optimum write power according to the sixth embodiment of the present invention.
Figure 15:
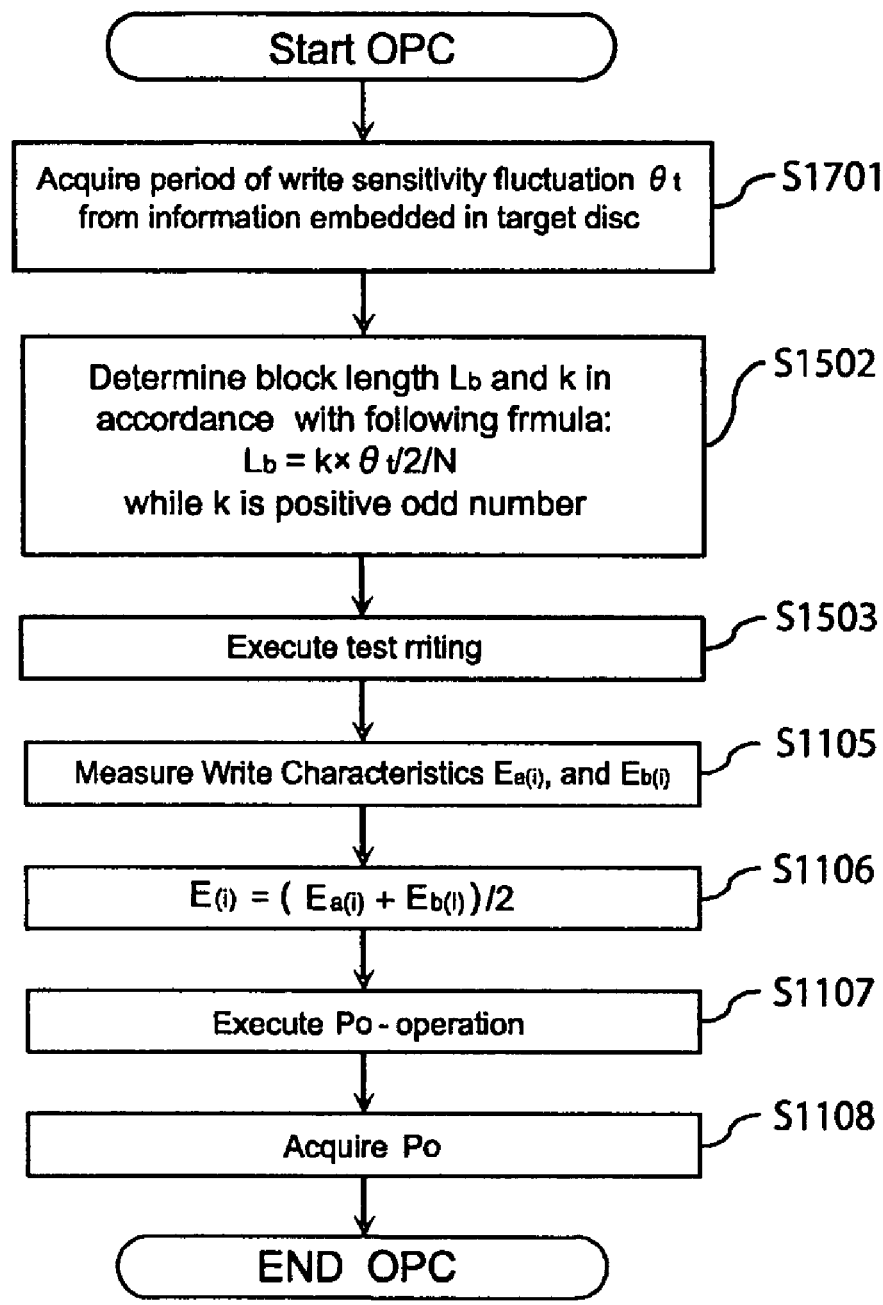
FIG. 15 is a flow chart showing the procedure of a method for determining the optimum write power according to the seventh embodiment of the present invention.
Figure 16:
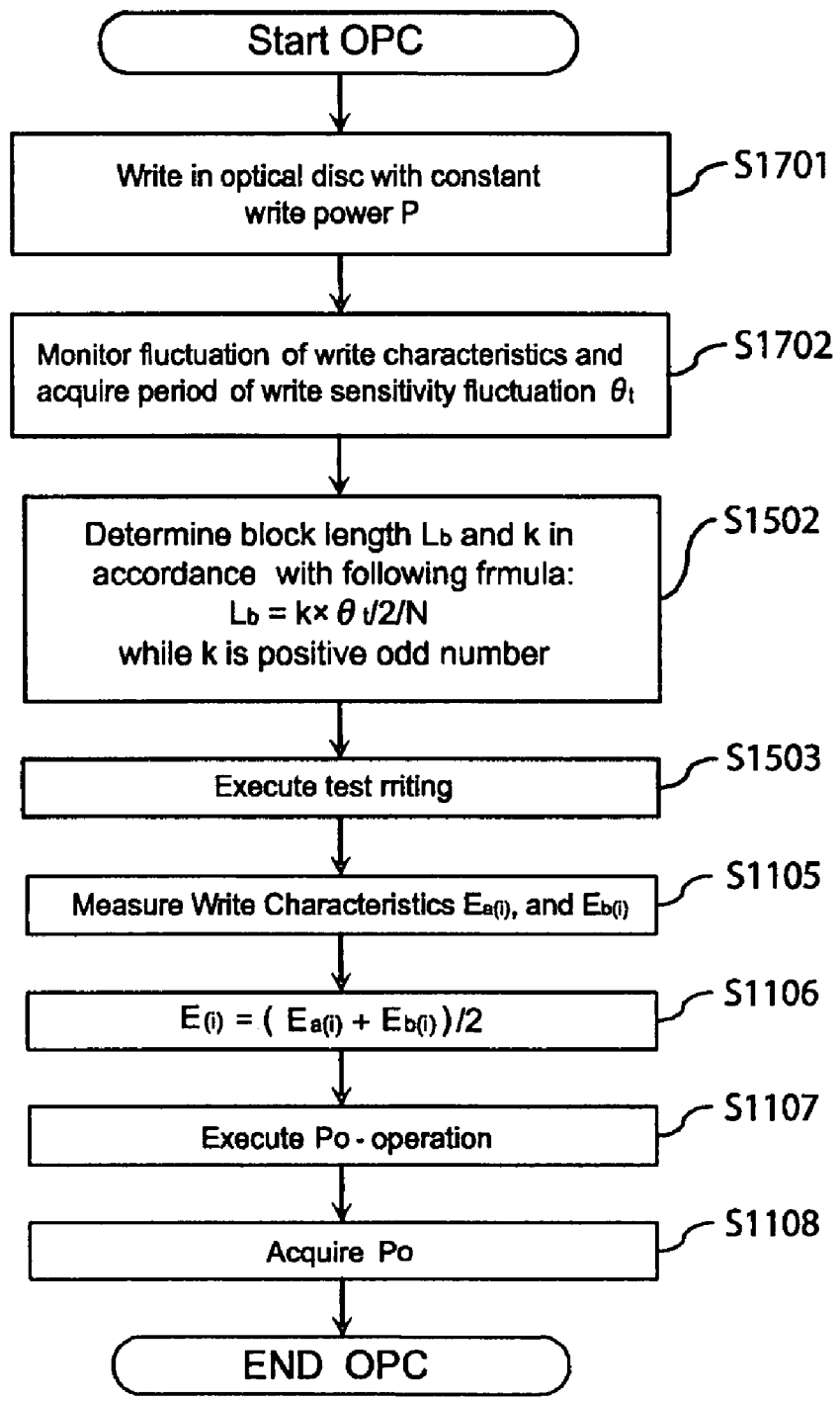
FIG. 16 is a flow chart showing the procedure of a method for determining the optimum write power according to the eighth embodiment of the present invention.

As the second embodiment to the fourth embodiment, examples of methods for acquiring the period θt at step S1501 include error information from, for example, the servo section 5, a method in which information is embedded in the optical disc 1, a method in which the writing is performed with a constant write power P and the like. The methods for determining optimum write power of the respective embodiments are shown respectively in FIG. 14 as the sixth embodiment, in FIG. 15 as the seventh embodiment, and in FIG. 16 as the eighth embodiment. The procedure that comes after the period θt is acquired is the same as that in the fifth embodiment.

Ninth Embodiment

Figure 19:
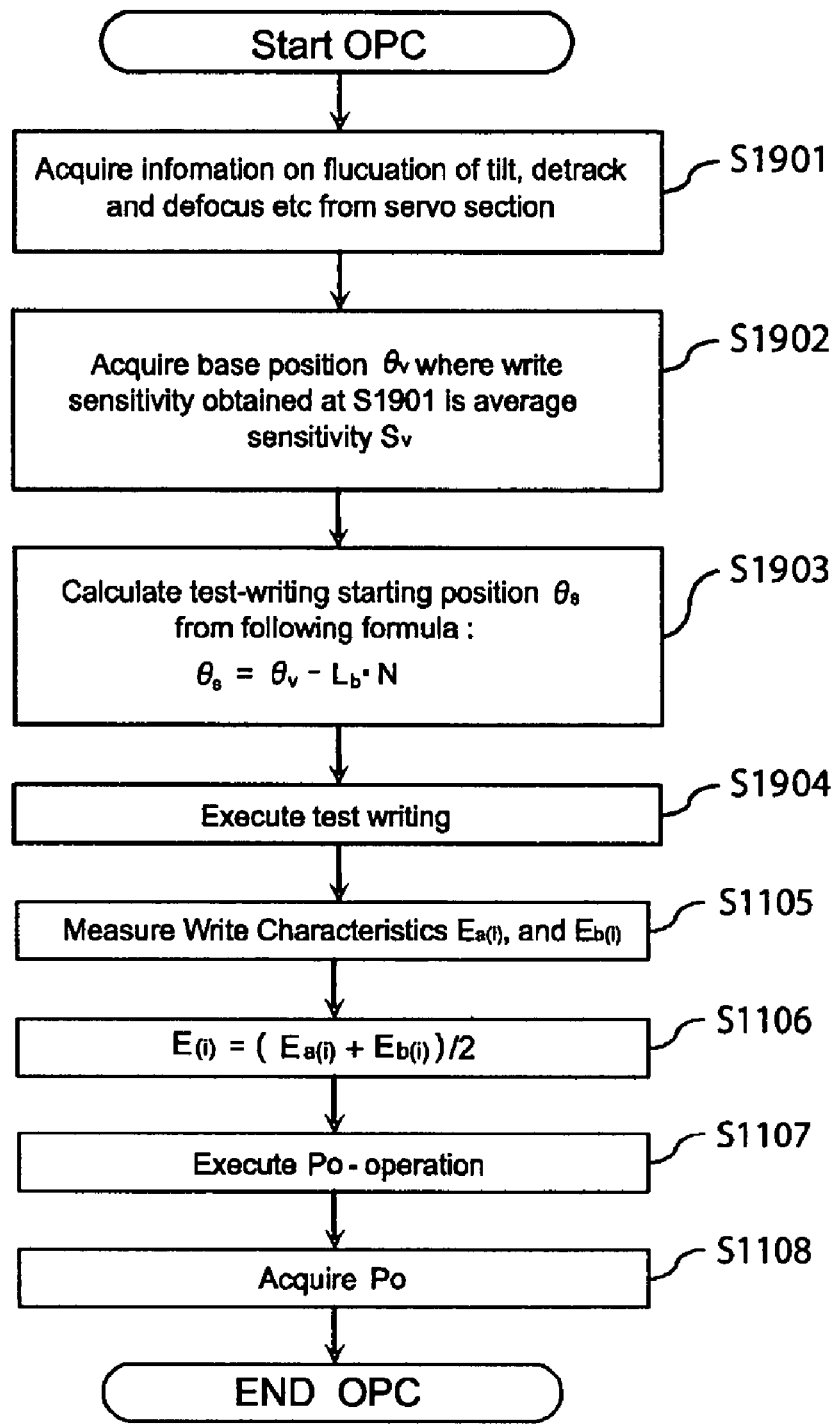
FIG. 19 is a flow chart showing the procedure of a method for determining the optimum write power according to the ninth embodiment of the present invention.
Figure 22:
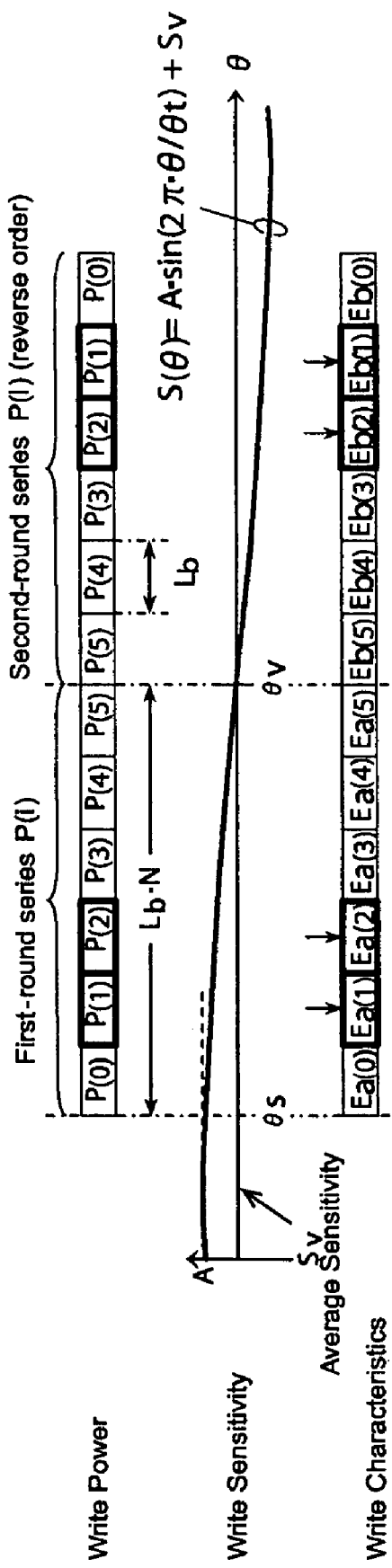
FIG. 22 shows how the test writing is performed in the ninth embodiment.
Figure 23:
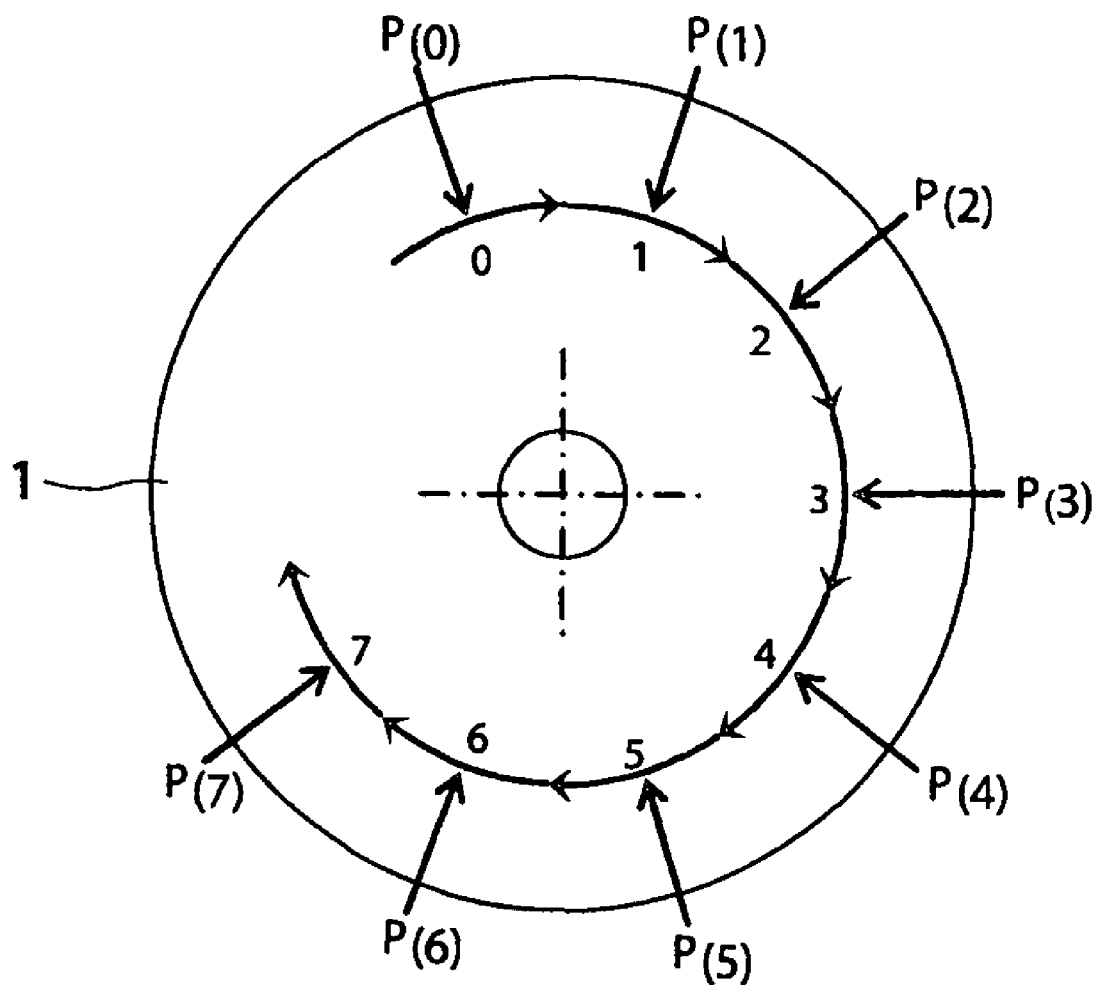
FIG. 23 is a diagram for explaining an OPC method in related art.
Figure 24:
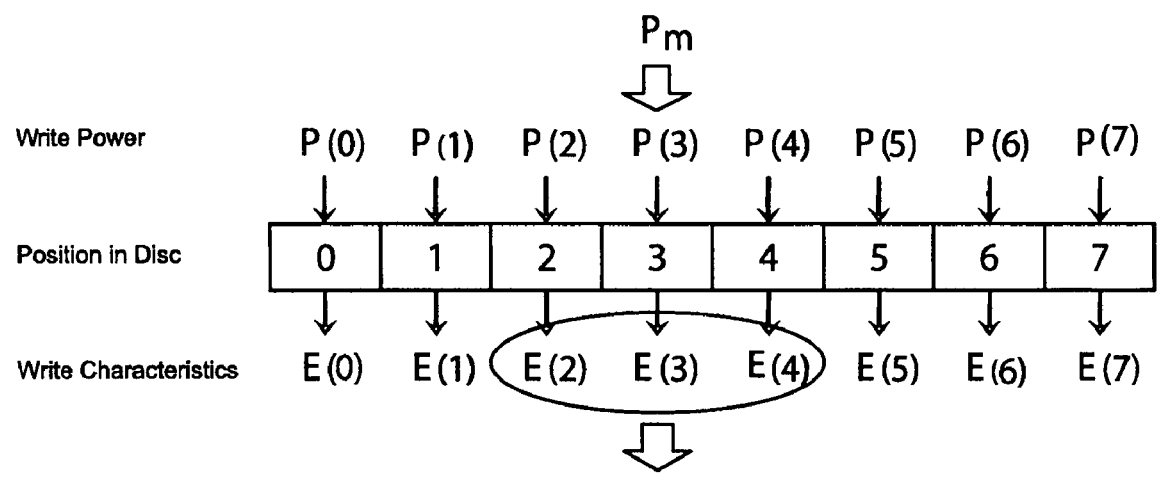
FIG. 24 shows the relationship, obtained by the OPC, among the position in disc, the write power and the write characteristics.
Figure 25:
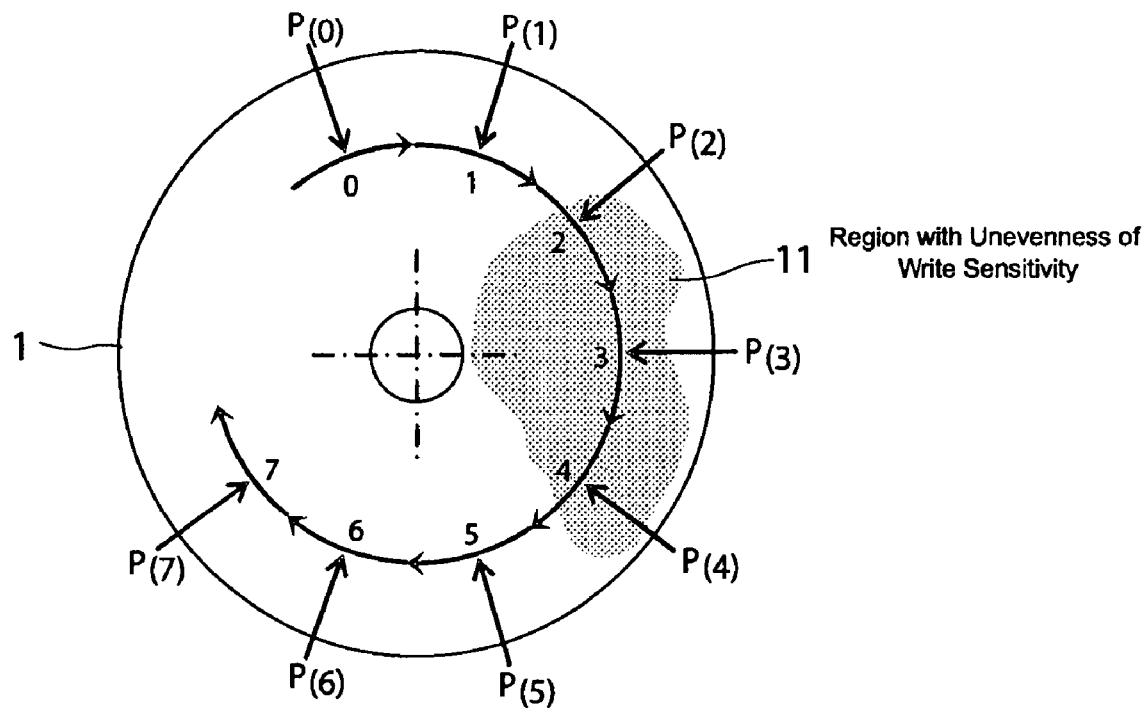
FIG. 25 shows an example of the distribution of unevenness in write sensitivity in an optical disc.

FIG. 19 is a flow chart showing the procedure of a method for determining optimum write power according to the ninth embodiment of the present invention, which method takes advantage of the symmetry of the write sensitivity fluctuation. FIG. 22 shows how the test writing is performed in this ninth embodiment. Here, θv is a base position within the region where the test writing is to be performed, and at the base position, the write sensitivity S(θ) is equal to the average sensitivity Sv.

(Step S1901) The control section 10 measures the fluctuations such as the tilt, the detrack and the defocus, on the basis of the error information from the servo section 5. A longer time for measurement renders the measurement accuracy for θt improved, but a shorter time, such as a time to cover only one-fourth periods, may be allowable as long as accuracy of a certain level is obtained.

(Step S1902) The control section 10 estimates the write sensitivity fluctuation, from the information obtained at step S1901, and acquires the base position θv where the estimated write sensitivity is equal to the average write sensitivity Sv. The base position may be any position including zero, θt/2, and θt, as long as S(θ)=Sv.

(Step S1903) The control section 10 calculates the starting position θs of the test writing by use of the following formula.

$$\theta s = \theta v - Lb \cdot N \qquad (11)$$

where Lb is the length of writing block, N is the number of P(i) series.

(Step S1904) The control section 10 performs the test writing so that the order in the first-round P(i) series is axi-symmetrical with the order in the second-round P(i) series with respect to the base position θv. In other words, as FIG. 22 shows, write powers are arranged in an order in the second-round P(i) series, which order is the reverse of the order in the first-round P(i) series.

The processes that follow, that is, step S1105 to step S1108 are the same as those in the first embodiment.

Tenth Embodiment, Eleventh Embodiment

Figure 20:
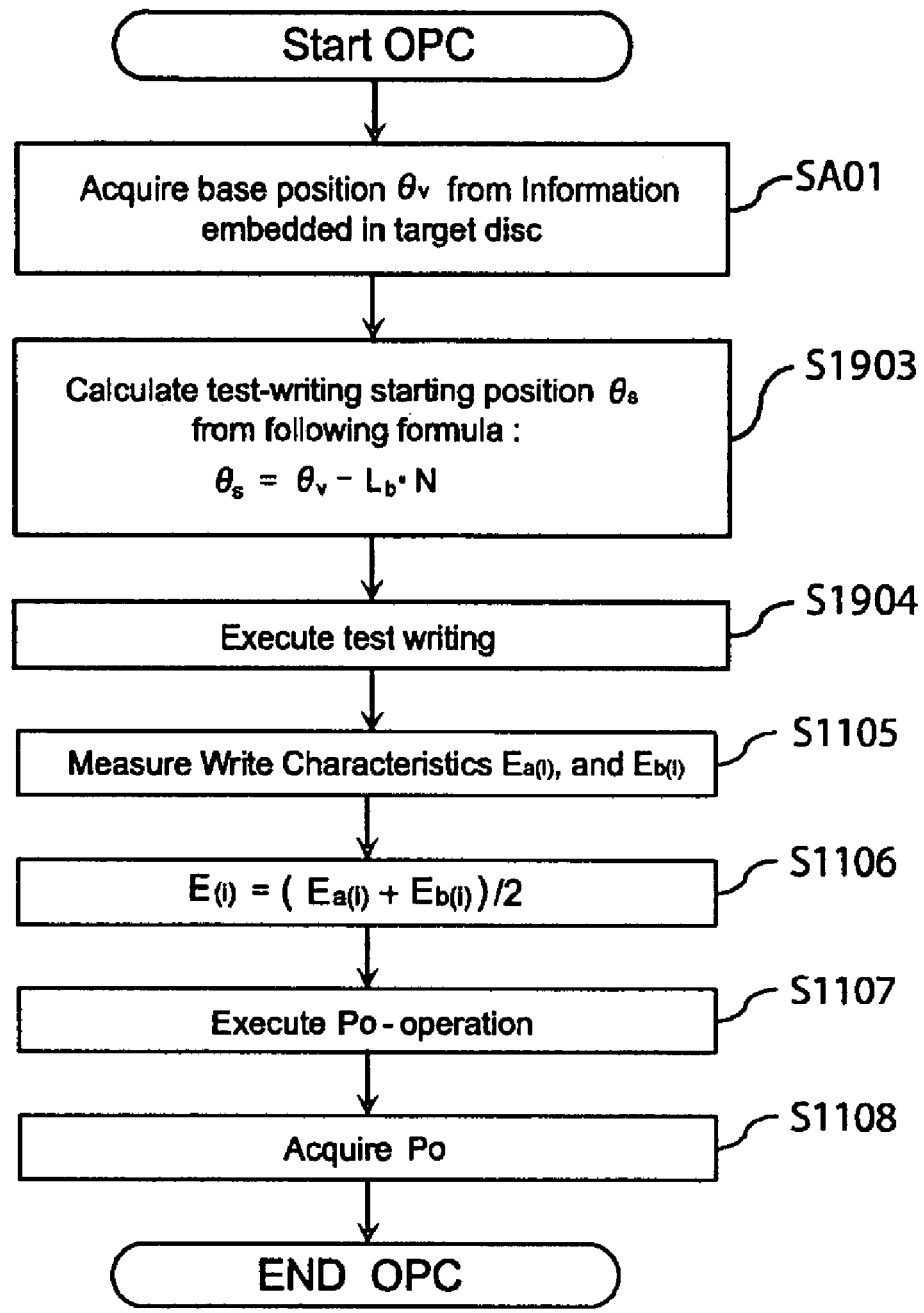
FIG. 20 is a flow chart showing the procedure of a method for determining the optimum write power according to the tenth embodiment of the present invention.
Figure 21:
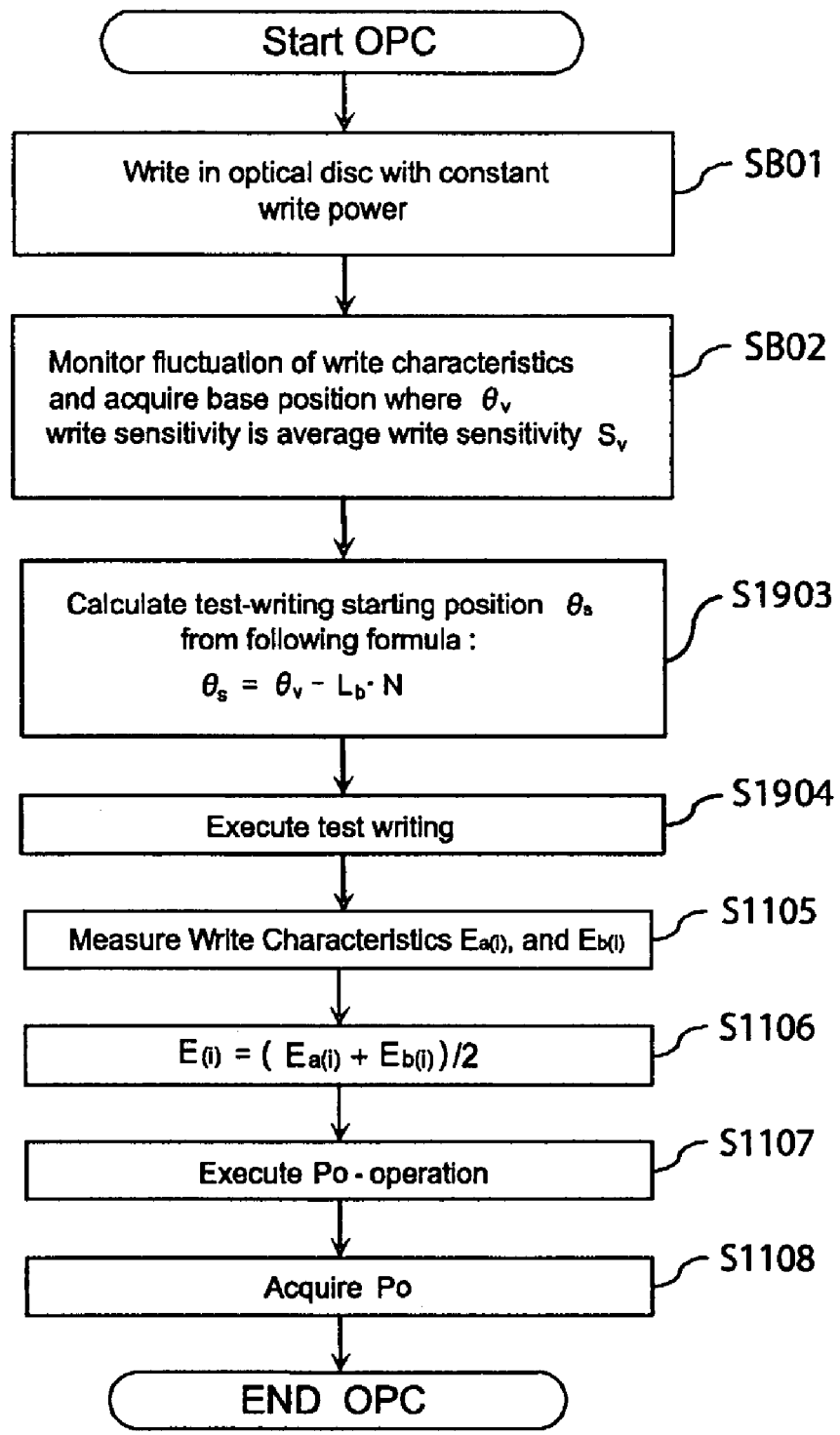
FIG. 21 is a flow chart showing the procedure of a method for determining the optimum write power according to the eleventh embodiment of the present invention.

As the third embodiment and the fourth embodiment, examples of methods for acquiring the base position θv at step S1901 and at step S1902 include, for example, a method in which information is embedded in the optical disc 1, a method in which the writing is performed with a constant write power P and the like. These methods for determining optimum write power of the respective embodiments are shown respectively in FIG. 20 as the tenth embodiment, and in FIG. 21 as the eleventh embodiment.

In the tenth embodiment, the relationships between the information on write position in the optical disc 1 (hereafter, the information is referred to as the address information) and θv may be compiled into a database, and then calculated from the address information when the OPC is performed.

The eleventh embodiment has a similar advantage to that of the fourth embodiment, and the advantage is that θv can be obtained from the writing of approximately one fourth of the period, and θv can be obtained even in a case of the optical disc 1 of a type incapable of overwriting data. The procedure that comes after the base position θv is acquired is the same as that in the ninth embodiment.

In the first to the eleventh embodiments, attention is focused on the fact that each of the write sensitivity fluctuations has a periodicity of a sine wave pattern. In other words, what has been described in each of the above embodiments is as follow. At the time of test writing, writing is performed with the same write power both in a first position that has a higher sensitivity than the average sensitivity of the target optical disc 1, and in a second position that has a lower write sensitivity than the average sensitivity by the difference between the write sensitivity in the first position and the average sensitivity. To reduce the influence of the write sensitivity fluctuation of the optical disc 1, the Po is obtained from the average write characteristics in the positions where the test writing is performed.

In embodiments that follow, that is, a twelfth to a nineteenth embodiments, attention is focused on the fact that most of the unevenness in write sensitivity depends on the position in disc, so that the test writing is not performed by use of a write power series in which the write powers is arranged in order from the largest downward. Rather, in these embodiments, the test writing is performed by changing the order in accordance with an appropriate method. Specifically, the test writing is performed with a write power series in which the write powers are rearranged such that write powers with their intensities next to each other are not arranged in succession. In this way, the dependence on the position in disc is eliminated, and the influence of the uneven write sensitivity is alleviated.

Figure 26:
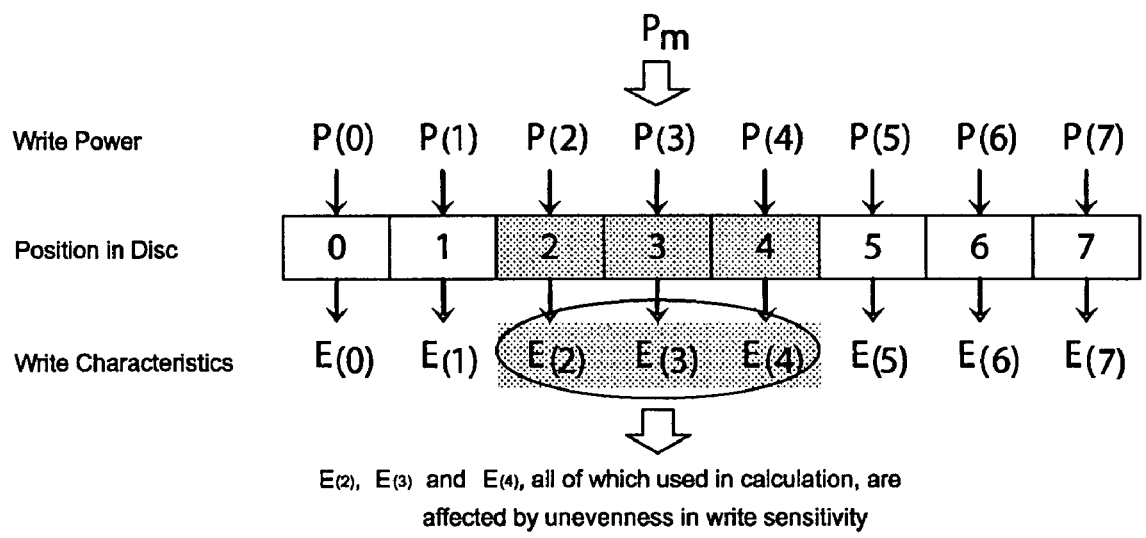
FIG. 26 shows the relationship, obtained by an OPC on an optical disc having the uneven write sensitivity distribution shown in FIG. 25, among the position in disc, the write power and the write characteristics.
Figure 27:
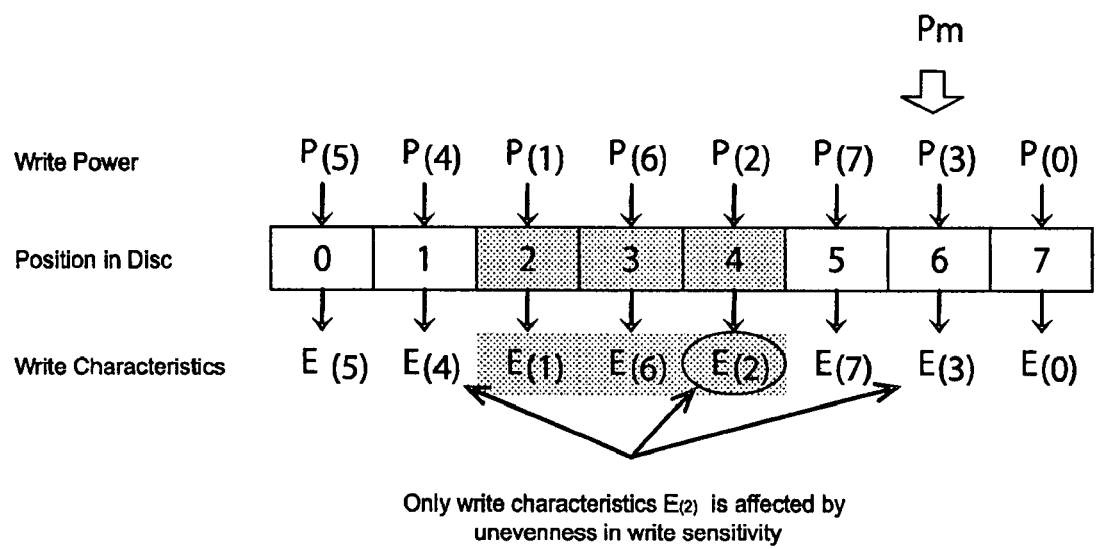
FIG. 27 shows the relationship among the position in disc, the write power, and the write characteristics in a method for determining the optimum write power according to an embodiment of the present invention.

FIG. 27 shows a principle of the twelfth to the nineteenth embodiments. What is shown in FIG. 27 is an example of the present invention applied to a case in which there is uneven write sensitivity shown in FIG. 26. Here, the order of write powers P(i) related to a position in disc is rearranged so as to make write powers with intensities next to each other are not arranged in succession. By performing test writing with such a write power series, write characteristics E(i) become less dependent on the position in disc. Specifically, in a scheme of related art shown in FIG. 26, all of the write characteristics E(2), E(3) and E(4) used in the Po-operation are affected by the uneven write sensitivity. In the example of FIG. 27, however, which is based on the principle of the twelfth to the nineteenth embodiments, only E(2) is affected by the uneven write sensitivity. Accordingly, the accuracy of Po thus obtained is improved significantly.

For an easy understanding of the explanation, each of the examples used thus far has uneven write sensitivity that happens only locally. In most of the actual cases, however, the unevenness in write sensitivity is scattered extensively on the optical disc 1, and a desirable value of the Po obtained by the OPC is a value that reflects the average write sensitivity of the optical disc 1. The twelfth to the nineteenth embodiments have an effect of discretely dispersing write characteristics used in the Po-operation with respect to the position in disc, and have an advantage that the Po thus obtained is closer to the average value than the Po obtained according to a method in related art is.

Next, embodiments of the present invention will be described specifically.

Twelfth Embodiment

Figure 28:
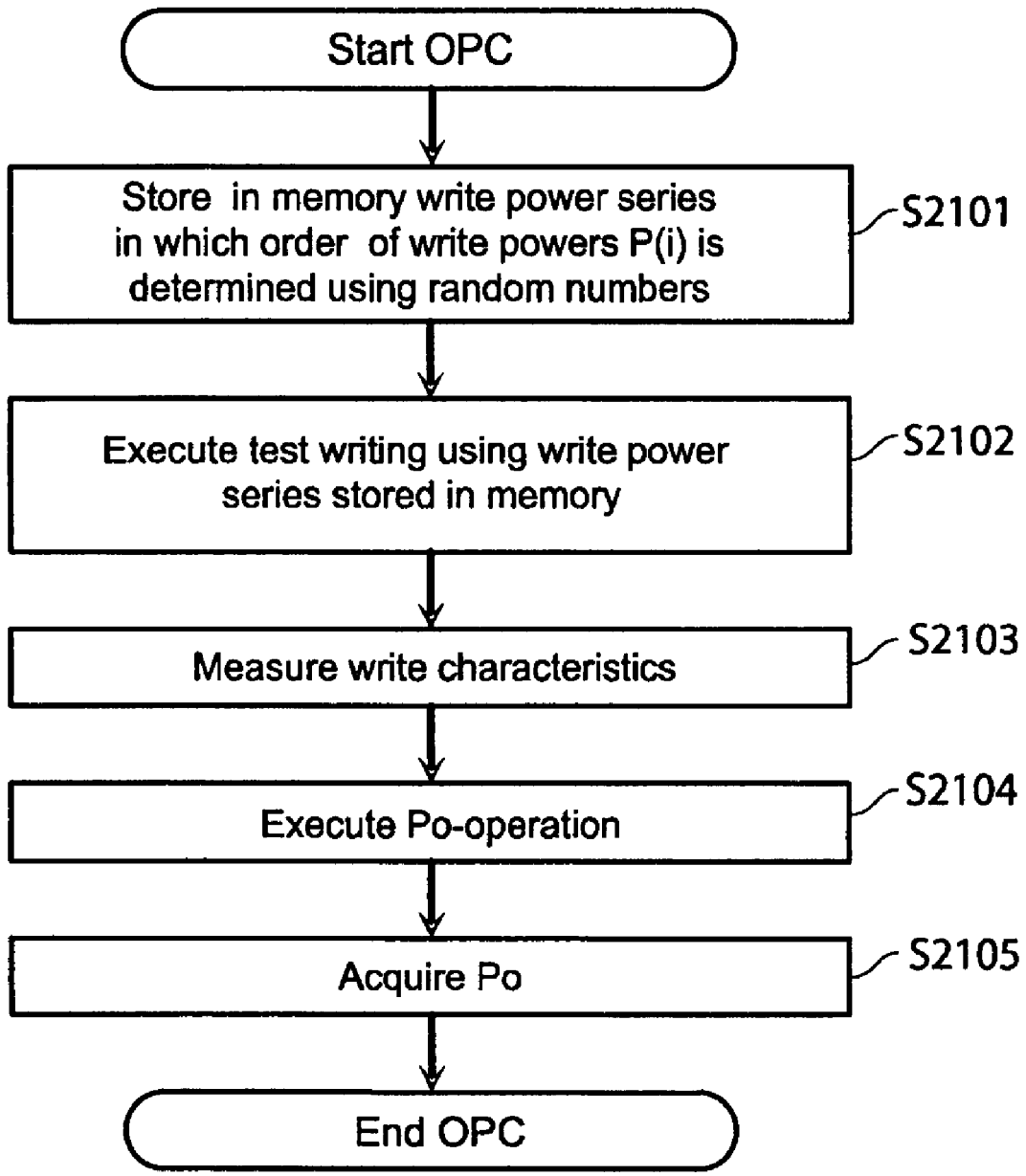
FIG. 28 is a flow chart showing the procedure of a method for determining the optimum write power according to a twelfth embodiment of the present invention.

FIG. 28 is a flow chart showing the procedure of a method for determining the optimum write power according to the twelfth embodiment of the present invention. This embodiment adopts a scheme in which the order of write powers P(i) in the write power series is rearranged using random numbers.

(Step S2101) To begin with, the control section 10 rearranges, by use of random numbers, the order of write powers P(i) from a write power series that has been given in advance, creates a new write power series in which write powers with intensities next to each other are not arranged in succession, and stores the new series in the memory of the control section 10. Here, the given write power series is a series in which write powers are arranged in order of intensity. In a case where two write powers with intensities next to each other happen to be placed in succession after the rearrangement using random numbers, one of the two write powers are replaced by another write power, or another rearrangement is performed to resolve such a problem.

(Step S2102) The control section 10 performs a control, and causes test writing in the optical disc 1 to be executed by use of write power series stored in the memory.

(Step S2103) Subsequently, the control section 10 causes the write characteristics measurement section 8 to measure the write characteristics in the position where the test writing is performed.

(Step S2104) Subsequently, the control section 10 causes the Po-operation to be executed by use of the write characteristics measured by the write characteristics measurement section 8.

(Step S2105) The value of Po obtained by following the procedure described above, is less affected by the uneven write sensitivity.

Thirteenth Embodiment

In the twelfth to the nineteenth embodiments, the order of write powers for test writing is intended to be less dependent on the uneven write sensitivity of the optical disc 1. For this reason, in each OPC, the test writing may be performed by use of a write power series stored in the memory previously. When information on the write power series is stored, a write power series originally given is rearranged, by use of random numbers, so as to make write powers with intensities next to each other are not arranged in succession. This way of performing test writing has an advantage that an optimum arrangement of write power is achieved. Specifically, positions corresponding to a certain write power P(i) and to another write power P(h), which write powers are adjacent to each other, are evenly distributed over the optical disc 1 with a certain distance in between.

Figure 29:
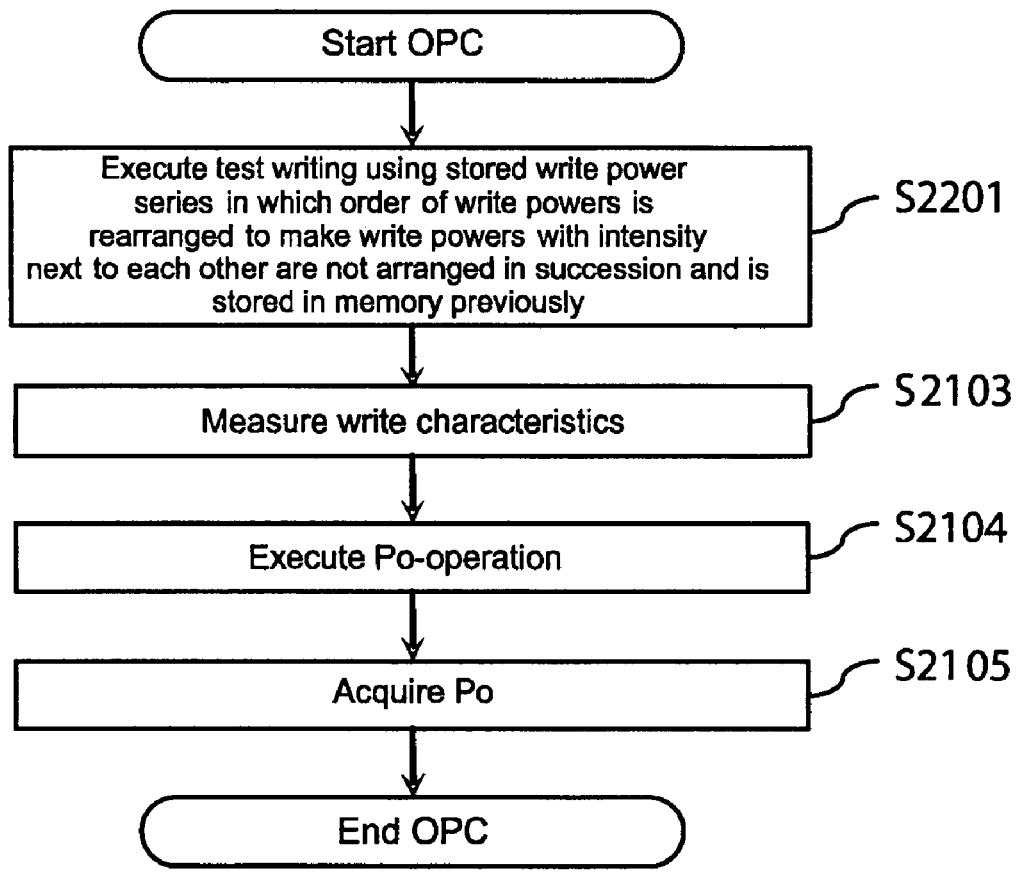
FIG. 29 is a flow chart showing the procedure of a method for determining the optimum write power according to a thirteenth embodiment of the present invention.

FIG. 29 is a flow chart showing the procedure of a method for determining optimum write power, to which method the way of performing test writing is applied, according to the thirteenth embodiment of the present invention.

(Step S2201) To begin with, the control section 10 performs a control, and causes test writing to be executed by use of the information on write power series stored in the memory previously, which series has write powers having been rearranged so as to make write powers with intensity next to each other are not arranged in succession. Only a single write power series may be stored in the memory. Alternatively, a plurality of write power series with different arrangement of write powers may be stored in the memory, and one of the stored series may be selected as appropriate to perform the test writing. The processes that follow are the same as those at steps S2103 to S2105 of the twelfth embodiment.

Fourteenth Embodiment

Uneven write sensitivity that affects the OPC also includes apparent unevenness in write sensitivity, which derives from misalignment in relative position or in angle with the optical lens, caused by warpage of the optical disc 1 or attachment error. When the recording track on the rotating optical disc 1 is scanned, the uneven write sensitivity of this type is observed as a write sensitivity fluctuation with a period equal to that of the rotation of optical disc 1 or with a period equivalent to a value obtained by dividing the rotation period by an integer. More accurate Po-operation can be performed by taking this periodicity of write sensitivity fluctuation into account when the rearrangement of write powers is performed.

Figure 30:
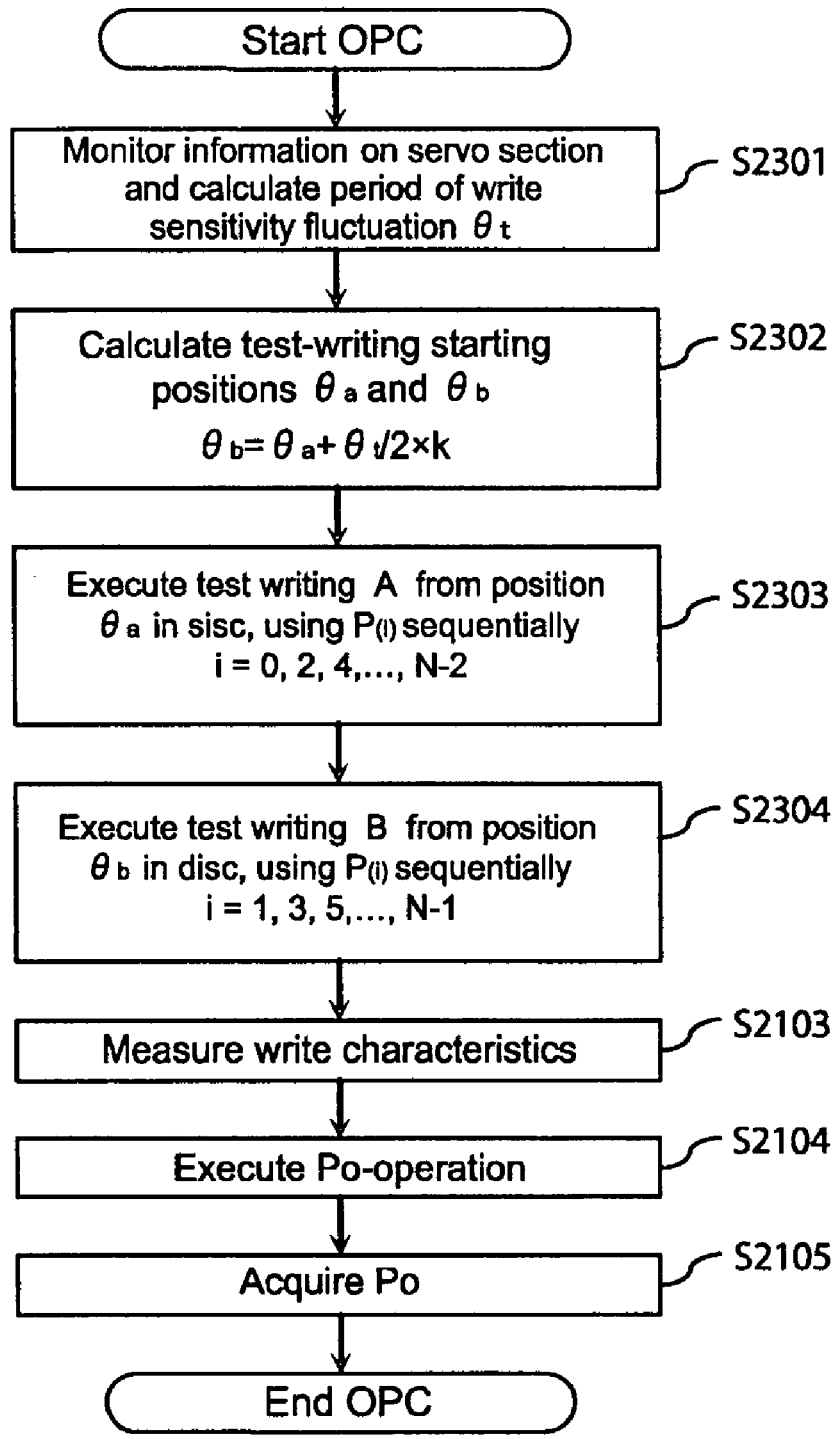
FIG. 30 is a flow chart showing the procedure of a method for determining the optimum write power according to a fourteenth embodiment of the present invention.
Figure 31:
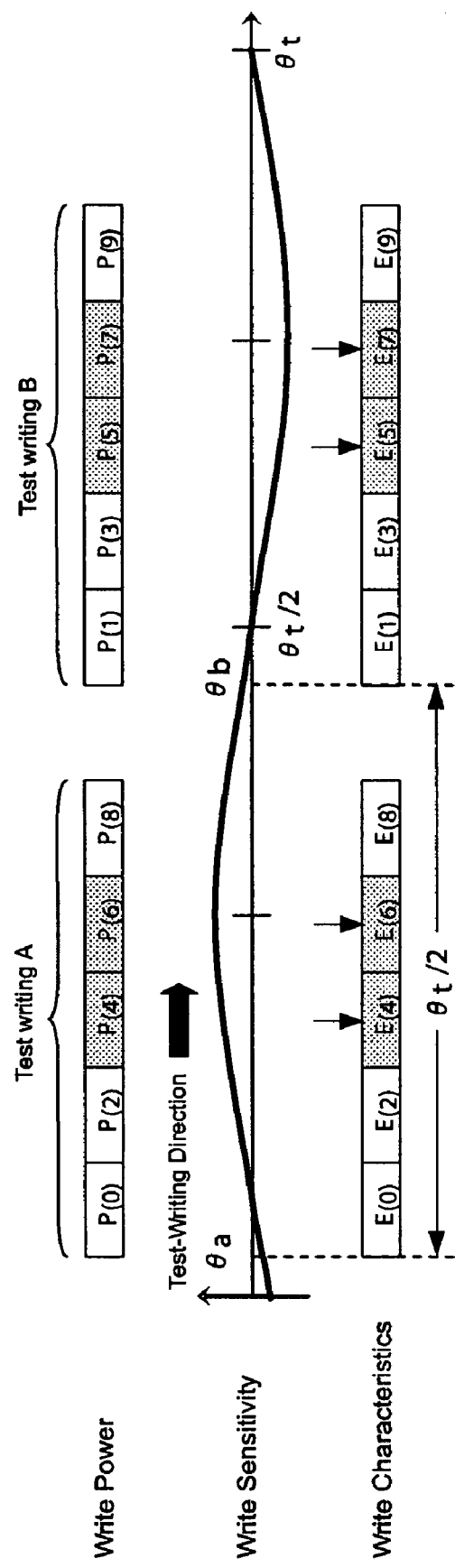
FIG. 31 shows the relationship among the position in disc, the write power and the write characteristics in the method for determining the optimum write power of the fourteenth embodiment.

FIG. 30 is a flow chart showing the procedure of a method for determining optimum write power, to which method this way of rearrangement is applied, according to the fourteenth embodiment of the present invention. FIG. 31 shows the relationship among the position in disc, the write powers P(i) and the write characteristics E(i) in a case where this way of rearrangement is adopted.

For a simple explanation, it is assumed, here, that the number of data in the write power series is set at ten (N=10), and that write sensitivity fluctuation has a sine wave pattern with a period θt. FIG. 31 shows a state in which {P(5)+P(6)}/2 is selected as Pm, while the write characteristics used in the Po-operation are E(4), E(5), E(6), and E(7).

According to the characteristics of a sine wave, the average of the sensitivity in a certain position θa, and the sensitivity of a position θb that is away from θa by a distance of θt/2×k (k is an odd number) is approximately equal to the average sensitivity of the whole of the optical disc 1. For this reason, by arranging the write powers P(i) and the write powers P(i+1), which have intensities next to each other, in the positions θa and θb, respectively, a value of Po thus obtained becomes closer to the average sensitivity.

In the example of FIG. 31, a test writing A starts from the position θa, and the next test writing B starts from the position θb that is away from the position θa by θt/2. In the test writing A, the test writing is performed with write powers P(i) in which i is an even number, while in the test writing B, test writing is performed with write powers P(i+1), in which one is added to the corresponding i in test writing A, that is, i is an odd number. By performing the test writing in this way, the distance between the write position with the write powers P(i) and the write position with the write power P(i+1) is always equal to θt/2.

What follows is a description, with reference to FIG. 30, of the procedure of a method for determining optimum write power according to the fourteenth embodiment, which method takes advantage of the characteristics described above.

(Step S2301) Since information on the rotating speed of the optical disc 1, the tilt from the optical axis, and the like is obtained by the servo section 5, the control section 10 observes this information, and then calculates the write sensitivity period θt. Here, the value of θt may be measured by performing a measurement for several periods. Alternatively, the value of θt may be calculated from the observation measurement result for approximately one-fourth period, as long as sufficient accuracy can be obtained.

(Step S2302) Subsequently, on the basis of the starting position θa of the test writing, the control section 10 calculates the next starting position θb by use of the following formula.

$$\theta b = \theta a + \theta t/2 \times k \text{ (k is an odd number)} \tag{12}$$

Here, taking the length of the recording track used for the test writing into consideration, a desirable value of k is one because a smaller value is more efficient. However, in a case where the test writing starting from the position θa laps over the position θb, the value k may be a larger value as appropriate.

(Step S2303) Subsequently, the control section 10 performs a control, and causes the test writing to be executed starting from the position θa with write powers P(i) in which is an even number. To the order of write powers in the write power series, the following formula is applied.

$$i=0,2,4,\ldots,N-2 \tag{13}$$

(Step S2304) Subsequently, the control section 10 performs a control and causes the test writing to be executed starting from the position θb with write powers P(i) in which is an odd number. To the order of write powers in the write power series, the following formula is applied.

$$i=1,3,5,\ldots,N-1 \tag{14}$$

Note that, the step S2303 and the step S2304 may be a consecutive series of writing operations.

The operations that follow are the same as those at the steps S2103 to S2105 of the twelfth embodiment.

Fifteenth Embodiment

In the fourteenth embodiment, the write powers P(i) used in the test writing starting from the position θa or the position θb, are arranged in order of intensity. The order, however, may be rearranged by use of random numbers as in the twelfth embodiment.

Figure 32:
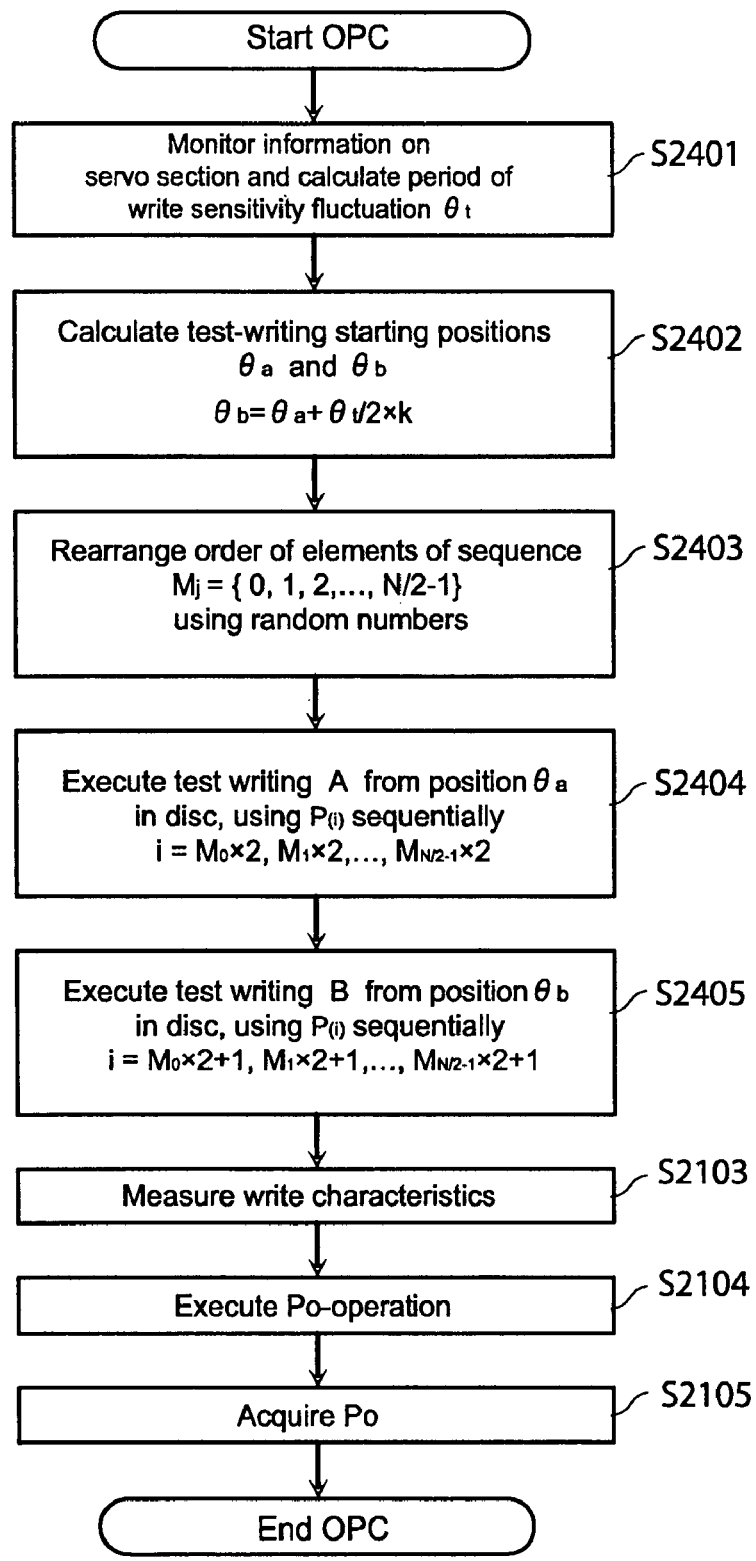
FIG. 32 is a flow chart showing the procedure of a method for determining the optimum write power according to a fifteenth embodiment of the present invention.
Figure 33:
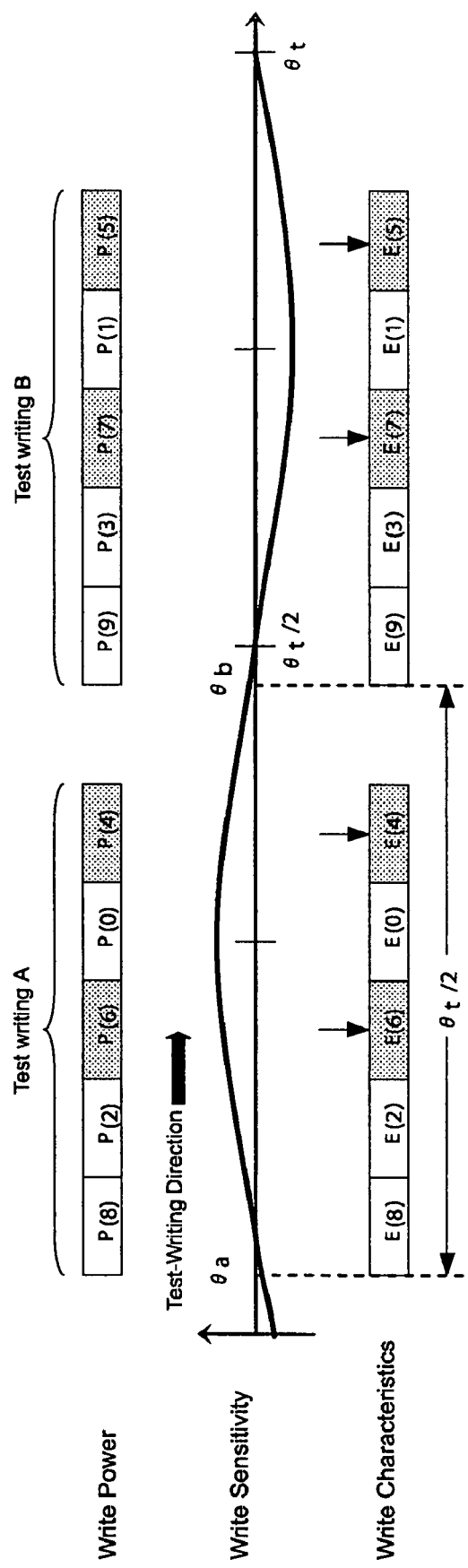
FIG. 33 shows the relationship among the position in disc, the write power and the write characteristics in the method for determining the optimum write power of the fifteenth embodiment.

FIG. 32 is a flow chart showing the procedure of a method for determining optimum write power, to which method this way of rearrangement is applied, according to the fifteenth embodiment of the present invention. FIG. 33 shows the relationship among the position in disc, the write powers P(i) and the write characteristics E(i) in a case where this way of rearrangement is adopted.

(Step S2401) Since information on the rotating speed of the optical disc 1, the tilt from the optical axis, and the like is obtained with the servo section 5, the control section 10 observes this information, and then calculates the write sensitivity period θt. Here, the value of θt may be measured by performing a measurement for several periods. Alternatively, the value of θt may be calculated from the observation measurement result for approximately one-fourth period, as long as sufficient accuracy can be obtained.

(Step S2402) On the basis of the starting position θa of the test writing, the control section 10 calculates the next starting position θb by use of the formula (12).

Here, taking the length of recording track used for the test writing into consideration, a desirable value of k is one because a smaller value is more efficient. However, in a case where the test writing starting from the position θa laps over the position θb, the value k may be a larger value as appropriate.

(Step S2403) The control section 10 creates an array Mj which has different elements of 0, 1, 2, ..., and N/2−1, and then rearrange the order of the elements.

$$Mj=\{0,1,2,\ldots,N/2-1\}$$

$$(j=0,1,2,\ldots,N/2-1) \quad (15)$$

(Step S2404) Subsequently, the control section 10 performs a control and causes the test writing to be executed starting from the position θa. To the order of write powers P(i) in the write power series used at this time, the following formula is applied.

$$i=Mj\times 2\,(j=0,1,2,\ldots,N/2-1) \quad (16)$$

(Step S2405) Subsequently, the control section 10 performs a control, and causes the test writing to be executed starting from the position θb. To the order of write powers P(i) in the write power series used at this time, the following formula is applied.

$$i=Mj\times 2+1\,(j=0,1,2,\ldots,N/2-1) \quad (17)$$

The operations that follow are the same as those at steps S2103 to S2105 of the twelfth embodiment.

Sixteenth Embodiment

Since even information on period roughly estimated has a certain effect, the period of write sensitivity θt is calculated from the shape and the characteristics of the optical disc 1 in advance, and an order of write powers by taking the write sensitivity thus calculated into consideration. For example, as FIG. 33 shows, an order of write powers is stored in the memory of the control section 10 after the write powers are rearranged so as to make write powers with intensities are not arranged in succession. Then, in every OPC, the test writing is performed by use of this stocked order. This method has an advantage that the order of write powers is constantly optimized as the thirteenth embodiment.

Figure 34:
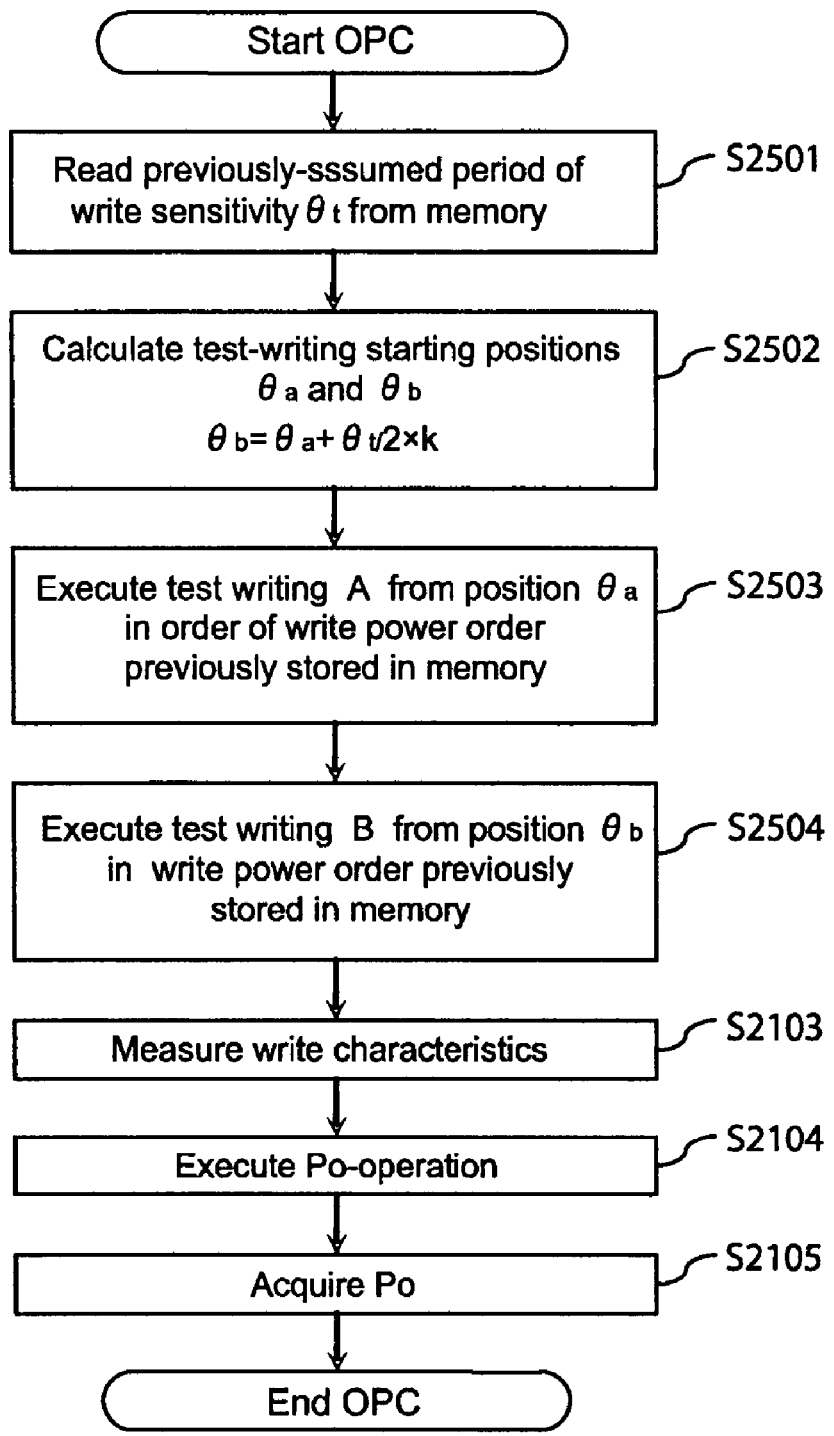
FIG. 34 is a flow chart showing the procedure of a method for determining the optimum write power according to a sixteenth embodiment of the present invention.

FIG. 34 is a flow chart showing the procedure of a method for determining optimum write power, in which the above-described way of test writing is employed, according to the sixteenth embodiment of the present invention.

(Step S2501) To begin with, the control section 10 reads, from the memory, information on the period, assumed in advance, of write sensitivity θt of the optical disc 1.

(Step S2502) Subsequently, the control section 10 sets the starting position of the test writing at θa, and then calculates the next position θb by use of the formula (12).

(Step S2503) Subsequently, the control section 10 reads, from the memory, the order of write power for the test writing starting from the position θa, and causes the test writing A starting from the position θa. Here, only a single set of order of write power may be stored in the memory. Alternatively, several sets of order of write power may be stored in the memory, and an appropriate set of order may be chosen from those stored.

(Step S2504) Subsequently, the control section 10 reads, from the memory, the order of write powers for the test writing starting from the position θb, and causes the test writing B starting from the position θb. Also in this case, several sets of order of write powers may be stored in the memory, and an appropriate set of order may be chosen from those stored.

The operation that follow are the same as those at steps S2103 to S2105 in the twelfth embodiment.

As a matter of convenience in explanation, steps S2501, S2502, S2503 and S2504 are described separately. In practice, however, these processes may be integrated to make a series of consecutive operations of test writing.

Seventeenth Embodiment

In the optical disc 1, write sensitivity differs between a track located in an inner circumferential side (hereafter, referred to as inner track) and a track located in an outer circumferential side (hereafter, outer track). In this case, effective test writing is performed by use of a write power series that has been rearranged so as to make write powers with intensities next to each other are not arranged in succession while the difference of write sensitivity between an inner and an outer tracks of the optical disc 1 is taken into consideration.

Figure 35:
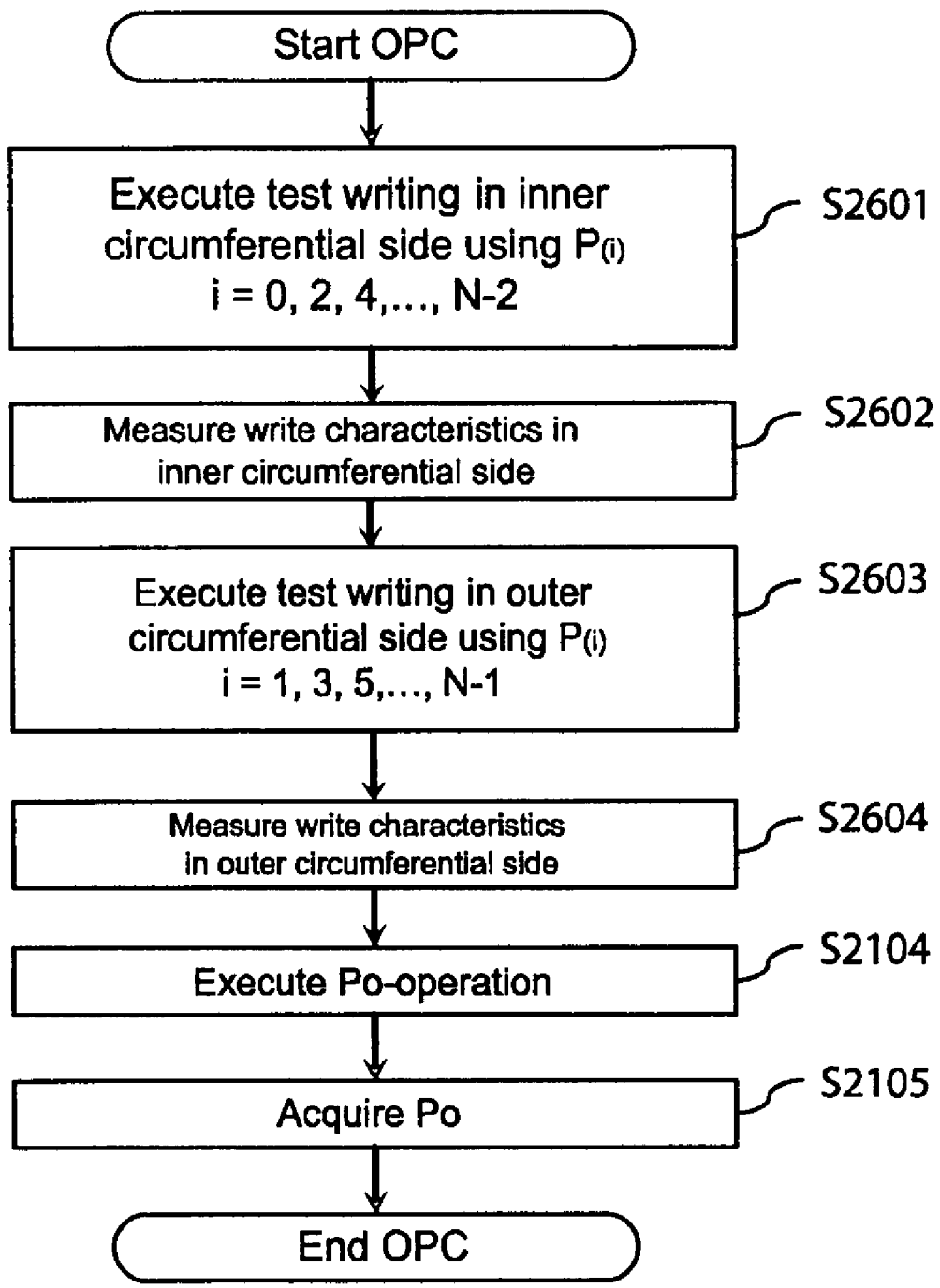
FIG. 35 is a flow chart showing the procedure of a method for determining the optimum write power according to a seventeenth embodiment of the present invention.
Figure 36:
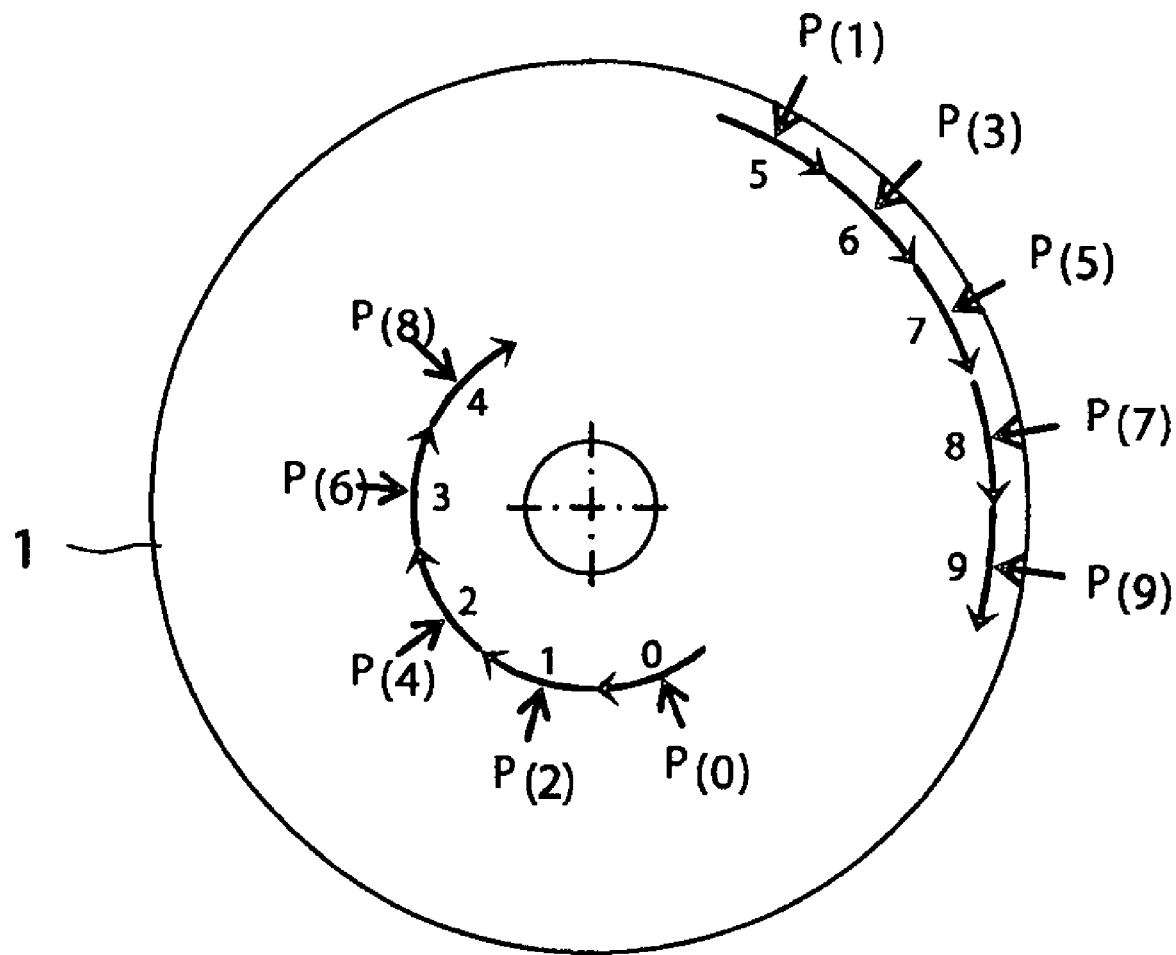
FIG. 36 shows, in the method for determining the optimum write power according to the seventeenth embodiment, the order of the write powers for the inner circumferential side and the outer circumferential side of the optical disc.

FIG. 35 is a flow chart showing the procedure of a method for determining optimum write power, to which method the way of rearrangement is applied, according to the seventeenth embodiment of the present invention. FIG. 36 shows the write power series P(i) for the positions located in an inner and an outer circumferential sides of the optical disc 1. FIG. 36 shows that, in this embodiment, the test writing is performed in a position located in an inner side of the optical disc 1, by use of write powers P(i) in which i is an even number, and in a position located in an outer side of the optical disc 1, by use of write powers P(i) in which i is an odd number.

What follows is a description, with reference to the flow chart of FIG. 35, of the operations in this embodiment.

(Step S2601) To begin with, the control section 10 performs a control, and causes the test writing to be executed in a position in an inner circumferential side of the optical disc 1 by use of P(i) in which i is an even number.

(Step S2602) Subsequently, the control section 10 causes the write characteristics measurement section 8 to measure the write characteristics in the position which is located in an inner circumferential side, and in which the test writing is executed.

(Step S2603) Subsequently, the control section 10 causes the test writing to be executed in a position in an outer circumferential side of the optical disc 1 by use of P(i) in which i is an odd number.

(Step S2604) Subsequently, the control section 10 causes the write characteristics measurement section 8 to measure the write characteristics in the position which is located in an outer circumferential side, and in which the test writing is executed.

The operations that follow are the same as those at steps S2104 and S2105 in the twelfth embodiment.

Eighteenth Embodiment

The order of write powers used in test writing for each of an inner and an outer circumferential sides may be rearranged by use of random numbers as in the thirteenth embodiment.

Figure 37:
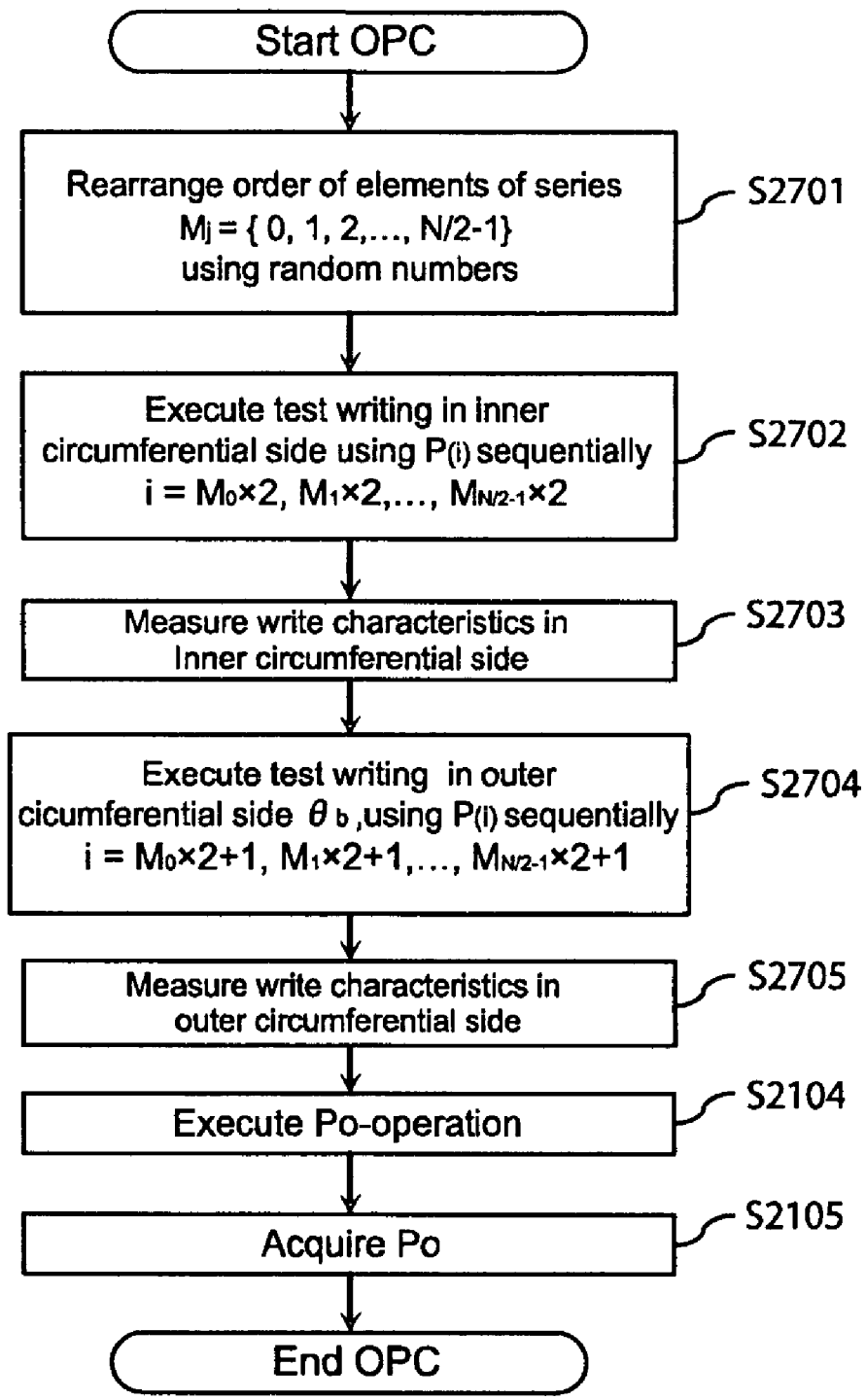
FIG. 37 is a flow chart showing the procedure of a method for determining the optimum write power according to an eighteenth embodiment of the present invention.
Figure 38:
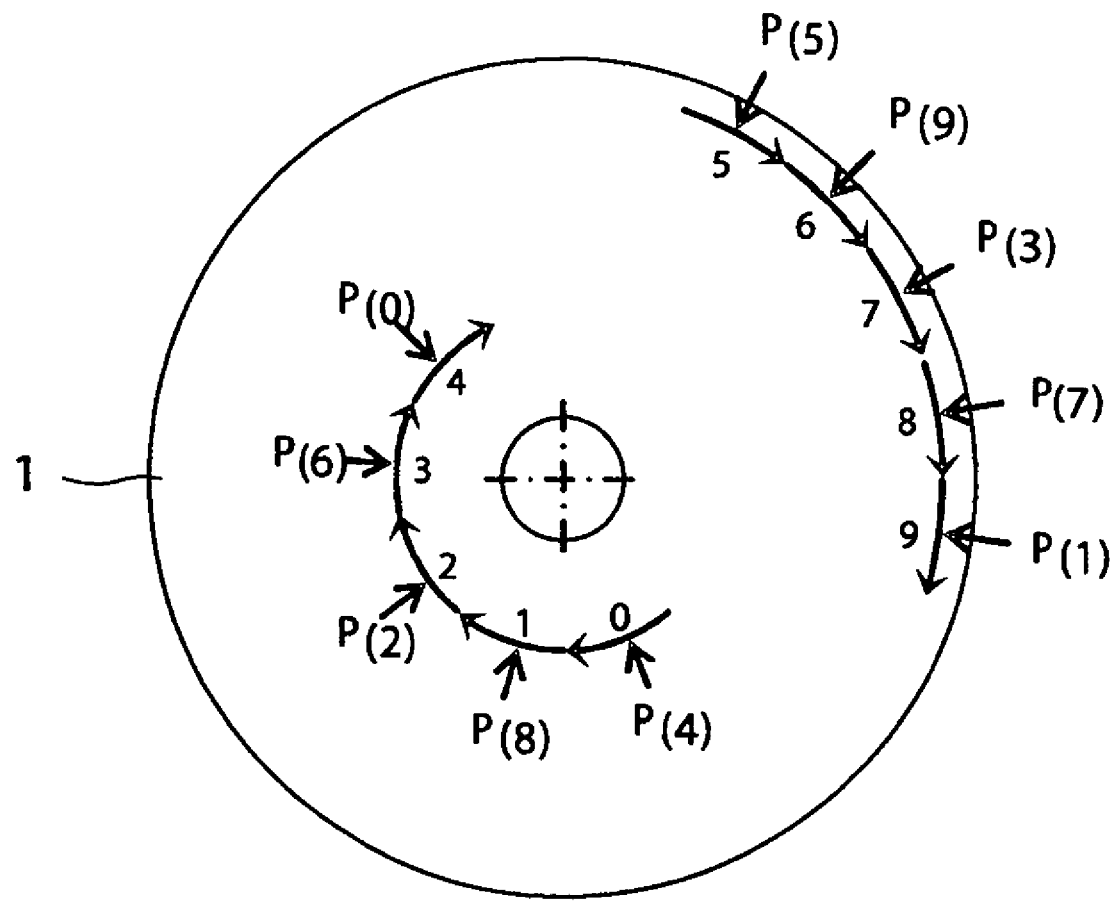
FIG. 38 shows; in the method for determining the optimum write power according to the eighteenth embodiment, the order of the write powers for the inner circumferential side and the outer circumferential side of the optical disc.

FIG. 37 is a flow chart showing the procedure of method for determining optimum write power, to which method the way of rearrangement is applied, according to the eighteenth embodiment of the present invention. FIG. 38 shows the order of write powers P(i) for an inner circumferential side of optical disc 1 and that for an outer circumferential side.

(Step S2701) To begin with, the control section 10 creates an array Mj which is defined by formula (15), and which has different elements 0, 1, 2, ..., N/2−1. Then, the control section 10 rearranges the order of the elements.

(Step S2702) Subsequently, the control section 10 performs a control, and causes the test writing to be executed in an inner circumferential side of the optical disc 1. At this time, formula (16) is applied to the order of write powers.

(Step S2703) Subsequently, the control section 10 causes the write characteristics measurement section 8 to measure the write characteristics in the position which is located in an inner circumferential side and in which the test writing is executed.

(Step S2704) Subsequently, the control section 10 performs a control, and causes the test writing to be executed in an outer circumferential side of the optical disc 1. At this time, the formula (17) is applied to the order of write powers.

(Step S2705) Subsequently, the control section 10 causes the write characteristics measurement section 8 to measure the write characteristics in the position which is located in an outer circumferential side, and in which the test writing is executed.

The operations that follow are the same as those at steps S2104 and S2105 in the twelfth embodiment.

Nineteenth Embodiment

As in the thirteenth embodiment, the order of write powers for test writing performed in a position located in an inner circumferential side of the optical disc 1 and that in an outer circumferential side may be determined in advance, and then may be stored in the memory of the control section 10.

Figure 39:
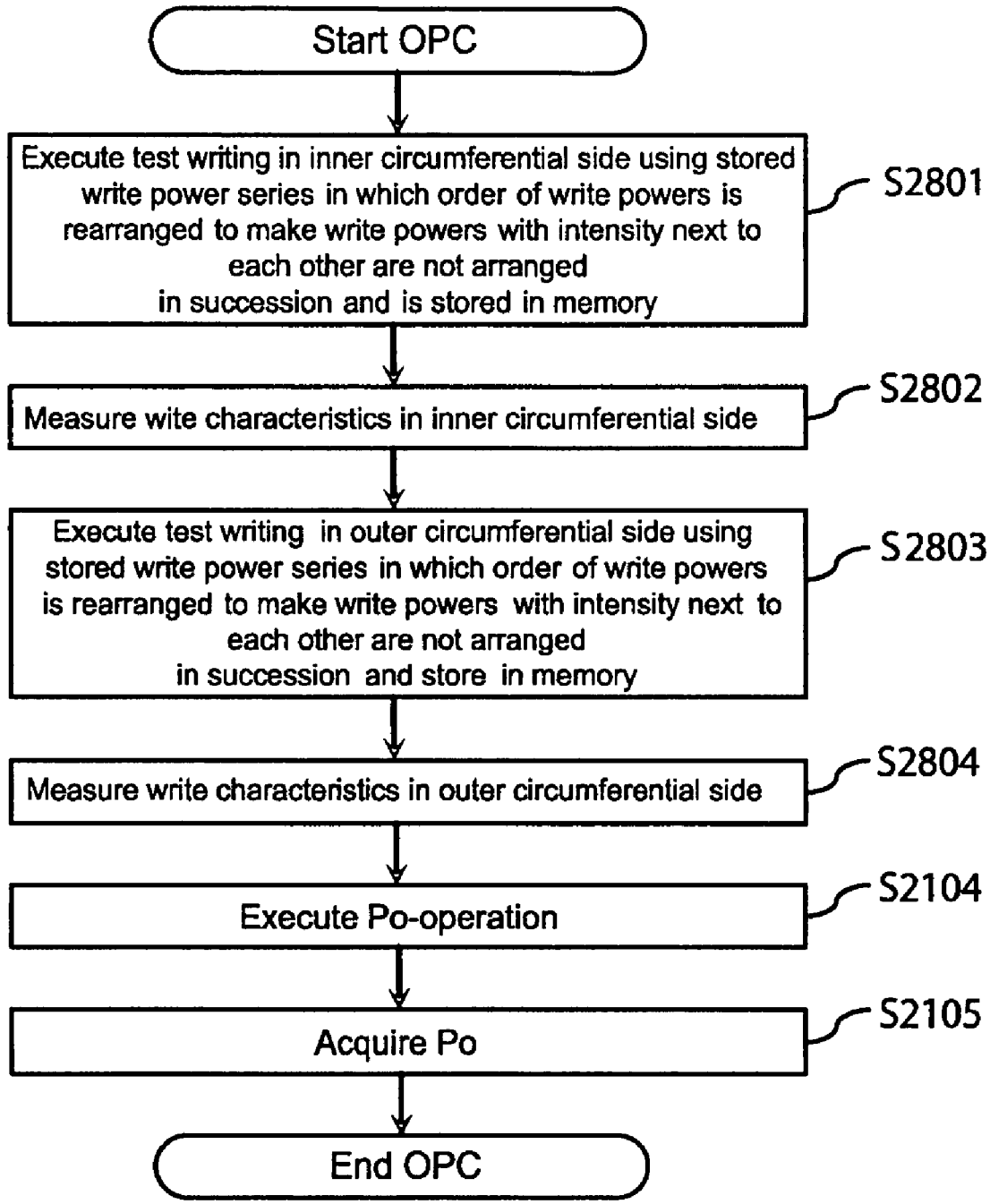
FIG. 39 is a flow chart showing the procedure of a method for determining the optimum write power according to a nineteenth embodiment of the present invention.
Figure 40:
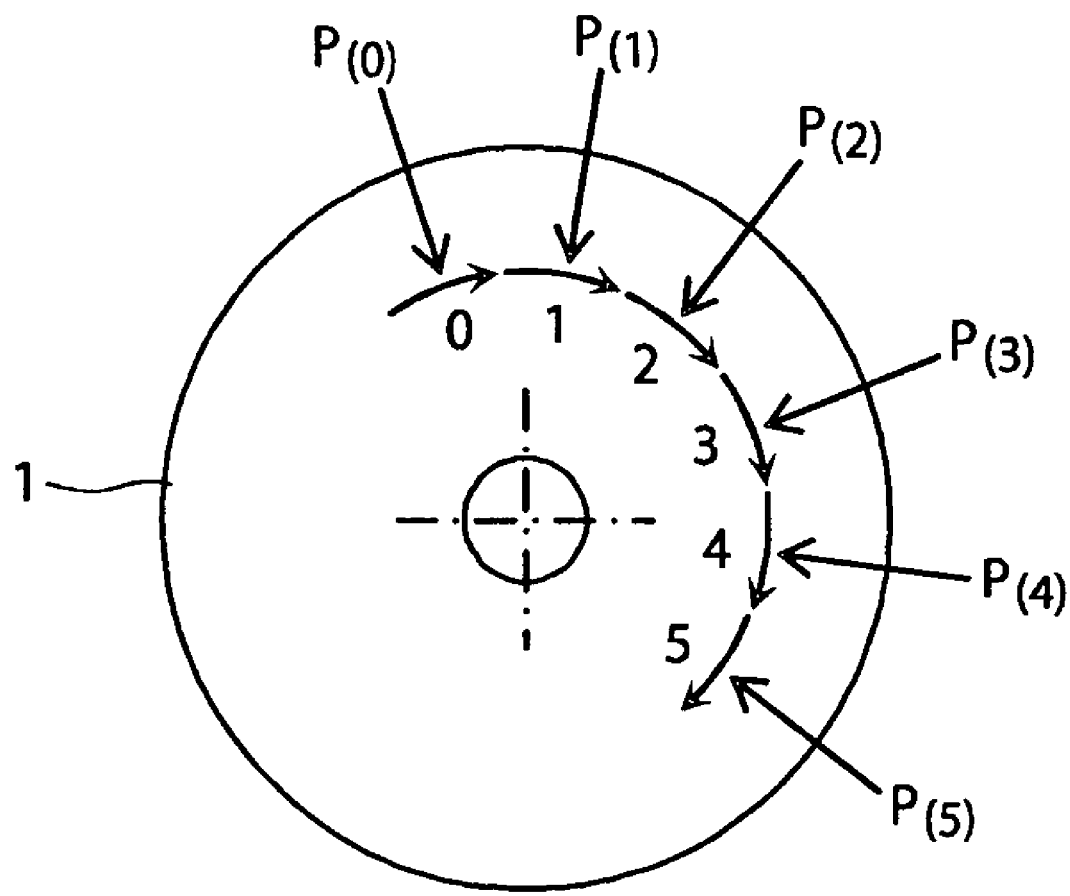
FIG. 40 is a chart for explaining an OPC method in related art.
Figure 41:
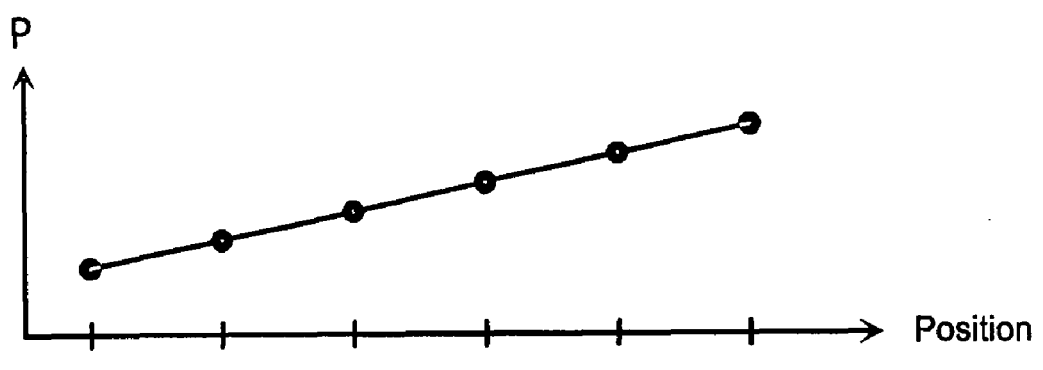
FIG. 41 is a chart for explaining a problem of an OPC method in related art.
Figure 41:
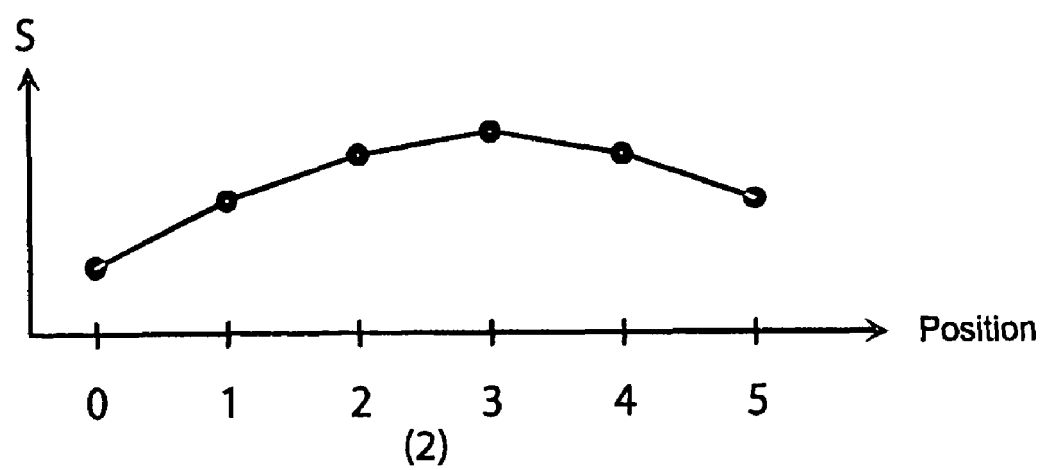
Figure 41:
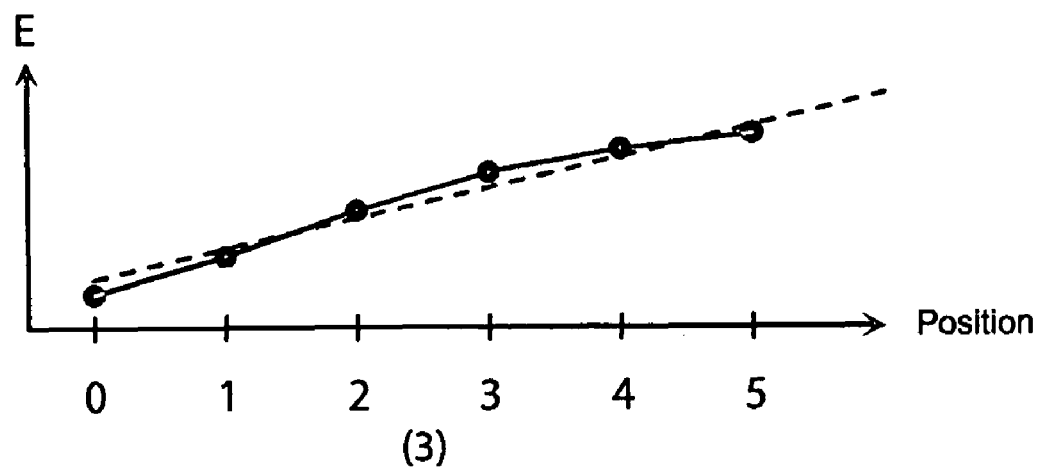

FIG. 39 is a flow chart showing the procedure of a method for determining optimum write power, to which method the way of using a storage is applied, according to the nineteenth embodiment of the present invention.

(Step S2801) To begin with, the control section 10 causes the test writing to be executed in a position located in an inner circumferential side of the optical disc 1 by use of the write power series for the inner circumferential side, which write power series is stored in the memory previously. A single type of order of write powers may be stored in the memory. Alternatively, several types of orders of write powers may be stored in the memory, and an appropriate one of those stored may be chosen.

(Step S2802) Subsequently, the control section 10 causes the write characteristics measurement section 8 to measure the write characteristics in the position which is located in an inner circumferential side, and in which the test writing is executed.

(Step S2803) Subsequently, the control section 10 causes the test writing to be executed in a position located in an outer position of the optical disc 1, following the order of write powers stored in the memory previously. Only a single order of write powers may be stored in the memory. Alternatively, several types of orders of write powers may be stored in the memory, and an appropriate one of those stored may be chosen.

(Step S2804) Subsequently, the control section 10 causes the write characteristics measurement section 8 to measure the write characteristics in the position which is located in an outer circumferential side, and in which the test writing is executed.

The operations that follow are the same as those at steps S2104, S2105 in the twelfth embodiment.

What have been shown thus far are some embodiments related to a method of calculating the Po through test writing performed by use of write power series that has been rearranged so as to make write powers with intensity next to each other are not arranged in succession. The present invention including the concepts of the twelfth to the nineteenth embodiments is not limited to what has been shown in these embodiments. Other methods may be employed as long as the intensity of write power becomes less dependent on the relative position in the optical disc 1.

According to the twelfth to the nineteenth embodiments described thus far, the influence of the uneven write sensitivity in the OPC can be reduced easily. With a more accurate OPC, even in an optical disc 1 that has little performance margin to write power error, a desired write performance can be obtained.

In related art, examples of measures taken to alleviate the influence of the uneven write sensitivity include a pre-processing that precedes the test writing, the OPC that is repeatedly performed a plurality of times, and the elongated physical length of the test writing. In the twelfth to the nineteenth embodiments, however, the method of test writing itself has an effect of reducing uneven write sensitivity. Accordingly, no pre-processing or no repetition of the OPC is necessary, resulting in a shorter time for performing the OPC. The physical length for test writing can be made shorter, so that the recording area of the optical disc 1 is not wasted.

In addition, the twelfth to the nineteenth embodiments are easily used together with methods in related art, so that effects of further alleviating the influence of the uneven write sensitivity are expected.

What has been described in the twelfth to the nineteenth embodiments is as follows. Attention is focused on the fact that most of the unevenness in write sensitivity depends on the position in disc, so that the test writing is not performed by use of a write power series in which the write powers is arranged in order from the largest downward. Rather, in these embodiments, the test writing is performed by changing the order in accordance with an appropriate method. Specifically, the test writing is performed with a write power series in which the write powers are rearranged such that write powers with their intensities next to each other are not arranged in succession. In this way, the dependence on the position in disc is eliminated, and the influence of the uneven write sensitivity is alleviated.

Next, still other embodiments (a twentieth to a twenty-third embodiments) of the present invention will be described.

In the twentieth to the twenty-third embodiments, test writing is performed by discretely arranging a certain power Pt for monitoring the write sensitivity fluctuation among the write power series for test P(i). Then, the write sensitivity fluctuation of the optical disc 1 is calculated from the write characteristics of the positions where the test writing is performed. Additionally, in the twentieth to the twenty-third embodiments, correction is made by converting the amount of fluctuation into the amount of change in the variables used for calculating the optimum write power, such as the amount of change in the write power or in the write characteristics. Then, the Po is calculated by use of the corrected result. In this way, a more accurate OPC becomes possible.

Hereafter, description will be given of methods for determining the optimum write power according to the twentieth to the twenty-third embodiments.

Twentieth Embodiment

Figure 42:
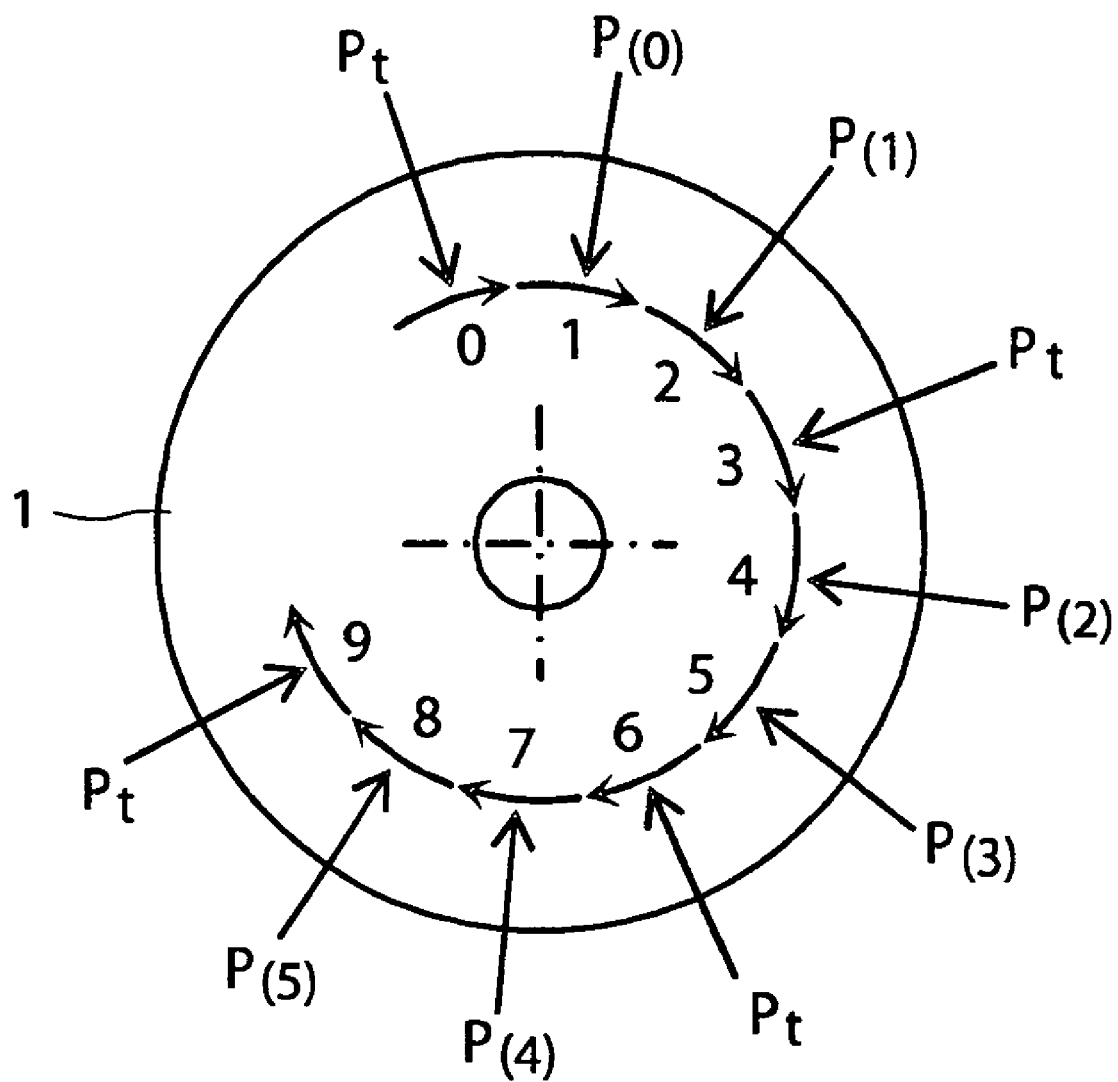
FIG. 42 is a schematic diagram showing a test writing method in a method for determining the optimum write power according to a twentieth embodiment of the present invention.

FIG. 42 is a schematic diagram showing a way of test writing in a method for determining optimum write power according to the twentieth embodiment of the present invention. Here, each of the circular arc arrows represents a recording track along which test writing is performed with a specific write power. The circular series of arrows represent how the test writing is performed with the write power being changed by the OPC. The numbers from 0 to 9, each placed on the inner side of each arrow, represent the position j on the disc. Write powers with which test writing is performed along the recording tracks, each indicated by the corresponding arrow, are represented by Pt and P(i). While Pt represents a constant power for monitoring the write sensitivity fluctuation, P(i) represents a write power series for test writing.

For a simple explanation, the number N of write powers for test writing in the write power series P(i), in this embodiment, is set at 6, but the present invention is not limited to this. Additionally, test writing with the power Pt for monitoring the write sensitivity fluctuation is performed, in this embodiment, in positions in disc at even intervals, specifically, in positions 0, 3, 6, and 9. As long as such positions are discretely arranged, the positions may not be arranged at even intervals.

Figure 43:
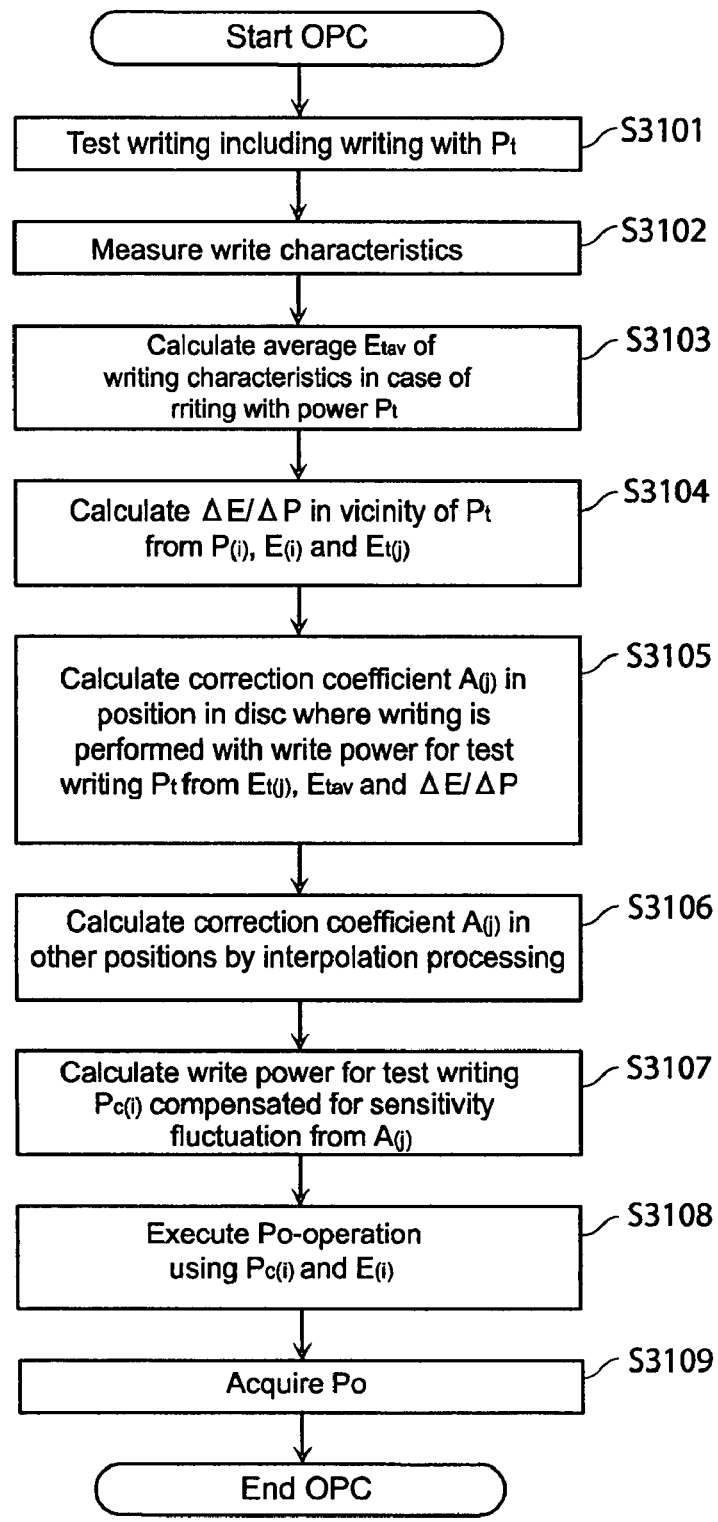
FIG. 43 is a flow chart showing the method for determining the optimum write power according to the twentieth embodiment.
Figure 44:
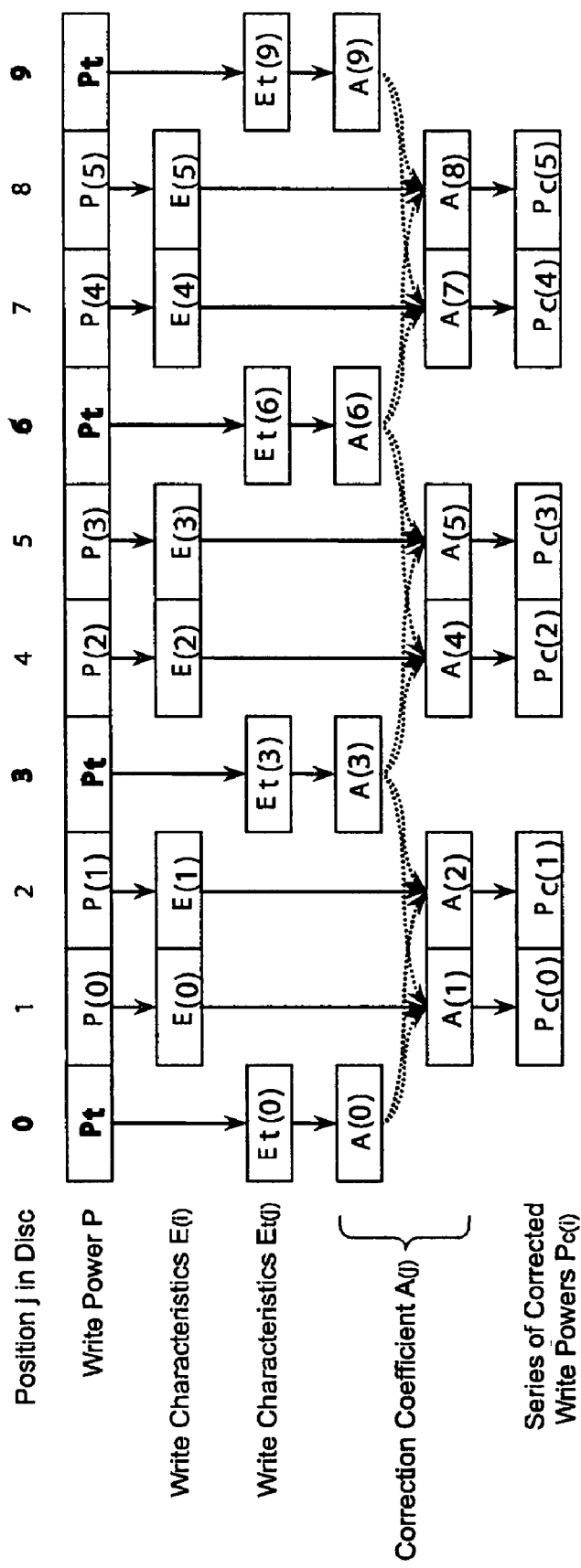
FIG. 44 schematically shows the relationship among variables in the method for determining the optimum write power according to the twentieth embodiment.

FIG. 43 is a flow chart showing a method for determining optimum write power in a case where a method in which the values of write power are corrected is employed as a method of correcting the influence of the write sensitivity fluctuation. FIG. 44 schematically shows the relationships among variables in the method for determining optimum write power of this embodiment. In FIG. 44, E(i) represents write characteristics measured in corresponding positions where test writing is performed with the write power series P(i). Et(j) represents write characteristics measured in corresponding positions j in disc where test writing is performed with the power Pt for monitoring the write sensitivity fluctuation. A correction coefficient A(j) is used in correcting the write sensitivity in the corresponding position j in disc. Pc(i) represents a write power series that have been corrected by converting the amount of fluctuation in write sensitivity into write power.

What follows is a specific procedure in a method for determining optimum write power of this embodiment.

(Step S3101) To begin with, as the example of FIG. 42 shows, test writing is performed with the write power series P(i) in the optical disc 1 where the positions subjected to the test writing with the power Pt for monitoring the write sensitivity fluctuation are discretely arranged.

(Step S3102) The write characteristics E(i) and Et(j) are measured in the positions where the test writing is performed.

(Step S3103) The average value Etav of the write characteristics (Et(0), Et(3), Et(6), and Et(9)), which correspond to the positions where test writing is performed with the power Pt for monitoring the write sensitivity fluctuation, is calculated in accordance with the following formula.

$$Etav=\{Et(0)+Et(3)+Et(6)+Et(9)\}/4 \quad (18)$$

Figure 45:
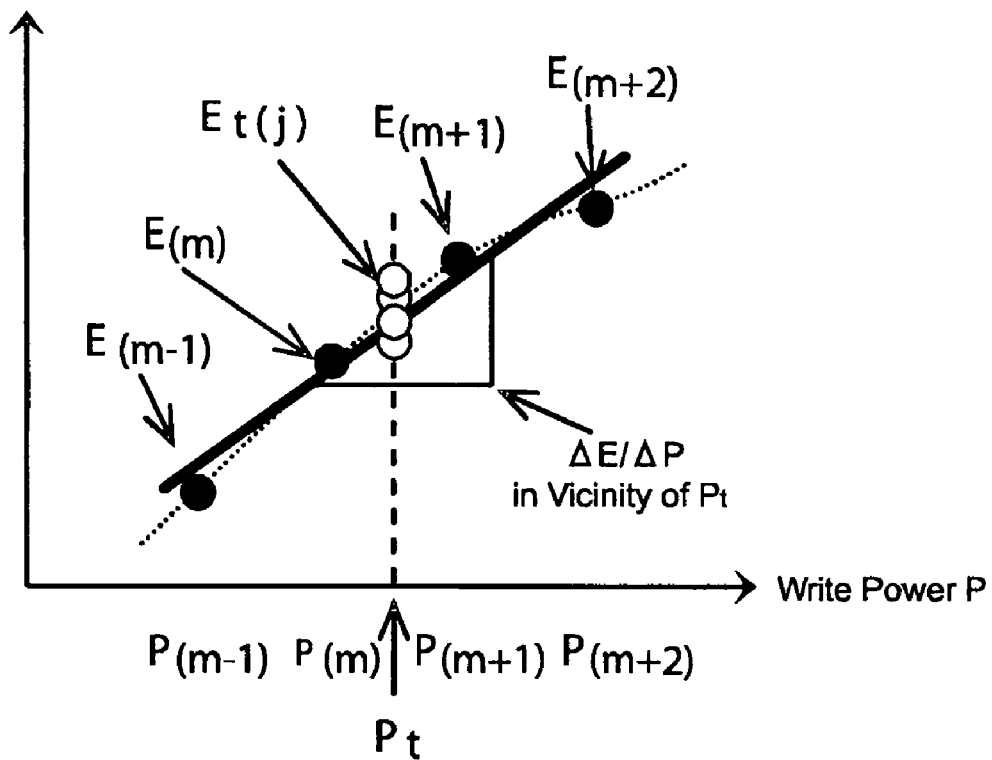
FIG. 45 is a chart related to a calculation method for the rate ΔE/ΔP, the rate of variation of the write characteristics to the write powers in the vicinity of the write power Pt for monitoring the fluctuation period of write sensitivity.

(Step S3104) As FIG. 45 shows, the ratio $\Delta E/\Delta P$, the ratio of change in write characteristics to the change in the write power in the vicinity of the power Pt for monitoring the write sensitivity fluctuation, is calculated. The calculation is performed on the basis of the power Pt for monitoring the write sensitivity fluctuation and the corresponding write characteristics Et(j), as well as the powers P(i) for test writing in the vicinity of the power Pt and the corresponding write characteristics E(i).

(Step S3105) The difference between the write characteristics Et(j) and the average value Etav reflects the amount of change in write sensitivity. In this embodiment, the amount of change in write sensitivity is converted into the amount of change in write power to perform correction. For this purpose, the conversion coefficient (correction coefficient) A(j), is calculated for each of the positions in disc (0, 3, 6, and 9) where test writing is performed with the power Pt for monitoring the write sensitivity fluctuation. The calculation is performed by use of the following formula.

$$A(j)=\{(Et(j)-Etav)\cdot\Delta P/\Delta E\}/Pt \quad (19)$$

Figure 46:
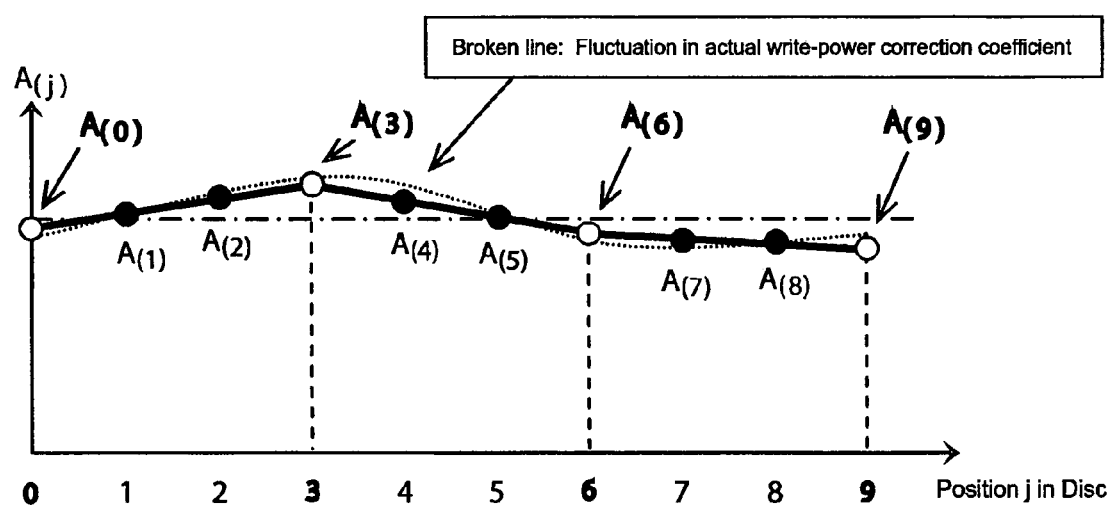
FIG. 46 is a chart related to an interpolation processing for a write power compensating coefficient.

(Step S3106) As FIG. 46 shows, on the basis of the write power conversion coefficient (correction coefficient) A(j) obtained at step S3105, the conversion coefficients (correction coefficients) A(j) for other positions in disc are calculated by an interpolation processing.

As a method of interpolation processing, the simple method of liner interpolation may be employed, but the present invention is not limited to this method.

(Step S3107) The amount of change in write sensitivity is converted into the equivalent amount of change in write power, and then the correction is made using this amount of change in write power. In other words, the series of corrected write power Pc(i) is calculated in accordance with the following formula.

$$Pc(i)=\{1+A(j)\}\cdot P(i) \quad (20)$$

(Step S3108) Po-operation is performed using the write characteristics E(i) and the series Pc(i) of write powers corrected for the change in write sensitivity. Various methods of Po-operation are proposed, and the present invention is not limited to the method described above.

Figure 47:
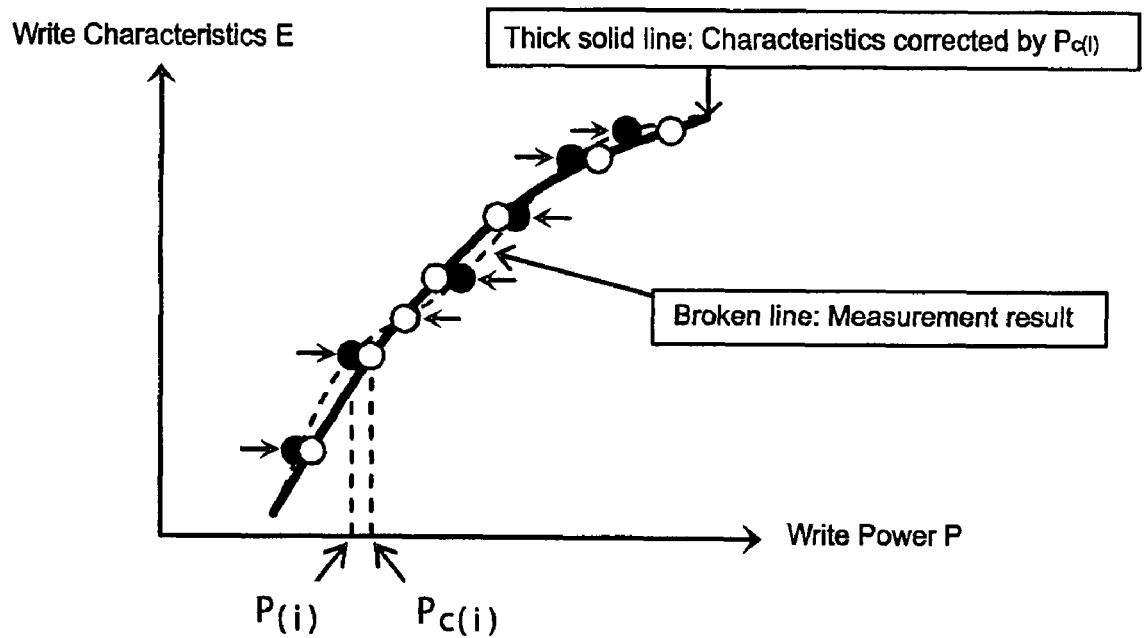
FIG. 47 is a chart showing how the influence of the fluctuation period of write sensitivity is suppressed by a corrected write power series.

FIG. 47 shows that the influence of the write sensitivity fluctuation is reduced by replacing the write power series for test writing P(i) with the series of the corrected powers Pc(i). The broken line represents the write characteristic obtained by the series of uncorrected write powers P(i), while the thick solid line represents the write characteristics obtained by the series Pc(i) of write powers corrected for the change in write sensitivity. By replacing P(i) with Pc(i), the measurement values indicated by black circles are corrected to the respective values indicated by white circles. In other words, the influence of the write sensitivity fluctuation of the optical disc 1 is suppressed.

(Step S3109) Po corrected for the change in write sensitivity is obtained by following the procedure described thus far.

Twenty-First Embodiment

Subsequently, the twenty-first embodiment of the present invention will be described.

In the twentieth embodiment, a correction is made for the influence of the write sensitivity fluctuation. The correction for the change in write sensitivity is made by converting the change in write sensitivity into the amount of change in write power. However, the influence of write sensitivity fluctuation may be corrected by converting the change in write sensitivity into the change in write characteristics. For example, when the write characteristics are approximated to be linear in a range of write power, in which test writing is performed, the processing of correction is made simpler by use of the change in write characteristics than by use of the amount of change in write power.

Figure 48:
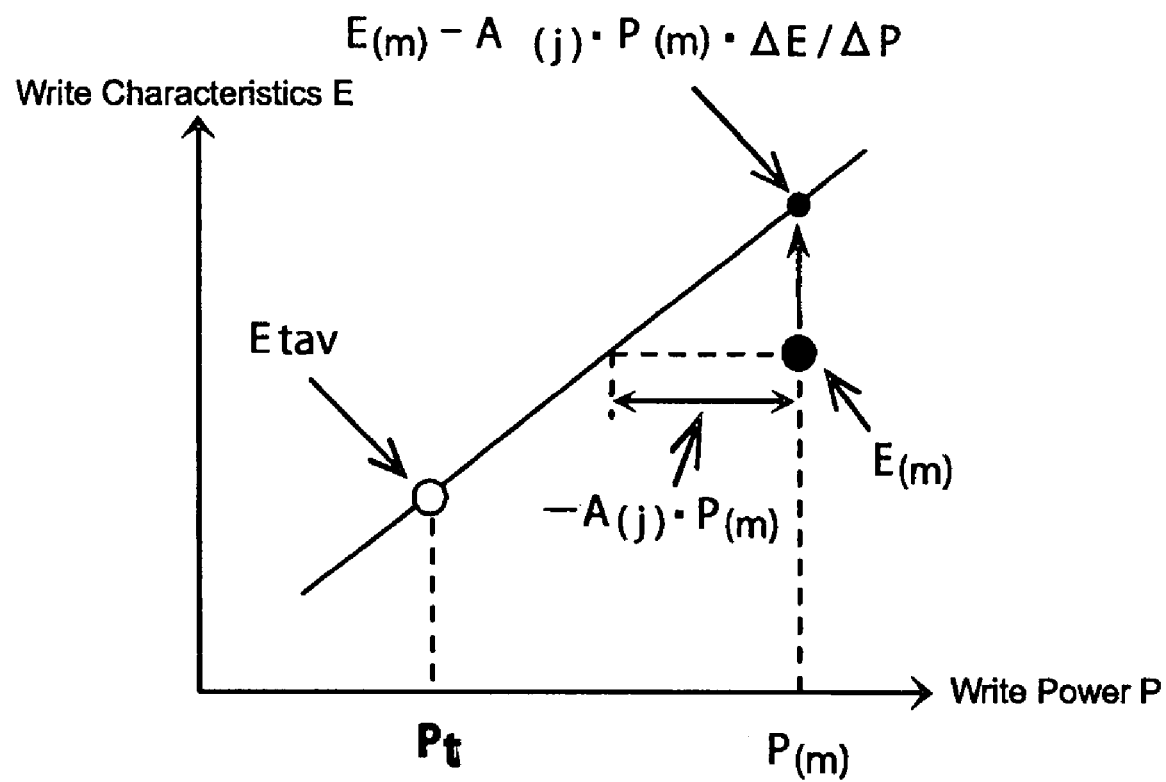
FIG. 48 shows an example of correction of the write characteristics in a method for determining the optimum write power according to a twenty-first embodiment of the present invention.

FIG. 48 shows an example of correction by use of write characteristics. Here, the solid line indicates write characteristics in a case of no unevenness in write sensitivity. E(m) represents write characteristics in a case where writing is performed in a position j in disc, with a power P(m). Here, E(m), which is under the influence of the uneven write sensitivity, is off the solid line representing writing characteristics in the case without unevenness. At this time, as FIG. 48 clearly shows, write characteristics Ec(m) in the case without uneven write sensitivity are expressed by the following formula.

$$Ec(m)=E(m)-A(j)\cdot P(m)\cdot \Delta E/\Delta P \quad (21)$$

By substituting formula (19) into formula (21), the following formula is obtained.

$$Ec(m)=E(m)+\{Etav-Et(j)\}P(m)/Pt \quad (22)$$

As seen from the above, when the value Et(j)—the write characteristics in a case where writing is performed in a position j in disc with the power Pt for monitoring the write sensitivity fluctuation—is obtained, Ec(m) can be obtained without calculating ΔE/ΔP. Furthermore, when P(m)/Pt can be approximated by 1, the following formula may be used.

$$Ec(m)\approx E(m)+\{Etav-Et(j)\} \quad (23)$$

Since use of this formula eliminates multiplication and division, the use has an advantage that the amount of operation by software can be reduced significantly.

Figure 49:
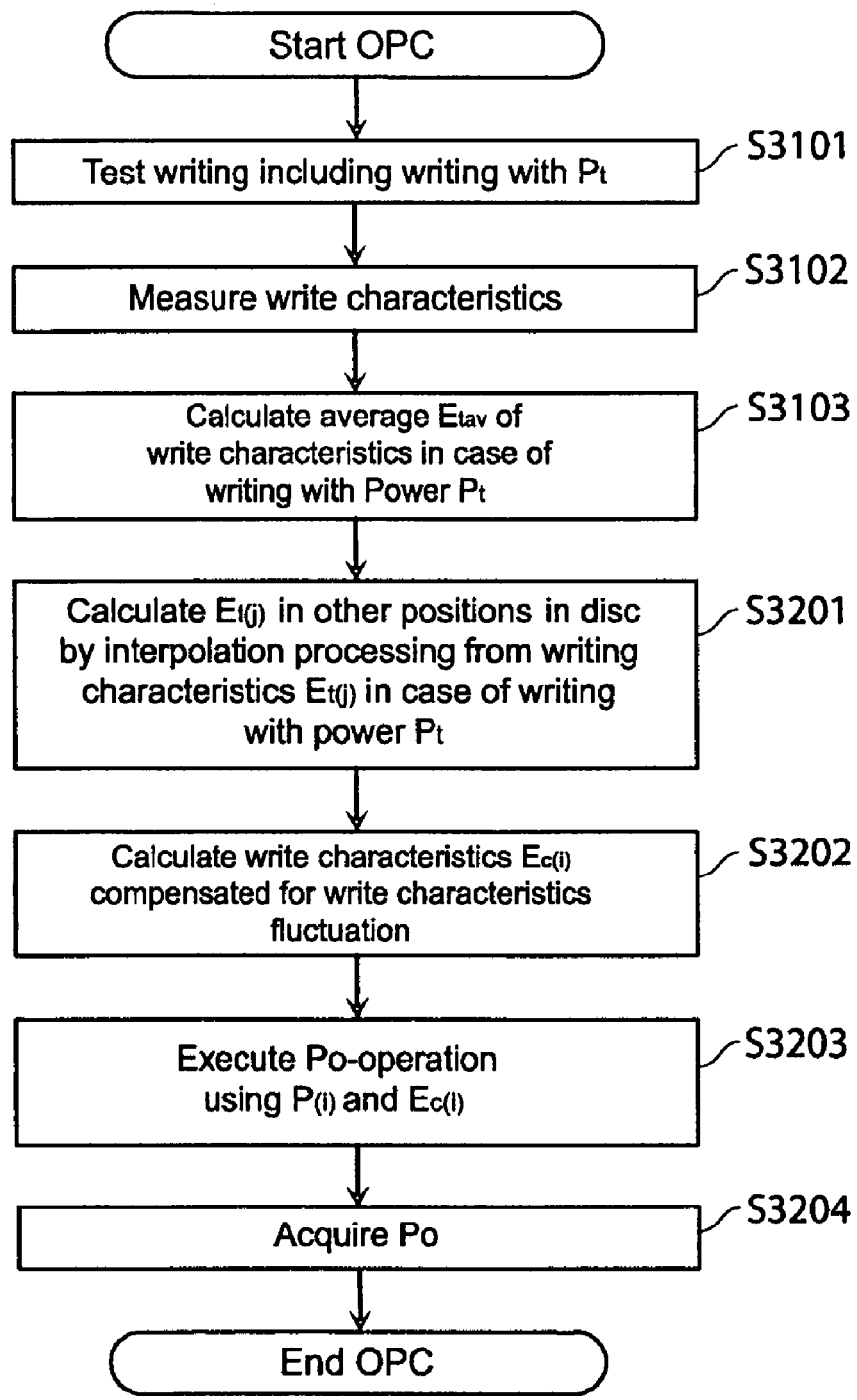
FIG. 49 is a flow chart showing the method for determining the optimum write power of the twenty-first embodiment.

FIG. 49 is a flow chart showing the procedure of a method for determining optimum write power, in a case where, by taking advantage of the features described thus far, a method in which the write characteristics are corrected is employed as a method of correction for the influence of the write sensitivity fluctuation.

(Step S3101) To begin with, as FIG. 42 shows, test writing is performed with the series P(i) of write powers for test writing, in the optical disc 1 where the power Pt for monitoring the write sensitivity fluctuation is discretely arranged.

(Step S3102) Write characteristics E(j),Et(j) are measured for the positions where test writing is performed.

(Step S3103) The average value Etav of the write characteristics (Et(0), Et(3), Et(6), and Et(9)) corresponding to the positions where test writing is performed with the power Pt for monitoring the write sensitivity fluctuation is calculated in accordance with the formula (18). The procedure thus far is the same as the procedure at the steps S3101 to S3103 of the twentieth embodiment.

(Step S3201) On the basis of the write characteristics Et(j) for the positions j (0, 3, 6, and 9) in disc, in which the writing is performed with the power Pt for monitoring the write sensitivity fluctuation, the write characteristics Et(j) for other positions in disc are calculated by an interpolating processing.

(Step S3202) Write characteristics Ec(i), which are the write characteristics corrected by converting the change in write sensitivity into the amount of change in write characteristics is calculated in accordance with formula (22) or formula (23).

(Step S3203) Po-operation is performed using series P(i) of write powers and write characteristics Ec(i) corrected for the change in write sensitivity.

(Step S3204) The value of Po corrected for the write sensitivity fluctuation is obtained by following the procedure described thus far.

Twenty-Second Embodiment

Any of the values in the series P(i) of write powers for test writing may be used as the power Pt for monitoring the write sensitivity fluctuation. In this way, the write characteristics obtained by writing with the power Pt for monitoring the write sensitivity fluctuation can also be used for Po-operation efficiently. In addition, such use reduces test writing region on the optical disc 1.

Figure 50:
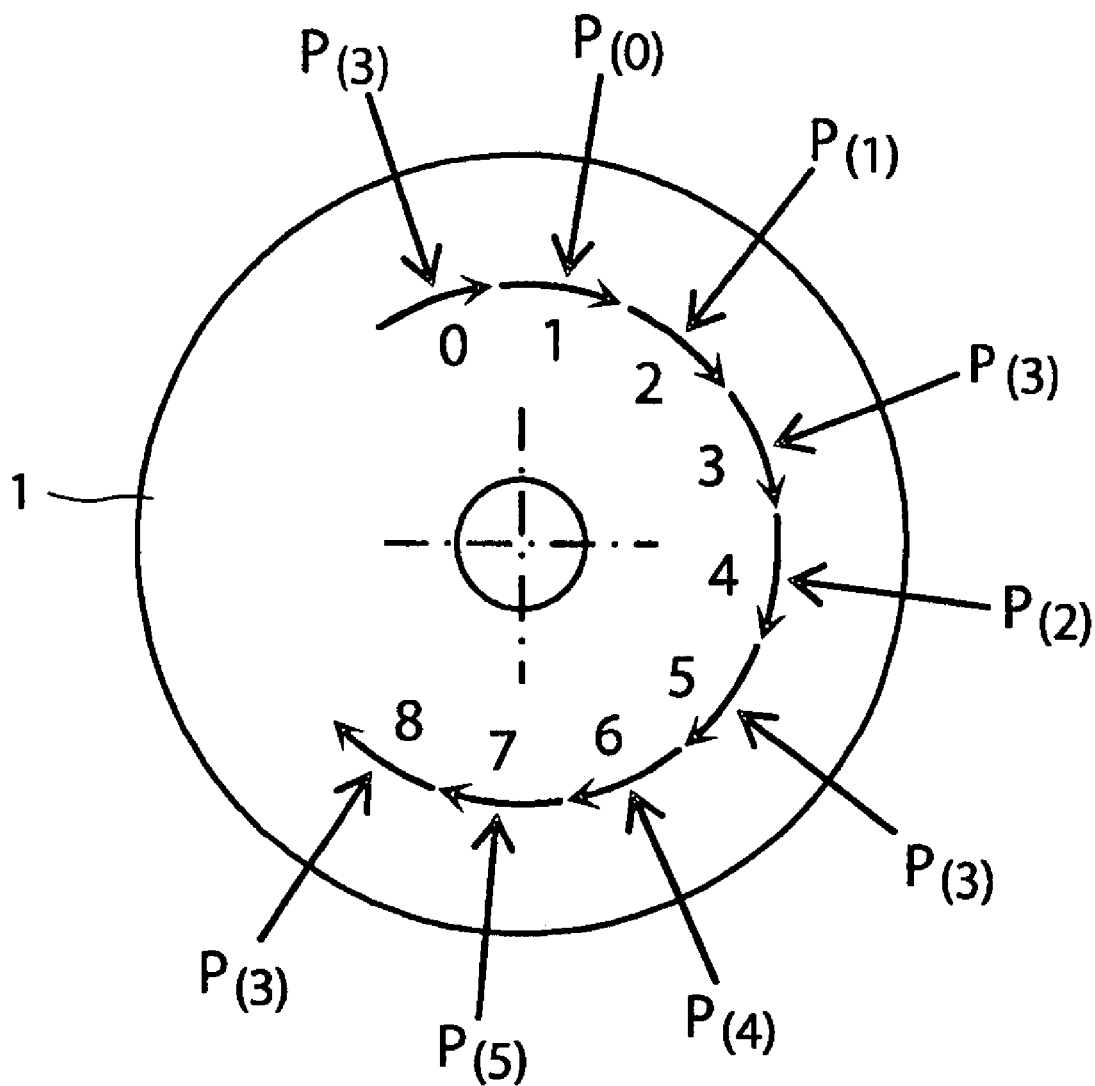
FIG. 50 is a schematic diagram showing a test writing method in a method for determining the optimum write power according to a twenty-second embodiment of the present invention.
Figure 51:
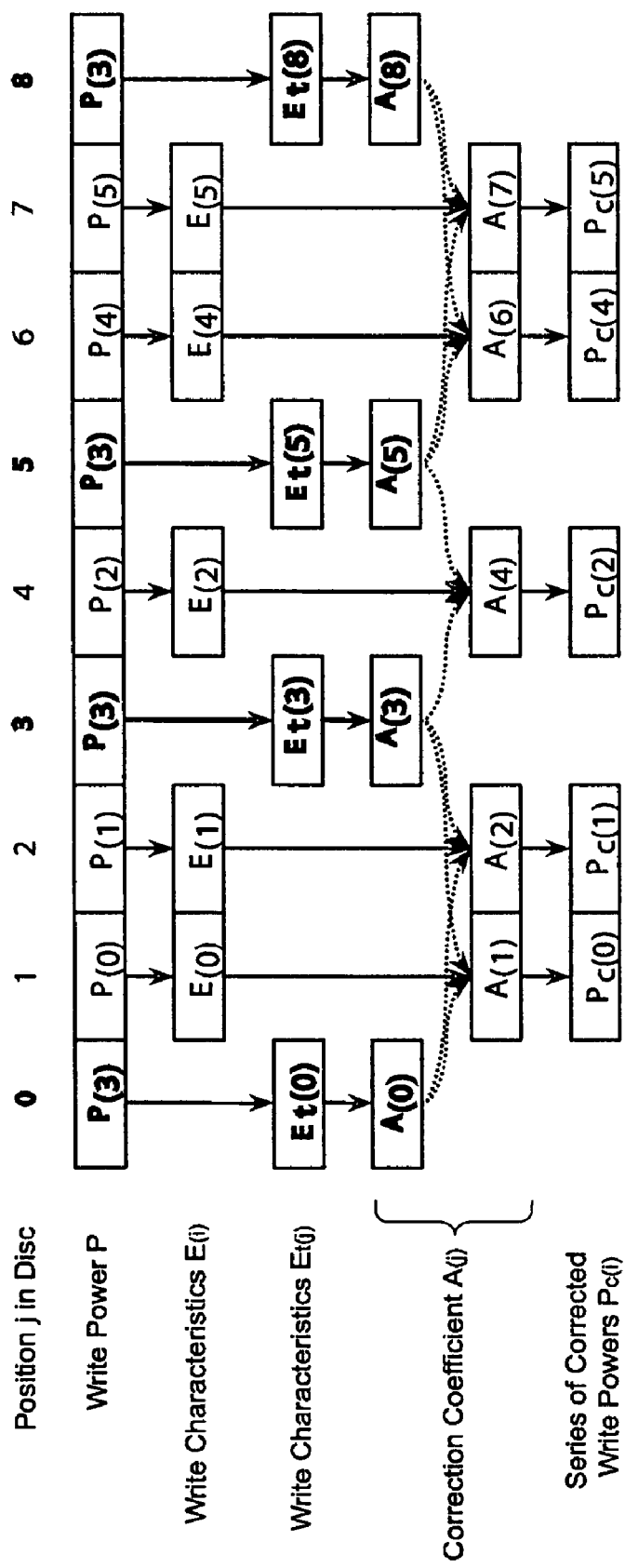
FIG. 51 schematically shows the relationship among variables in the method for determining the optimum write power of the twenty-second embodiment.

FIG. 50 is a schematic diagram showing a way of performing test writing in a method for determining optimum write power of this embodiment. FIG. 51 schematically shows the relationships among variables in the method for determining optimum write power of this embodiment.

In this embodiment, write power P(3) in the series P(i) of write powers for test writing is used as the power Pt for monitoring the write sensitivity fluctuation. As FIG. 50 shows, the region used for the test writing is up to position 8 in disc, which means that the region for test writing is reduced in comparison to the twentieth embodiment and the twenty-first embodiment. On the other hand, no write characteristics E(3) exist in FIG. 51. Here, E(3) may be defined as any one of the write characteristics Et(0), Et(3), Et(5) and Et(8), corresponding to positions in disc in which writing is performed with write power P(3). Alternatively, the write characteristics E(3) may be defined as the average of all the write characteristics obtained by performing writing with write power P(3).

Twenty-Third Embodiment

Figure 52:
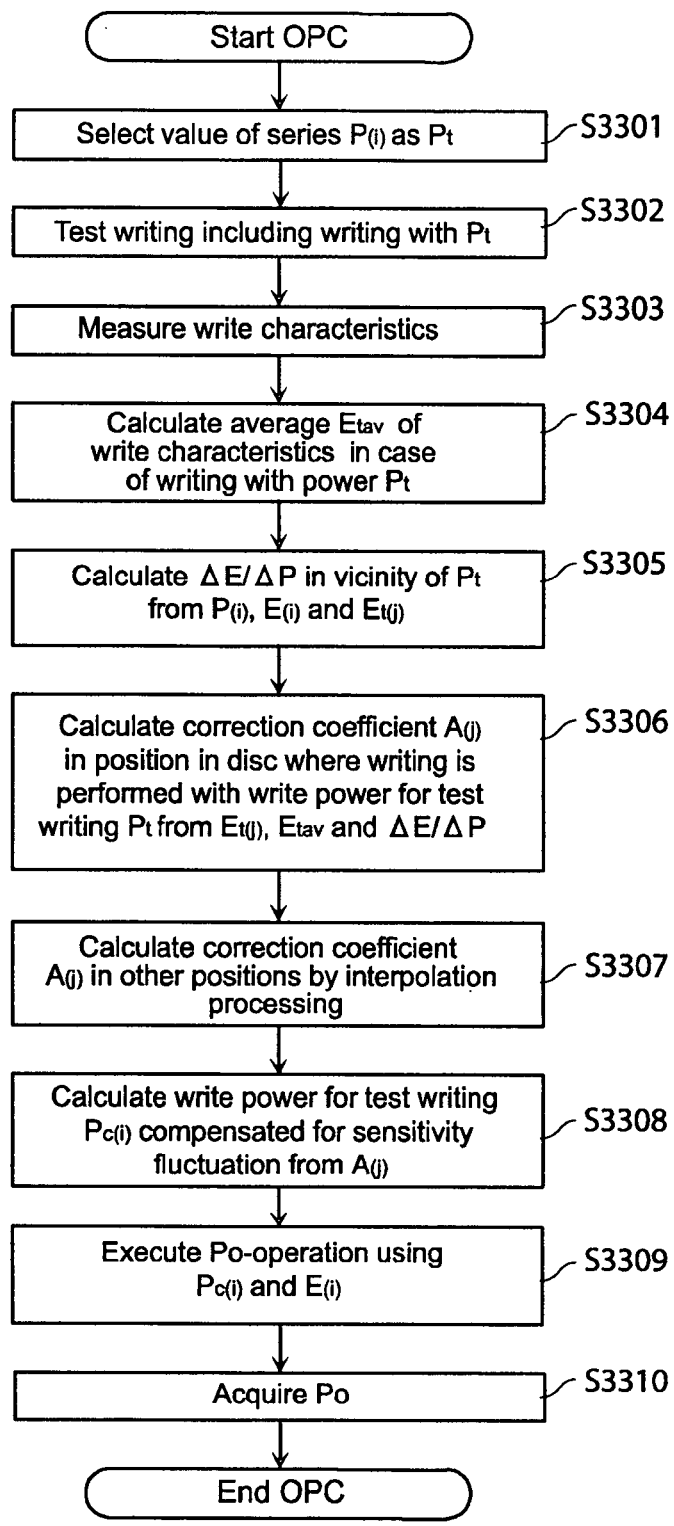
FIG. 52 is a flow chart showing the method for determining the optimum write power according to the twenty-second embodiment.

FIG. 52 is a flow chart showing the procedure of a test writing in a case where the way of defining the power Pt is applied to the twentieth embodiment. At step S3301, the power Pt for monitoring the write sensitivity fluctuation is selected from the series P(i) of write powers for test writing. Then, the test writing in the optical disc 1 is performed by use of the series P(i) of write powers for test writing with the selected power Pt for monitoring the write sensitivity fluctuation being arranged discretely. The operations following step S3302 are the same as those in the twentieth embodiment.

Figure 53:
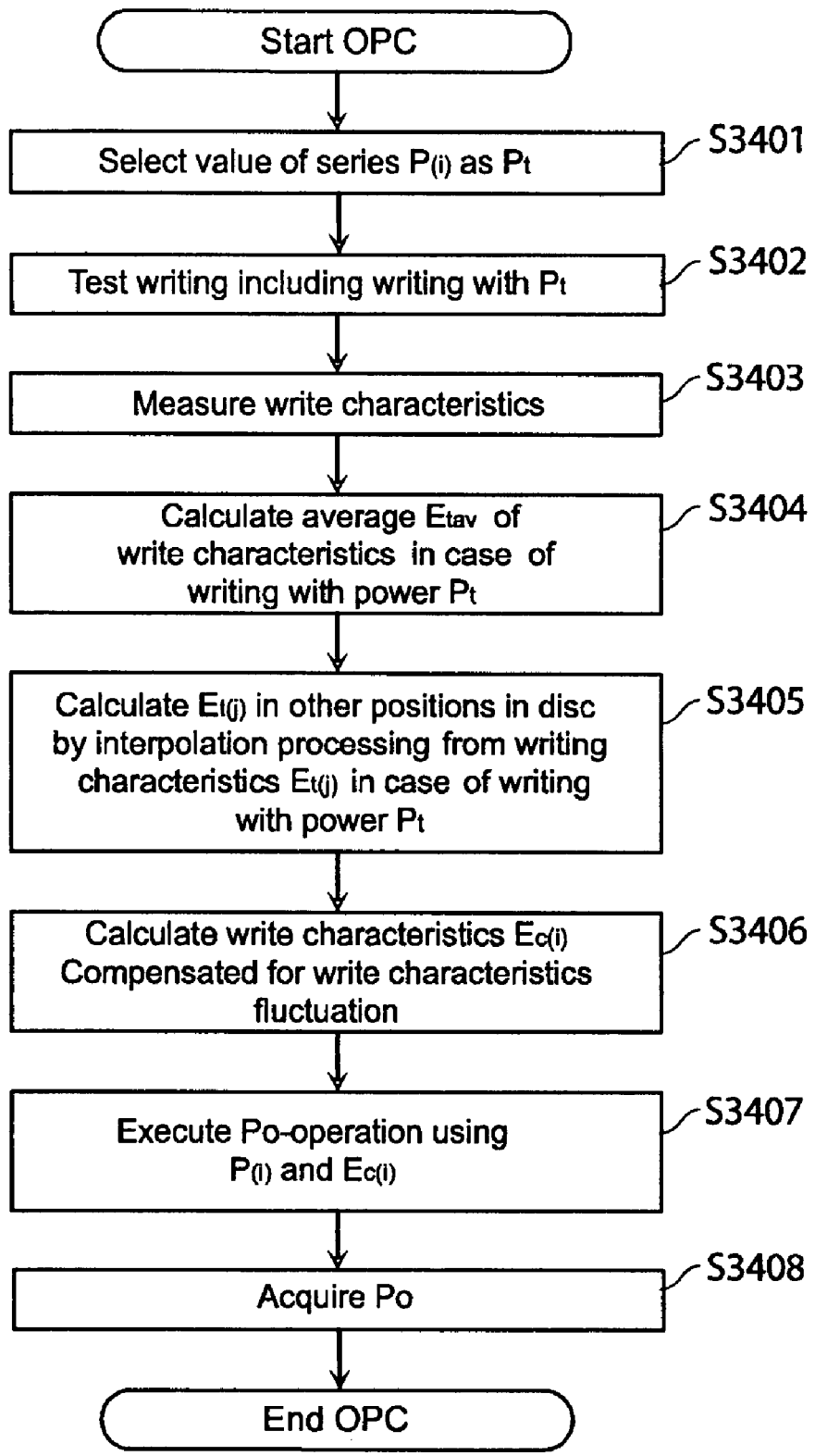
FIG. 53 is a flow chart showing a method for determining the optimum write power according to a twenty-third embodiment.

FIG. 53 is a flow chart showing the procedure of test writing, in a case where the way of defining the power Pt is applied to the twenty-first embodiment. At step S3401, the power Pt for monitoring the write sensitivity fluctuation is selected from the series P(i) of write powers for test writing. Then, the test writing in the optical disc 1 is performed by use of the series P(i) of write powers for test writing with the selected power Pt for monitoring the write sensitivity fluctuation being arranged discretely. The operations following step S3402 are the same as those in the twenty-first embodiment.

Examples of correction for the influence of the write sensitivity fluctuation by write powers P(i) or by write characteristics E(i) have been described thus far, but the present invention is not limited to these.

It should be noted that the present invention is not limited to the embodiments described above, and that various modifications can be made within the scope of the present invention.

It should be understood by those skilled in the art that various modifications, combinations, sub-combinations and alternations may occur depending on design requirements and other factors insofar as they are within the scope of the appended claims or the equivalents thereof.

What is claimed is:

1. A method for determining optimum write power for an optical disc in an optical disc recording apparatus, comprising:

test writing the optical disc as a recording medium at a first position where a write sensitivity is higher than an average write sensitivity of the optical disc to obtain first write characteristics;

test writing the optical disc at a second position to obtain second write characteristics, wherein the write sensitivity at the second position is lower than the average write sensitivity by the same amount as the difference between the write sensitivity at the first position and the average write sensitivity, wherein the same write power is used for test writing at the first position and the second position; and obtaining an optimum write power for the optical disc from an average of the first write characteristics and the second write characteristics.

2. The method for determining optimum write power for the optical disc in the optical disc recording apparatus as set forth in claim 1,
wherein the first position and the second position are determined based on a fluctuation period of the write sensitivity of the optical disc.

3. The method for determining optimum write power for the optical disc in the optical disc recording apparatus as set forth in claim 2,
wherein the fluctuation period of the write sensitivity of the optical disc is obtained based on a fluctuation of write characteristics obtained by test writing the optical disc with a constant write power.

4. The method for determining optimum write power for the optical disc in the optical disc recording apparatus as set forth in claim 2,
wherein the fluctuation period of the write sensitivity of the optical disc is obtained based on a servo error information.

5. The method for determining optimum write power for the optical disc in the optical disc recording apparatus as set forth in claim 2,
wherein the information on the fluctuation period of the write sensitivity of the optical disc is obtained by reproducing the information on the fluctuation period of the write sensitivity that is previously written in the optical disc.

6. The method for determining optimum write power for the optical disc in the optical disc recording apparatus as set forth in claim 2, further comprising:
using a test write power series of a fixed length repeatedly;
wherein a gap is provided between a first round of the test write power series and a second round of the test write power series so that the first position and the second position are written with the same write power.

7. The method for determining optimum write power for the optical disc in the optical disc recording apparatus as set forth in claim 2, further comprising:
using a test write power series of a fixed length repeatedly;
wherein the length of the test write power series is adjusted so that the first position and the second position are written with the same write power.

8. The method for determining optimum write power for the optical disc in the optical disc recording apparatus as set forth in claim 1,
wherein the first position and the second position are determined based on a base position where the fluctuation period of the write sensitivity becomes average.

9. The method for determining optimum write power for the optical disc in the optical disc recording apparatus as set forth in claim 8,
wherein the base position is obtained based on a fluctuation of write characteristics obtained by test writing the optical disc at a constant write power.

10. The method for determining optimum write power for the optical disc in the optical disc recording apparatus as set forth in claim 8,
wherein the base position of the write sensitivity of the optical disc is obtained based on a servo error information.

11. The method for determining optimum write power for the optical disc in the optical disc recording apparatus as set forth in claim 8,
wherein the information on the base position is obtained by reproducing the information on the base position that is previously written in the optical disc.

12. The method for determining optimum write power for the optical disc in the optical disc recording apparatus as set forth in claim 8, further comprising:
using a test write power series of a fixed length repeatedly;
wherein a second round of the test write power series in reversed order of a first round of the test write power series is used so that the first position and the second position are written with the same write power.

13. The method for determining optimum write power for the optical disc in the optical disc recording apparatus as set forth in claim 1, wherein the first write characteristics and the second write characteristics include write characteristics selected from a group consisting of a degree of modulation, asymmetry, a β value, and jitter.

14. An optical disc recording apparatus, comprising:
an optical pick-up configured to change the written power;
a write characteristics measurement section configured to measure write characteristics from information obtained by the optical pick-up;
a control section configured to:
control test writing of the optical disc as a recording medium at a first position where a write sensitivity is higher than an average write sensitivity of the optical disc and at a second position where the write sensitivity is lower than the average write sensitivity by the same amount as the difference between the write sensitivity at the first position and the average write sensitivity, wherein the same write power is used for test writing at the first position and the second position; and
obtain an optimum write power of the optical pick up from an average of write characteristics measured by the write characteristics measurement section at the first position and the second position.

15. An optical disc recording apparatus of claim 14, wherein the write characteristics are selected from a group consisting of a degree of modulation, asymmetry, a β value, and jitter.

* * * * *